United States Patent

Igel et al.

[15] 3,665,403

[45] May 23, 1972

[54] DATA RECORDER AND VERIFIER

[72] Inventors: John J. Igel, Rochester; Myron D. Schettl, Oronoco, both of Minn.

[73] Assignee: International Business Machines Corporation, Armonk, N.Y.

[22] Filed: Apr. 1, 1970

[21] Appl. No.: 24,780

[52] U.S. Cl. ....................340/172.5
[51] Int. Cl. ....................G06k 5/00, G06f 15/02
[58] Field of Search ....................340/172.5

[56] References Cited

UNITED STATES PATENTS

| | | | |
|---|---|---|---|
| 3,360,781 | 12/1967 | Boehnke | 340/172.5 |
| 3,483,523 | 12/1969 | Cogar et al. | 340/172.5 |
| 3,273,131 | 9/1966 | Strohm et al. | 340/172.5 |

*Primary Examiner*—Gareth D. Shaw
*Attorney*—Hanifin and Jancin and Keith T. Bleuer

[57] ABSTRACT

A data recorder for punching document cards which are of the type having three tiers into which encoded data may be punched, the system including a keyboard on which characters are entered serially, a magneto-strictive delay line constituting a storage device for storing encoded data from the keyboard in such serial form and circuitry for actuating punches from spaced characters in the storage device. The same machine may be used for verifying a previously punched document card utilizing the same keyboard as that for punching and includes circuitry by means of which program data may be entered into the data circulating through the delay line; and the recorder includes, in addition, circuitry for providing a right adjust function and for field or record erasing both under program control and in verify mode. Also, the machine includes circuitry for changing the data circulating through the delay line on verification to correct an error and repunching mechanism so that a corrected document card may then be made without any rekeying.

15 Claims, 37 Drawing Figures

PATENTED MAY 23 1972 3,665,403

SHEET 01 OF 30

INVENTORS
JOHN J. IGEL
MYRON D. SCHETTL
BY Keith J. Bleu
ATTORNEY

DATA RECORDER AND VERIFIER

BACKGROUND OF THE INVENTION

The invention relates to a data recorder or keypunch for document cards which includes circuitry and mechanism for verifying a previously punched card.

We, together with other joint inventors, have previously proposed a combined data recorder and verifier in the co-pending application of D. E. Bean et al., Ser. No. 845,817, filed July 29, 1969, for Data Recorder and Verifier in which document cards may be punched from data which is encoded from a keyboard. The data recorder and verifier includes a magneto-strictive delay line constituting a storage device for storing encoded data from the keyboard in serial form, and punching and printing mechanism correspondingly punches document cards according to the data entered into the magneto-strictive delay line and in addition prints such data onto the cards. The machine also may be used for verifying a previously punched card and includes circuitry for lighting an error light indicating to the operator that an original entry was in error.

SUMMARY OF THE INVENTION

It is an object of the present invention to provide an improved keyboard-operated data recorder and verifier for document cards, particularly of the general type disclosed in the co-pending application of D. E. Bean et al., Ser. No. 845,817, filed July 29, 1969, just mentioned and which includes mechanism and circuitry for correcting any incorrect data flowing through the delay line using the keyboard and which also includes means for punching a subsequent corrected card with the corrected data.

It is also an object of the present invention to provide such an improved data recorder and verifier which includes circuitry by means of which program data may be read into the data circulating through the delay line, such program data constituting auto skip information, auto dup information, and right adjust information; and, in addition, end of field information by means of which field erasing and the right adjust operation may be properly controlled.

DESCRIPTION OF THE PREFERRED EMBODIMENT

Figures 1, 2:
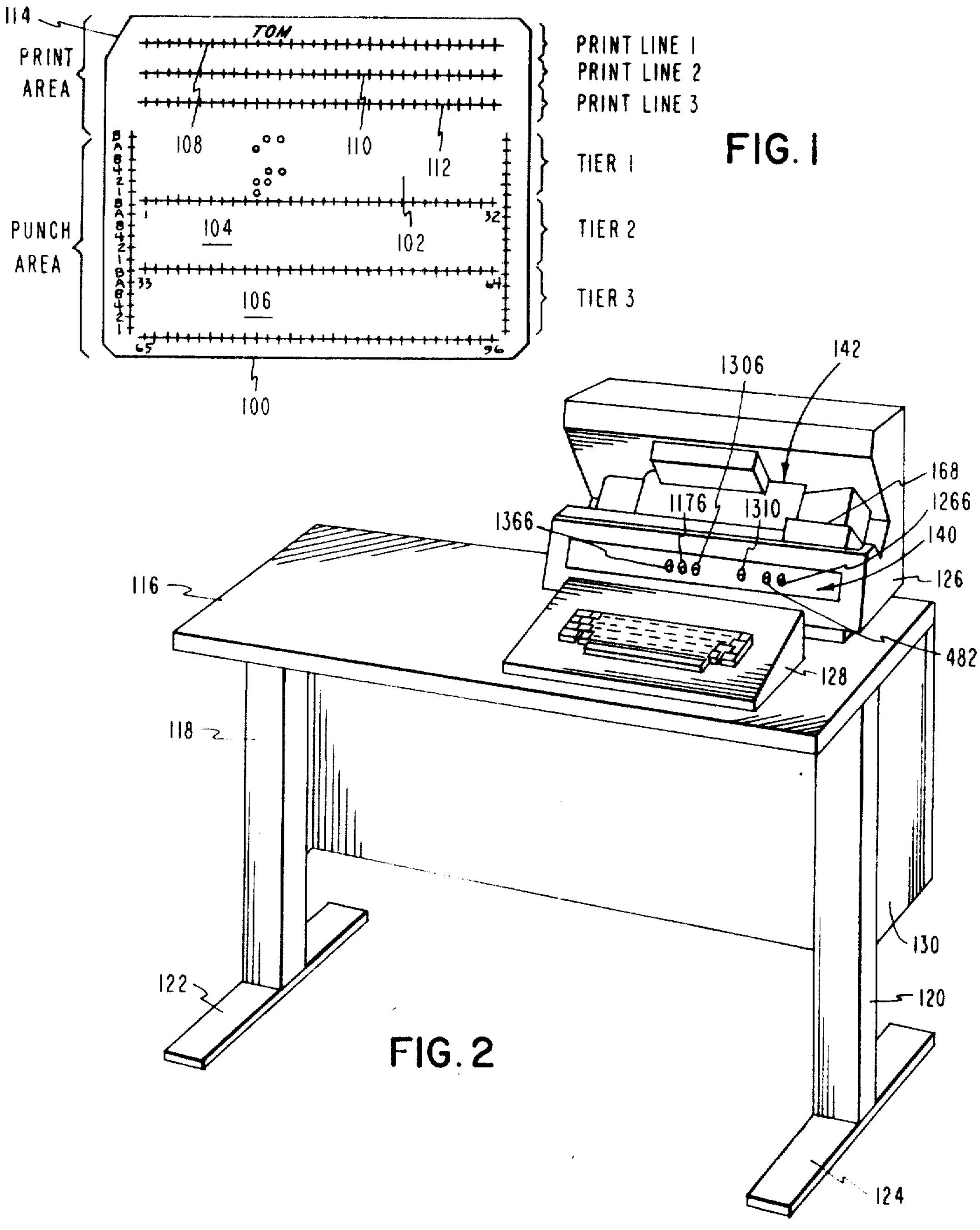
FIG. 1 is a plan view of the document card with which the data recorder of the invention may be used.
FIG. 2 is a perspective view of the data recorder.

Referring now to FIG. 1, the document card 100, with which the data recorder or keypunch is adapted to be used, may be seen to have in its lower region a punch area having three tiers 102, 104, and 106 in which holes may be punched. It will be noted that the first tier 102 contains 32 columns for receiving holes; the second tier 104 contains columns 33 to 64; and the third tier 106 contains columns 65 to 96. Each of the tiers 102, 104, and 106 has six horizontal rows 1, 2, 4, 8, A, and B; and, therefore, as many as six holes may be punched into each of the columns in each of the tiers 102, 104, and 106.

The upper part of the document card 100 constitutes a print area having three print lines 108, 110, and 112. It will be noted that print line 108 contains print positions 1 to 32, print line 110 contains print positions 33 to 64, and print line 112 contains print positions 65 to 96. The print positions in the various print lines correspond to the columns in each of the tiers 102, 104, and 106; and, in the particular card illustrated, the letters T-O-M in print positions 11, 12, and 13 correspond to the punched holes in columns 11, 12, and 13 in tier 1.

The card 100 may be quite small in comparison with prior conventional document cards and may, for example, have a length of about 3 ¼ inches and width of 2 ⅝ inches. The upper-left corner of the card is preferably docked to have a diagonally extending edge 114 for expeditiously stacking cards 100 to be in the same disposition with respect to each other in the stack.

The data recorder or keypunch is shown in FIG. 2 and may be seen to comprise a horizontal table top 116 fixed on a pair of upstanding legs 118 and 120. Oblong plates 122 and 124 are respectively attached to the legs 118 and 120 and are adapted to rest flat on a floor so as to maintain the structure upright.

The punching, reading, and printing assembly 126 of the data recorder is mounted coincident with the back edge and adjacent one side edge of the table top 116; and a keyboard 128 is mounted directly in front of and centered with respect to the assembly 126. A chest 130 extends downwardly from the table top 116 and is mounted on the rear sides of the legs 118 and 120 and provides room for the electronic components of the data recorder. The arrangement is such that the operator of the data recorder has substantial table space on which source documents may be placed; and for this purpose, the table top 116, may, for example, be of a length of 42 inches and a width of 24 inches, while the assembly 126 may have the horizontal dimensions of 11 ½ inches by 19 inches; and the keyboard 128 may have horizontal dimensions of 9 ¾ inches by 14 ½ inches.

Figure 3:
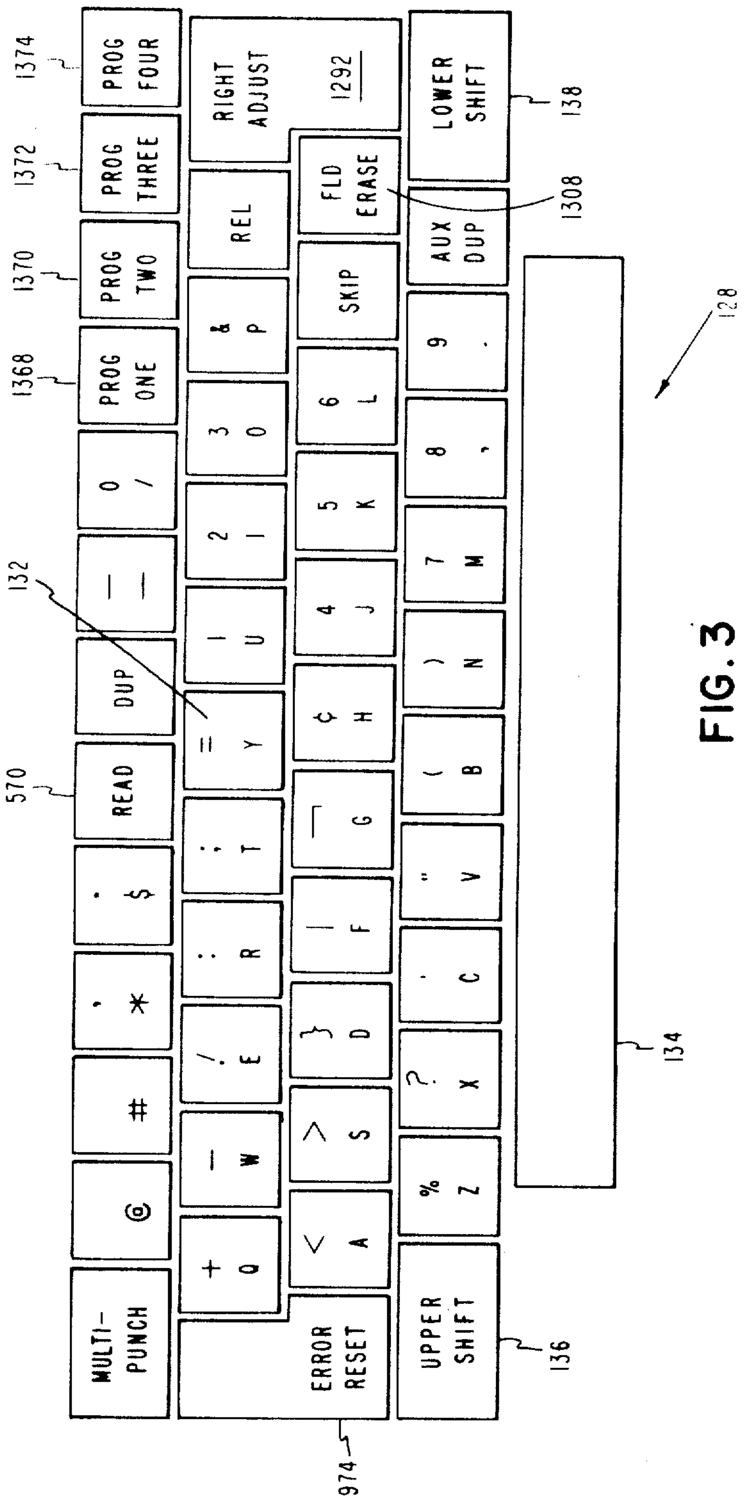
FIG. 3 is a plan view of the keyboard of the data recorder.

Referring now to FIG. 3, the keyboard may be seen to comprise a plurality of data keys 132, a space key 134, an upper shift key 136, and a lower shift key 138. The assembly 126 also includes a plurality of switches 140 (see FIG. 2) disposed in front of and above the keyboard 128.

The assembly 126 includes a card transport 142 for the cards 100 (see FIGS. 5 to 12). The transport comprises, in general, a hopper 144, a pick roll 146, a transport roll 148, a card sensor 150, a punch 152, a first incrementer wheel 154, a gate 156, a read station 158, a verify notcher 160, a printer 162, a second incrementer wheel 164, and a stacker 166.

The hopper comprises a front plate 168 on which a stack of the cards 100 rests; and the plate 168, as will be observed from FIG. 2, extends downwardly at approximately an angle of 35° with respect to horizontal. The cards 100 are adapted to be discharged from the hopper 144 onto a deck 170. The hopper comprises also a bed plate 172 for supporting the stack of cards 100, and it will be observed from FIG. 6 that the bed plate 172 extends at an angle of about 15° with respect to the deck 170 so that the cards 100 discharge downwardly from the top of the stack onto the deck 170. The bed plate 172 is supported by suitable guide mechanism 174 for upward movement as the stack of cards for forcing the plate 172 upwardly.

Figure 7:
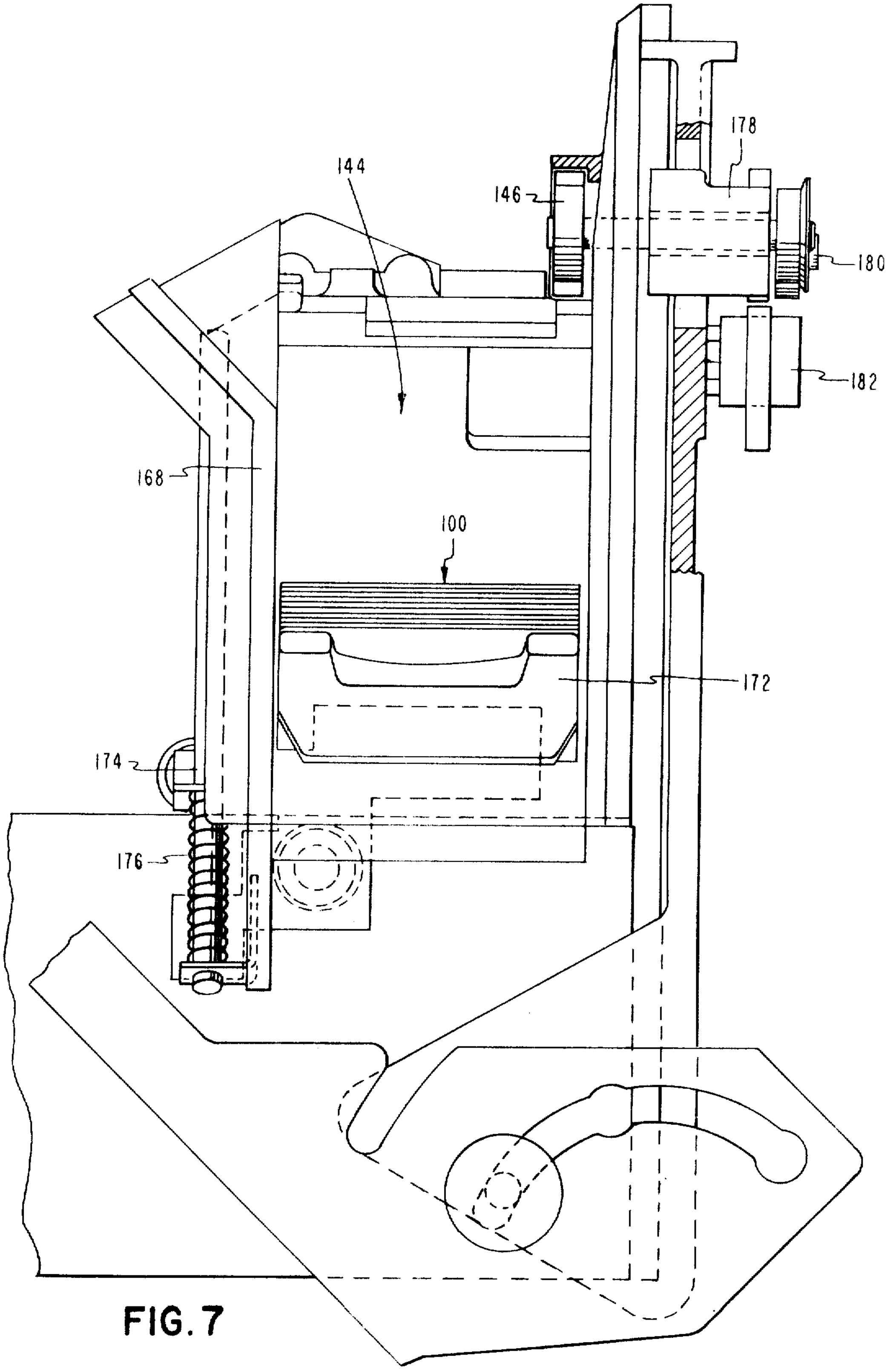
FIG. 7 is an end view of the document card hopper included in the card transport as shown in FIGS. 5 and 6.
Figures 8, 9:
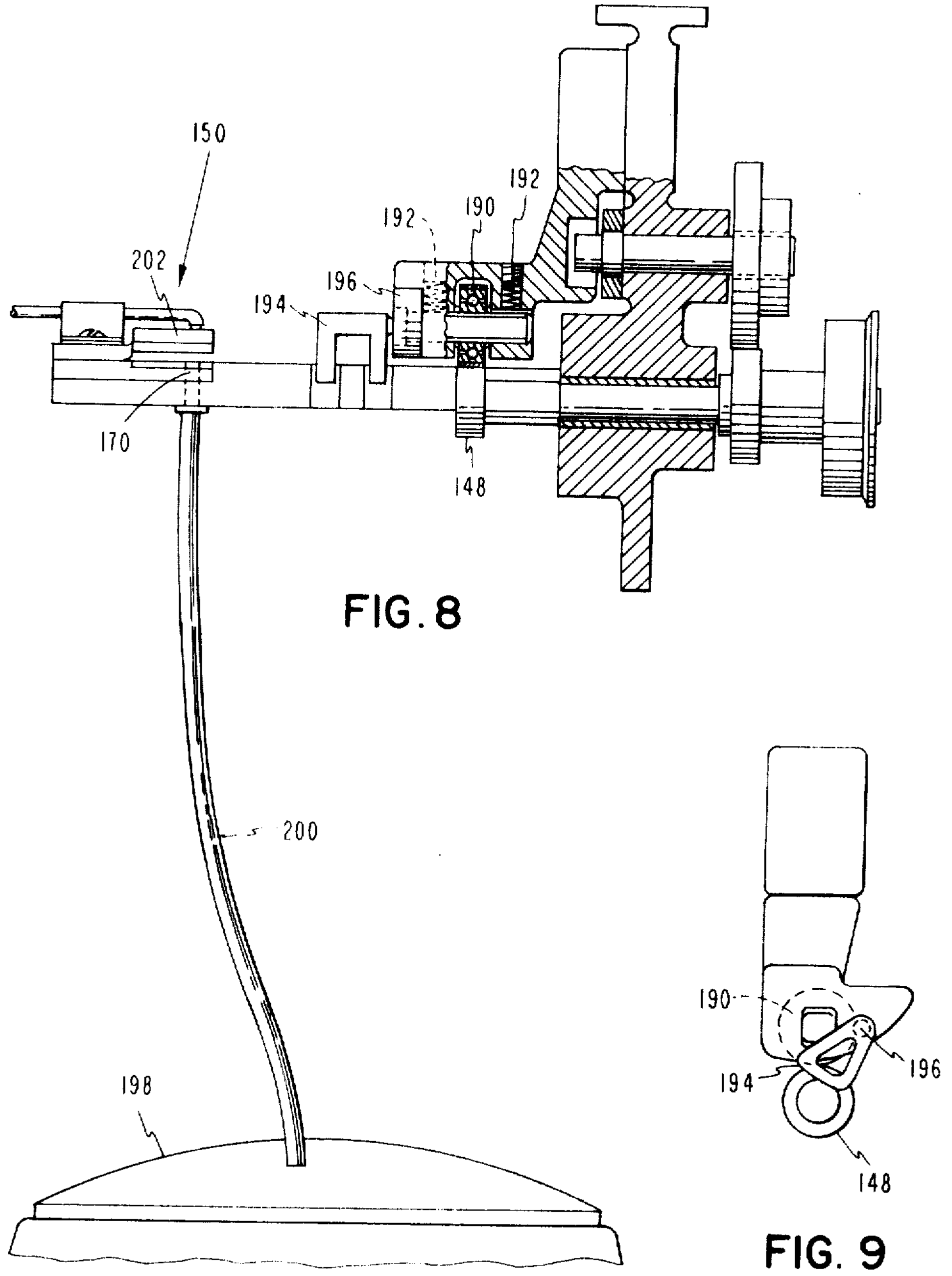
FIG. 8 is a sectional view taken on line 8—8 of FIG. 5.
FIG. 9 is a side elevational view of a cam effective on the trailing edge of a document card passing through the transport.
Figure 10:
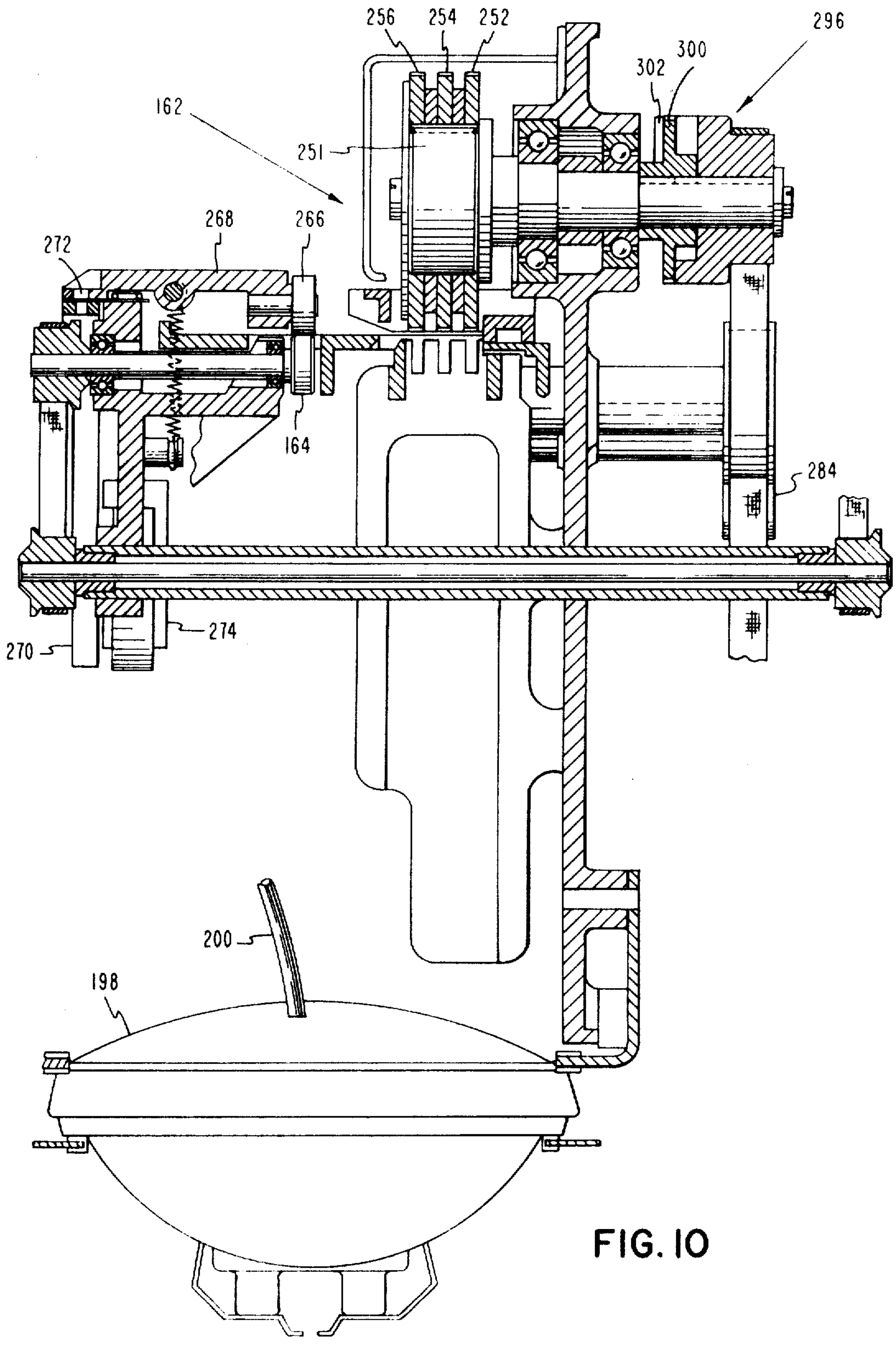
FIG. 10 is a sectional view taken on line 10—10 of FIG. 5.
Figures 11, 12:
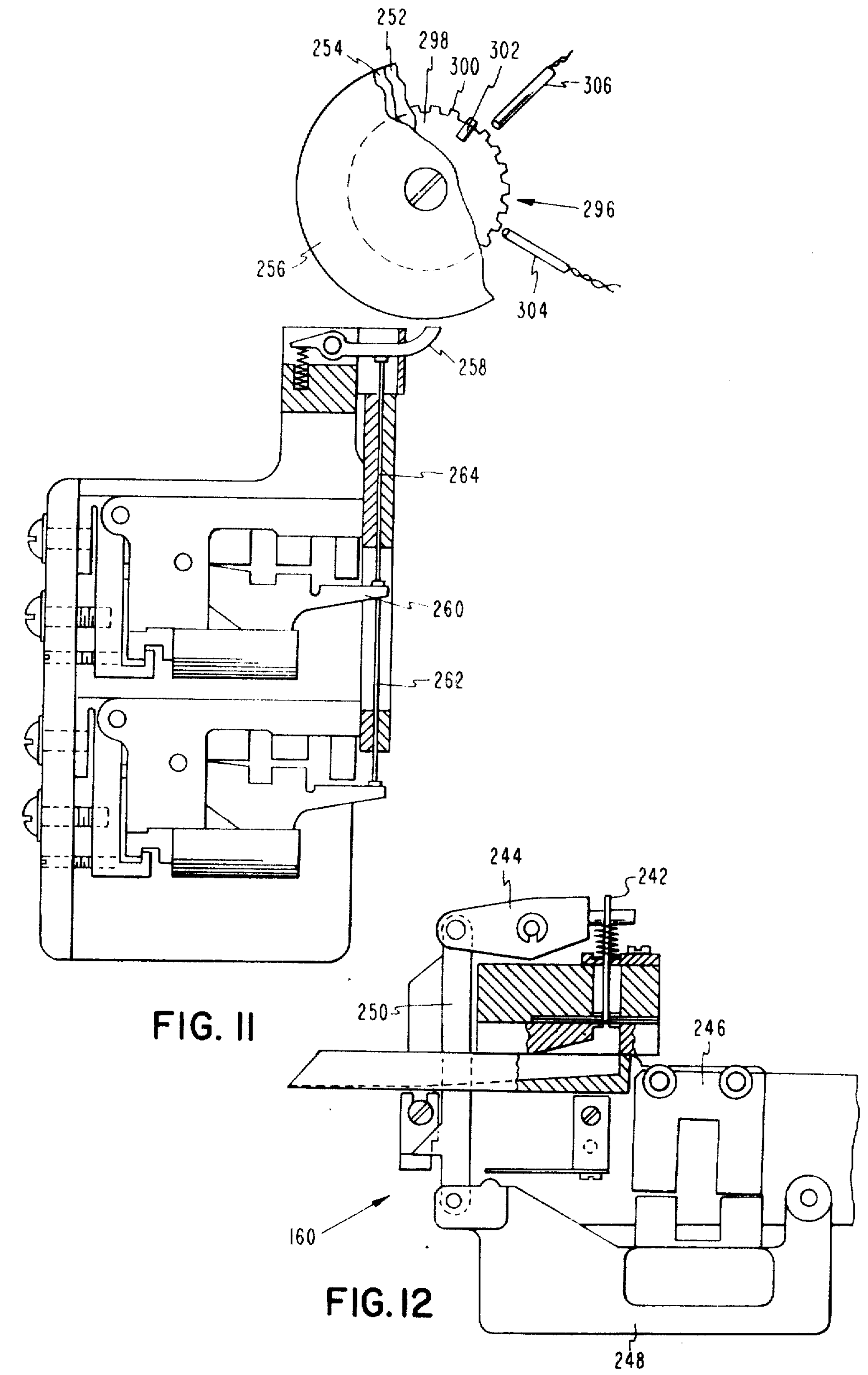
FIG. 11 is a sectional view of printing mechanism including an electrical print emitter constituting a part of the data recorder.
FIG. 12 is a sectional view taken on line 12—12 of FIG. 5.

The pick roll 146 is rotatably mounted above the stack of cards 100 supported by the bed plate 172 and is carried by a lever 178 pivoted about a point 180 (see FIG. 7). A magnet 182 is provided for acting on the lever 178 in order to move the pick roll 146 downwardly into contact with the top card 100 of the stack. The pick roll 146 is driven at a constant speed by any suitable driving mechanism.

A throat 184 (see FIG. 6) is provided for assuring that only a single card 100 is moved at a time by the pick roll 146 off the stack of cards 100. The throat 184 comprises an upper throat blade 186 and a lower throat blade 188 which are positioned closely together with a separation exceeding only slightly the thickness of a card 100.

The transport roll 148 is positioned below an idler roll 190 supported by springs 192 (see FIG. 8) so as to grip a card 100 between them. The roll 148 is continuously driven by any suitable drive mechanism.

A cam 194 (see FIGS. 5 and 9) is mounted adjacent the rolls 148 and 190 and is pivoted at 196 so as to fall behind a card 100 as it is fed onto the deck 170.

The card sensor 150 (see FIG. 8) comprises an electric lamp 198 and a plurality of card sensor fibers 200 terminating at an opening through the deck 170. A phototransistor 202 is located above the ends of the fibers 200.

The gate 156 (see FIGS. 5 and 6) comprises an electromagnetically energized pole piece 204 mounted by means of a flexure element 206 over the deck 170 and adapted to engage the deck for forming a stop for card movement.

The punch 152 comprises a punch die 208 and 18 punches 210 which are reciprocable and enter into openings in the die 208. An interposer spring 212 is provided for each of the punches 210, and the interposer springs 212 are constantly reciprocated vertically by means of an eccentric drive mechanism 214 carrying a punch bail 216 which in turn carries the springs 212. Each of the springs 212 is moved into abutting relationship with respect to a punch 210 by means of a lever 218, and each of the levers 218 is actuated by means of a magnet 220 having its armature 222 connected by a connecting rod 224 with the lever 218.

The incrementer wheel 154 is driven in increments of partial revolutions by any suitable drive mechanism so as to propel a card 100 a distance equal to one column (as, for example, from column 10 to column 11). An upper roll 226 (see FIG. 5) is positioned above the wheel 154 and is rotatably mounted on a lever 228 pivoted by means of a pivot flexure 230. A magnet 232 is provided for moving the lever 228 vertically.

The read station 158 comprises 18 phototransistors 234 mounted in a row on a circuit card 236 positioned in an upper read station 238. The station 238 is positioned over a lower read station 240 which, in turn, is positioned directly over the lamp 198.

The notcher 160 (see FIGS. 5 and 12) comprises a punch 242 actuated by means of a lever 244. A magnet 246 has its armature 248 connected with the lever 244 by means of a connecting rod 250 for this purpose.

The printer 162 (see FIGS. 5, 10 and 11) comprises a print wheel 251 containing three rows of print characters 252, 254, and 256 and rotatably driven at a constant speed by any suitable drive mechanism. A print hammer 258 is pivotally mounted below each of the print rows 252, 254, and 256; and a magnet 260 is provided for actuating each of the print hammers. The magnets 260 are disposed in upper and lower tiers and are connected to actuate the print hammers through long and short connecting rods 262 and 264.

The second incrementer wheel 164 (see FIG. 10) is driven in increments similarly to the first incrementer wheel 154 and has an upper pressure roll 266 mounted above it on a lever 268. The lever 268 has a downwardly extending extension 270 and is movable by virtue of a flexure 272. A magnet 274 is effective on the extension 270 for the purpose of pivotally moving the lever 268 and roll 266.

The stacker 166 (see FIG. 6) comprises a support plate portion 276 and a tray back 278 adapted to move toward and away from the plate portion 276 for receiving cards therebetween. A spring 280 is effective on the back 278 tending to hold it in a position adjacent the plate portion 276. A stacker shoe 282 is positioned adjacent a constantly rotating stacker wheel 284 for the purpose of guiding cards between the plate portion 276 and the tray back 278.

A punch emitter 286 (see FIG. 6) is provided in connection with the eccentric drive mechanism 214 and comprises a disk 288 driven in connection with the eccentric drive mechanism 214 and having metallic inserts 290 in its periphery. A pair of magnetic pickups 292 and 294 are provided adjacent the periphery of the disk 288 so that an electric pulse is provided in the pickups 292 and 294 as the inserts 290 pass them.

A print emitter 296 (see FIG. 11) is provided in connection with the printer 162. The print emitter comprises a wheel 298 driven along with the print wheel 251. The wheel 298 has 64 teeth 300 in it corresponding to the 63 characters and a space provided on each of the print rows 252, 254, and 256; and one of the teeth 302 is elongated axially of the wheel 298. A pair of emitter pickups 304 and 306 are provided adjacent the periphery of the wheel 298, and one of the emitters 304 is in such position that all 64 teeth are effective on it while the other emitter 306 is positioned so that only the elongated tooth 302 has an effect on the latter emitter.

Figure 13J:
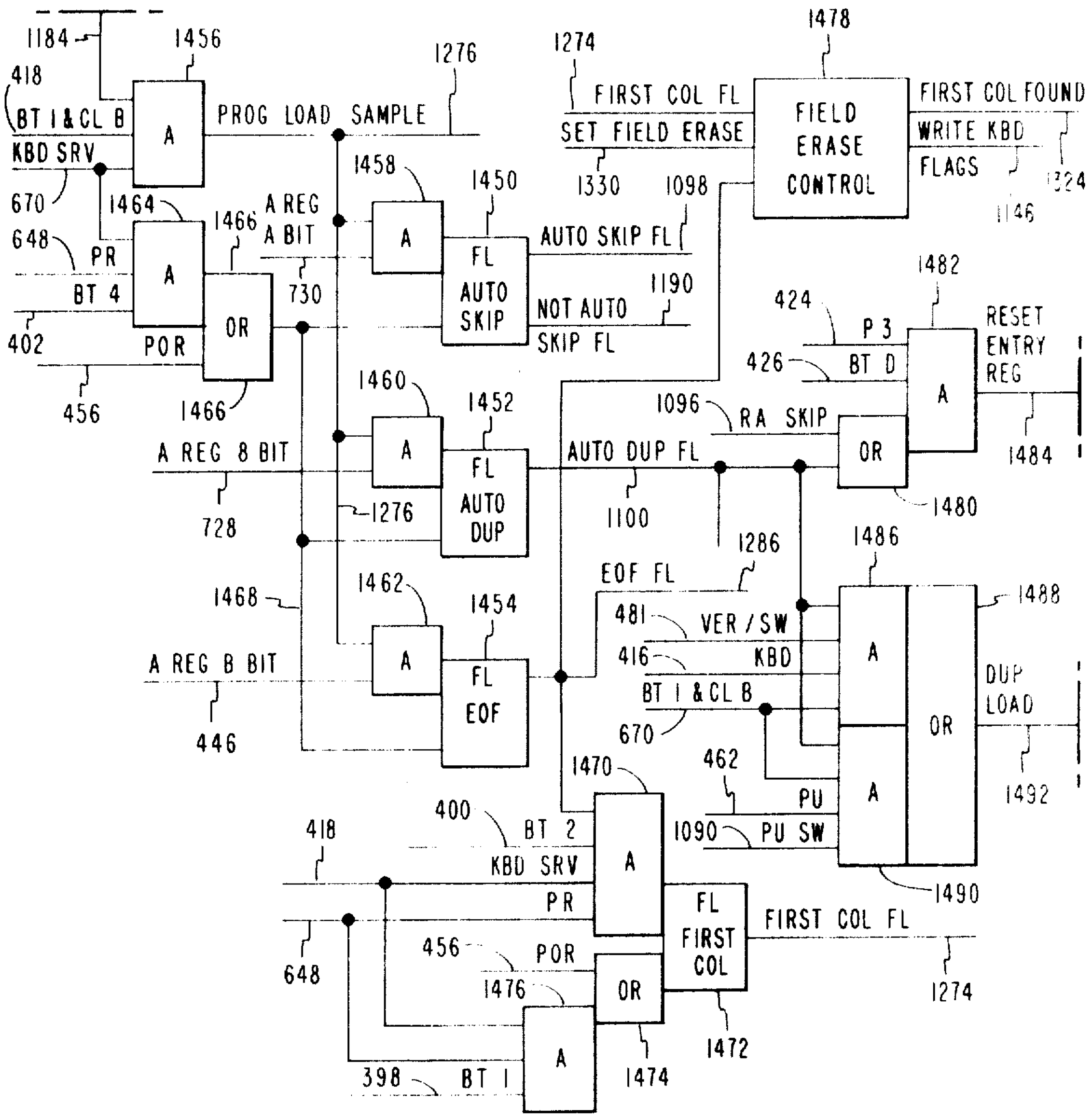
FIG. 13 is a diagram showing the manner in which FIGS. 13*a*, 13*b*, 13*c*, 13*d*, 13*e*, 13*f*, 13*g*, 13*h*, 13*i*, 13*j*, 13*k*, 13*m*, and 13*n* shall be placed together to form a complete FIG. 13 and to show diagrammatically a portion of the electrical control circuitry for the data recorder.
Figure 13:
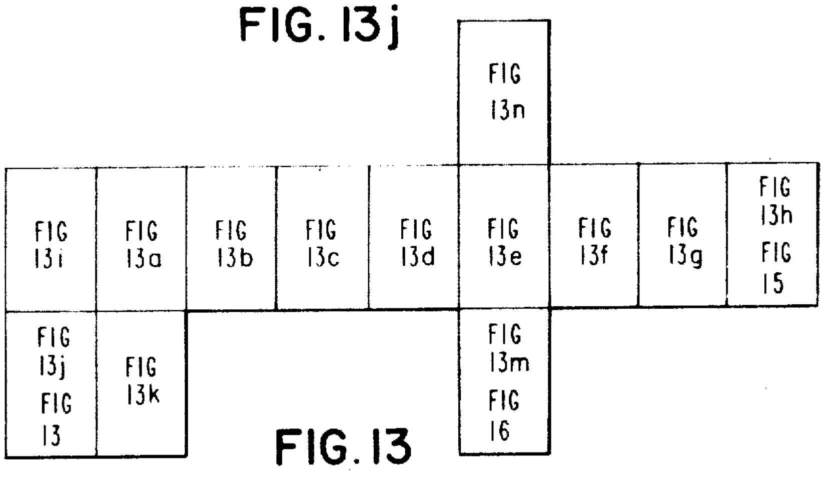
Figure 14C:
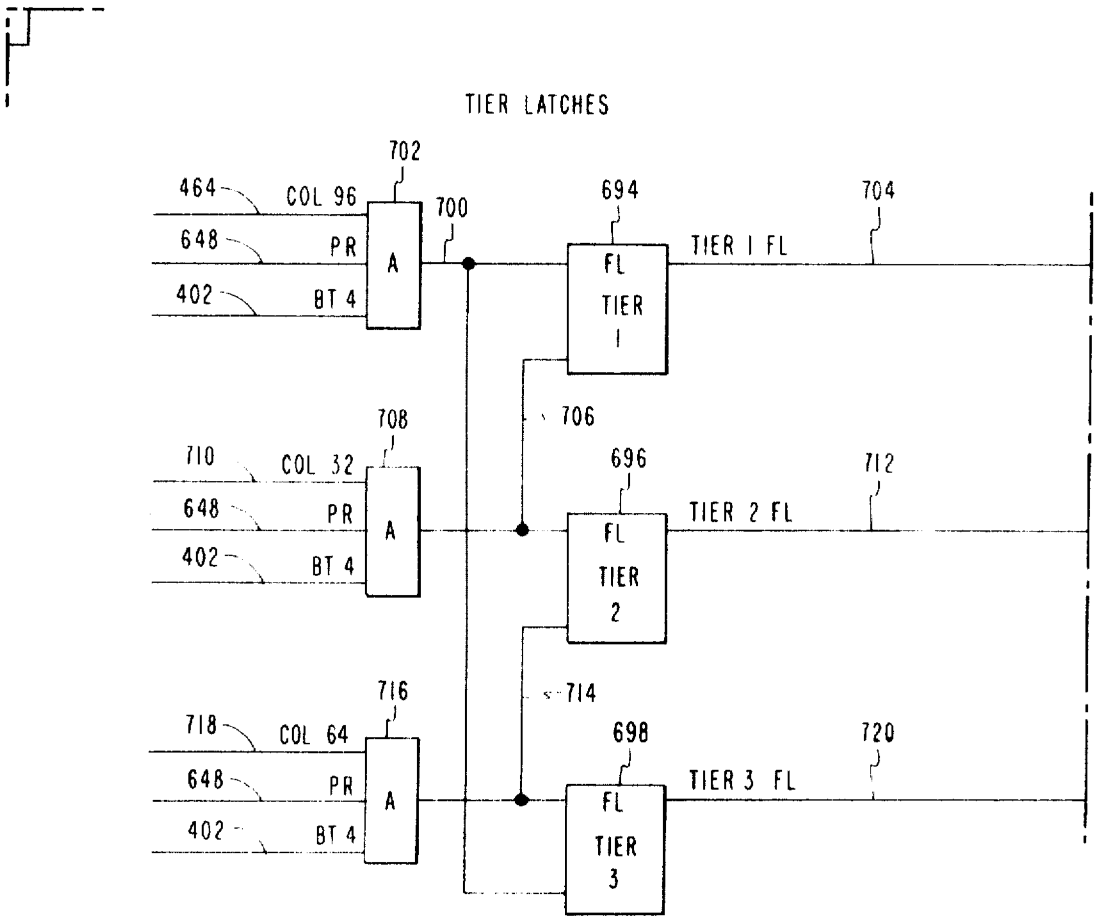
FIG. 14 is a diagram showing the manner in which FIGS. 14*a*, 14*b*, 14*c*, 14*d*, 14*e*, 14*f*, 14*g*, and 14*h* shall be placed together to form a complete FIG. 14 and to show diagrammatically the print and punch sections of the electrical control circuitry for the data recorder—the print section being shown in FIGS. 14*a*, 14*b*, and 14*h* and the punch section being shown in FIGS. 14*c*, 14*d*, 14*e*, 14*f*, and 14*g*.
Figure 14:
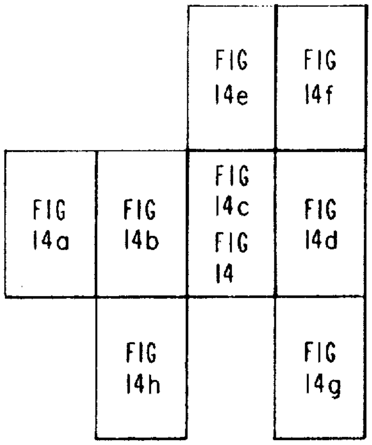

Referring now to FIGS. 13 and 14 the control system for the machine may be seen to comprise, in general, a data entry section 350, a memory and control section 352, a card feed control section 354, a card transport section 356, a right adjust control section 357, a punch section 358, a repunch control section 359, a print section 360, a data erase section 361, a read section 362, a program control section 363, and a verify section 364.

The memory and control section 352 includes a magnetostrictive delay line 366 (see FIG. 13c) which is adapted to have data bits passing through it from one end to the other and includes also an A register 368 also having these data bits passing through it from one end to the other. The A register 368 is a shift register made up of a series of triggers, and various signals are derived from this register. Therefore, the preferred constitution of the data bits passing through the delay line 366 and A register 368 will now be described.

Figure 4:
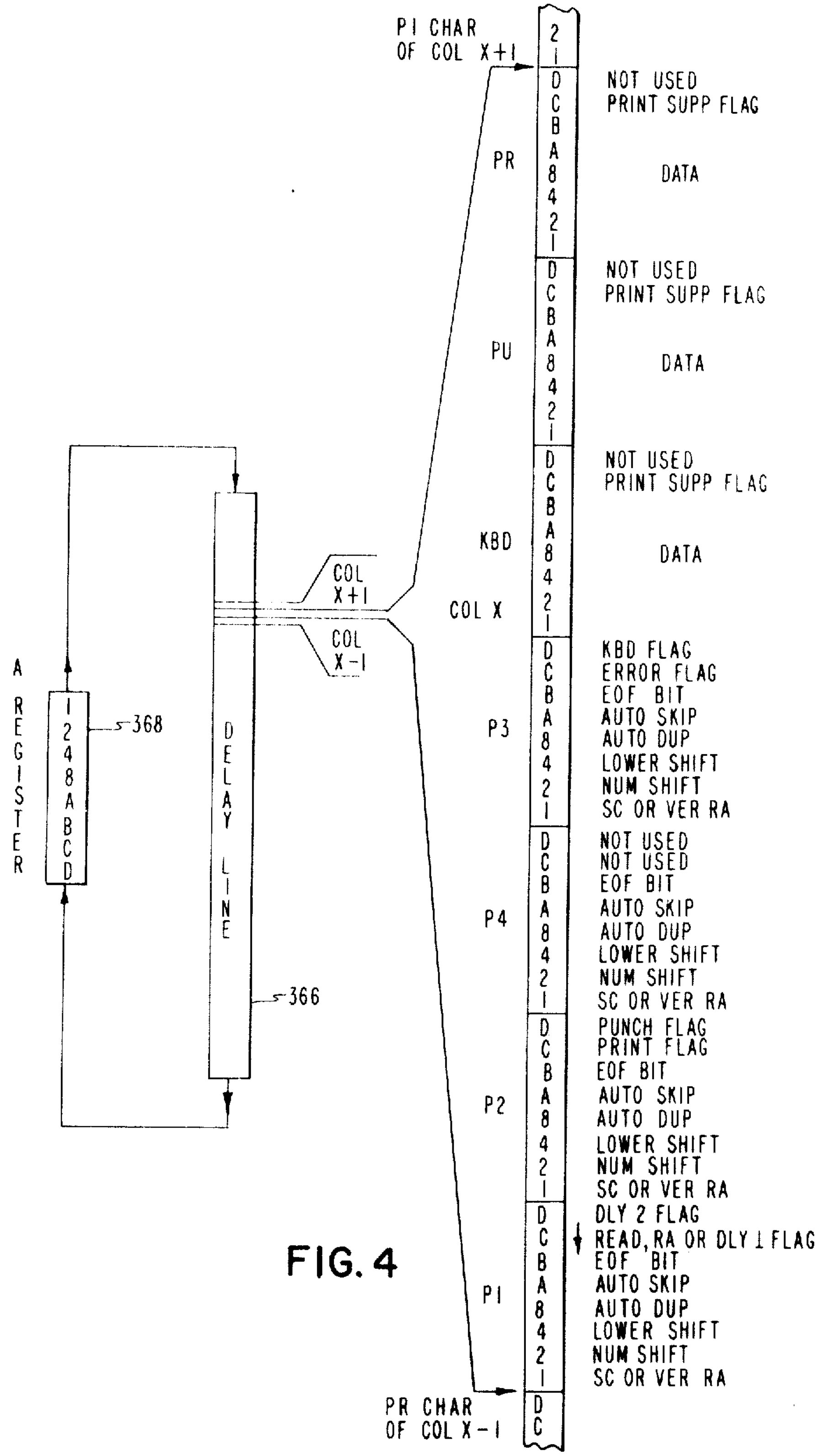
FIG. 4 is a diagrammatic illustration showing the relationship of the bits, characters, and columns of data circulating in a memory and control section of the electrical controls for the data recorder.

The data passing through the delay line 366 and the A register 368 may, for example, be in the form shown in FIG. 4 and may consist of 96 columns each of which has P1, P2, P4, P3, KBD, PU, and PR characters. Each of these characters, in turn, may be made up of bits 1, 2, 4, 8, A, B, C, and D. Each of the characters may, for example, have a duration of eight microseconds; and, therefore, each of the bits may have a duration of 1 microsecond, as the bits and characters pass any one point in either the delay line 366 or in the A register 368.

Figure 13A:
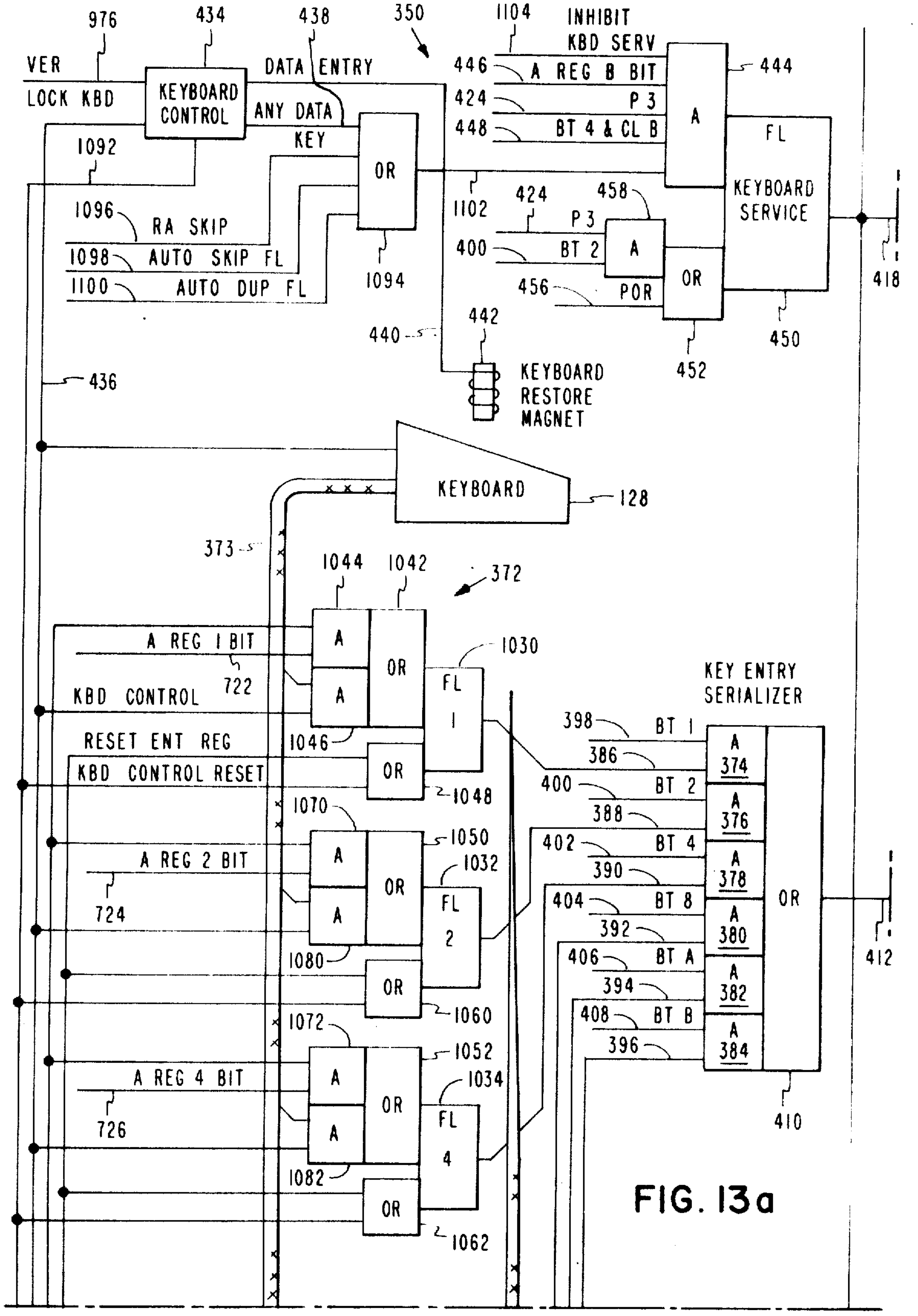
Figure 13B:
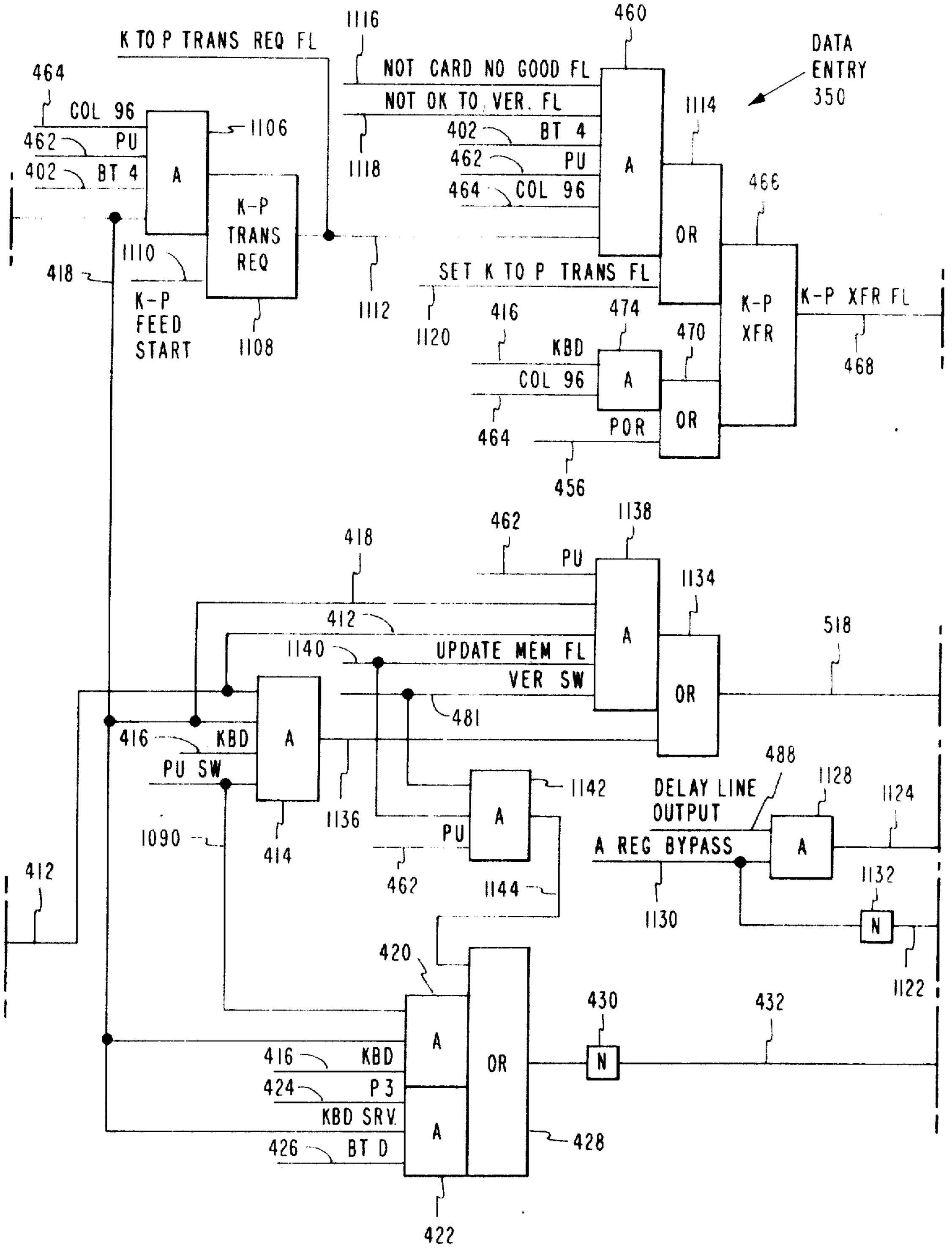
Figure 13C:
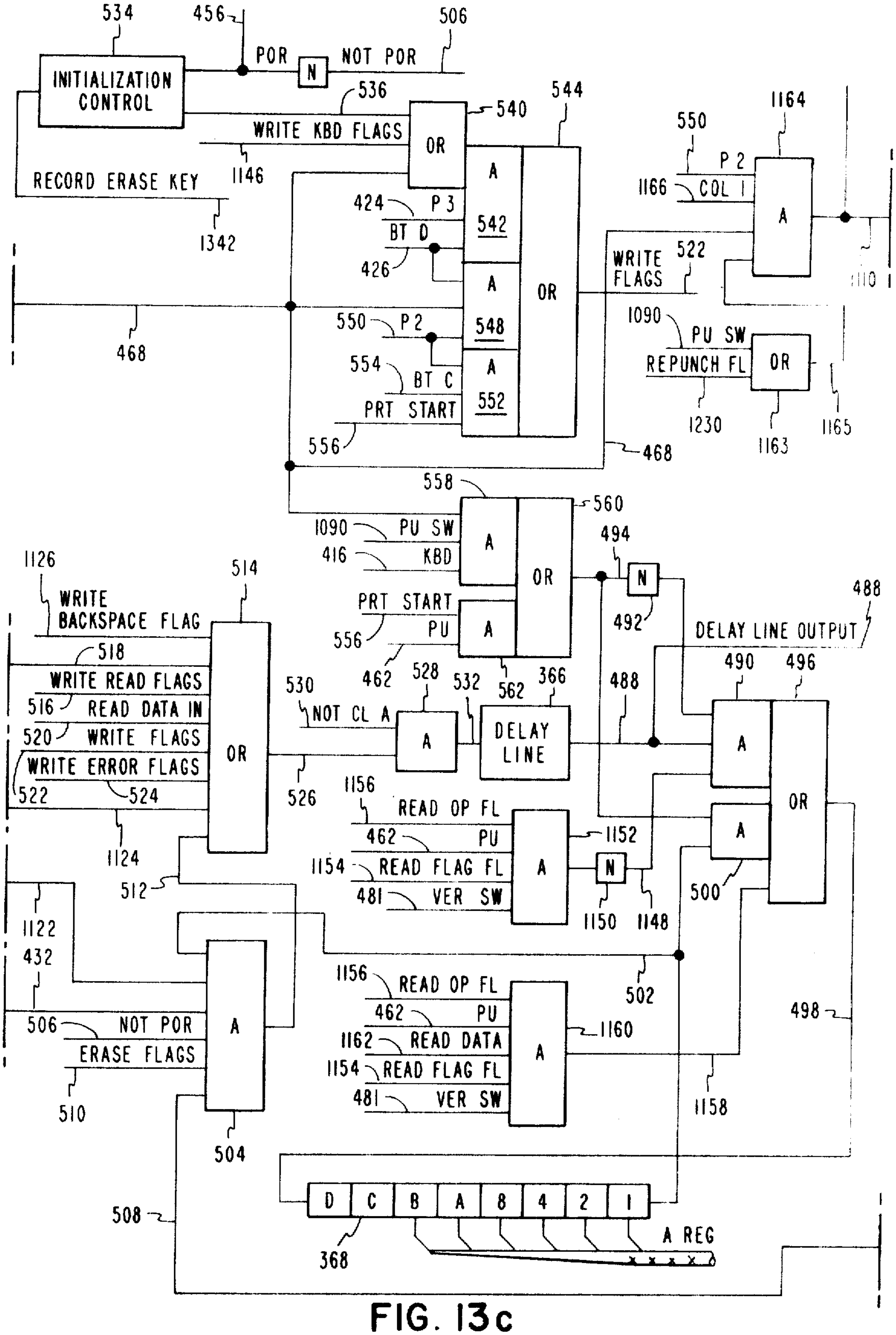
Figure 16:
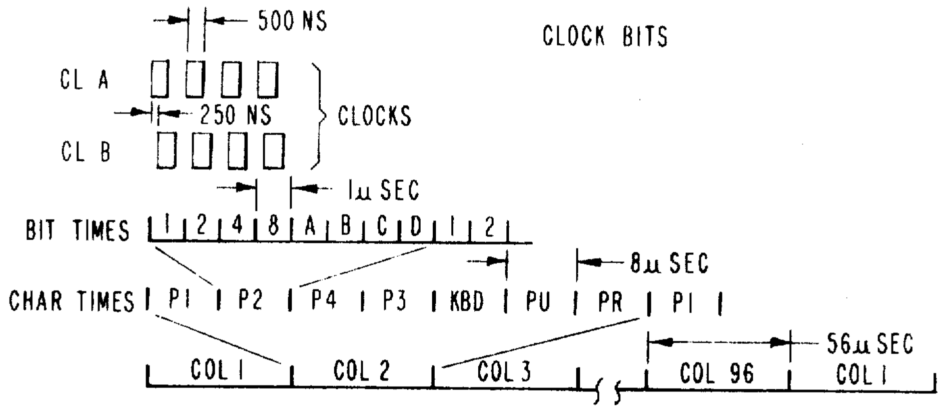
FIG. 16 is a diagram showing the relationship of the clock times, bit times, character times, and column times constituting the output of the clock.

The system also utilizes various timed signals and is under the control of a clock 370 (see FIG. 15) which provides the timing shown in FIG. 16. According to FIG. 15, the clock 370 provides the bit times 1, 2, 4, 8, A, B, C, and D, each of which has a duration of 1 microsecond. Each of the bit times is divided into clock A and clock B times. A clock A time has a duration of 500 nanoseconds for each of the bit times, and a clock B time extends for 500 nanoseconds for the middle half of each of the bit times. The clock 370 also provides character times P1, P2, P4, P3, keyboard, punch, and print; and each of these character times has a duration of 8 microseconds and includes each of the bit times. The clock 370 also provides column times, each of which has a duration of 56 microseconds; and each of the column times includes all of the different character times.

The data entry section 350 includes the keyboard 128 (see FIG. 13a) which is connected to an entry register 372 by means of a data buss 373. The entry register includes six latches 1030, 1032, 1034, 1036, 1038, and 1040 which may respectively be labeled as latches 1, 2, 4, 8, A, and B in this register. Latch 1030 has an OR circuit 1042 on its set side, and AND circuits 1044 and 1046 are connected to the OR circuit. One of the leads from buss 373 is connected to the AND circuit 1046. The latch 1030 has an OR circuit 1048 on its reset side.

The latches 1032, 1034, 1036, 1038, and 1040 are respectively provided with OR circuits 1050, 1052, 1054, 1056 and 1058 which correspond to the OR circuit 1042 provided for the latch 1030 and are provided respectively with OR circuits 1060, 1062, 1064, 1066, and 1068 corresponding to the OR circuit 1048 for the latch 1030. AND circuits 1070, 1072, 1074, 1076, and 1078 are provided for the OR circuits 1050, 1052, 1054, 1056, and 1058 and correspond to the AND circuit 1044 for the OR circuit 1042. AND circuits 1080, 1082, 1084, 1086 and 1088 are respectively provided for the OR circuits 1050, 1052, 1054, 1056, and 1058; and these AND circuits correspond to the AND circuit 1046 provided for the OR circuit 1042. The AND circuits 1080, 1082, 1084, 1086, and 1088 are connected with the buss 373 in a manner similar to the connection for the AND circuit 1046.

The latches 1030, 1032, 1034, 1036, 1038, and 1040 are respectively connected with AND circuits 374, 376, 378, 380, 382, and 384 by means of leads 386, 388, 390, 392, 394, and 396. The AND circuits 374, 376, 378, 380, 382, and 384 also have input leads 398, 400, 402, 404, 406, and 408; and these leads respectively have the timed signals "bit time 1", "bit time 2", "bit time 4", "bit time 8", "bit time A", and "bit time B" applied to them derived from the clock 370. The AND circuits 374, 376, 378, 380, 382, and 384 are appended onto an OR circuit 410 having an output lead 412. The lead 412 constitutes an input to an AND circuit 414; and the AND circuit has three additional inputs—namely, leads 416, 418, and 1090. The lead 416 has the timed signal "keyboard" applied to it which is derived from the clock 370. The lead 418 carries the signal "keyboard service"; and the lead 1090 carries a "-punch switch" signal, the sources of which will be subsequently described.

The lead 418 is also applied as an input to an AND circuit 420 which also has the leads 416 and 1090 applied to it as inputs—the latter two leads carrying the timed "keyboard" signal and the "punch switch" signal. The lead 418 also constitutes an input to another AND circuit 422 which has additional leads 424 and 426 as inputs. The leads 424 and 426 respectively carry the timed signals "P3" and "bit time D" derived from the clock 370. The AND circuits 420 and 422 are appended onto an OR circuit 428, and an inverter circuit 430 is appended on the OR circuit 428 and has an output lead 432.

The keyboard 128 (see FIG. 13a) is connected to keyboard control logic 434 by means of a lead 436. The keyboard control logic 434 has two outputs in the form of leads 438 and 440. The lead 438 carries a signal "any data key" which is raised when any of the data keys 132 and the space key 134 is depressed, and the lead 440 is connected to a keyboard restore magnet 442 which is effective on the keyboard 128 to restore the keyboard to operating condition after each of the keys on the keyboard 128 has been operated. Lead 436 carries a "keyboard control" signal; and this is also connected to the AND circuits 1046, 1080, 1082, 1084, 1086, and 1088 as shown. The keyboard control logic 434 also has an output lead 1092 which carries a "keyboard control reset" signal and which is connected to the OR circuits 1048, 1060, 1062, 1064, 1066, and 1068. The lead 438 is connected as an input to an OR circuit 1094; and the OR circuit 1094 has three additional inputs—namely, leads 1096, 1098, and 1100. These three leads respectively carry the signals "write adjust skip", "auto skip latch", and "auto dup latch" which will be derived as subsequently explained. The OR circuit 1094 has an output lead 1102 which constitutes an input to antn AND circuit 444; and the AND circuit has additional inputs in the form of leads 446, 424, 448, and 1104. The lead 424 carries the timed signal "P3"as previously mentioned, and the lead 446 carries the signal "A REG B bit". The signal "A REG B bit" is derived from the A register 368 and constitutes the particular bit that is in the B position of register 368. The lead 448 carries the signal "bit time 4 & clock B", and this is a timed signal derived from the clock 370 and exists at the correspondence of bit time 4 and clock B time. The lead 1104 carries the signal "inhibit keyboard service" which is derived as will be subsequently described.

The AND circuit 444 is applied onto the set side of a latch 450 which may be termed a keyboard service latch, and this latch has the lead 418 as an output so that the lead 418 carries the signal "keyboard service". An OR circuit 452 is applied onto the reset side of the latch 450 and has two inputs in the form of a lead 456 and an AND circuit 458. The lead 456 carries a "POR" (power on reset) signal which will be raised as subsequently described on machine initialization. The AND circuit 458 has the leads 424 and 400 as inputs which respectively carry the timed signals "P3" and "bit time 2" as previously mentioned.

The lead 418 constitutes an input lead to an AND circuit 1106 which is applied to a latch 1108 on the set side of the latch. The latch 1108 may be labeled as the K to P transfer request latch. The AND circuit 1106, in addition to the lead 418 as an input, also has leads 402, 462, and 464 as inputs. The lead 402 carries the "bit time 4" signal as previously mentioned, and the leads 462 and 464 carry the timed signals "-punch" and "column 96" derived from the clock 370. A lead 1110 carrying the signal "K to P feed start" is applied onto the reset side of the latch 1108, and this signal is derived as will be subsequently described.

The K to P transfer request latch 1108 has an output lead 112 carrying the signal "K to P transfer request latch", and this lead constitutes an input lead to an AND circuit 460. The AND circuit 460 is appended to an OR circuit 1114 which in turn is located on the set side of a latch 466. The latch 466 may be termed a K to P transfer latch and has a lead 468 as an output which carries a signal "K to P transfer latch". The AND circuit 460 has five input leads in addition to the lead 1112; and these include leads 402, 462, and 464 carrying the timed signals "bit time 4", "punch", and "column 96" respectively derived from the clock 370. The two other inputs to the AND circuit 460 are the leads 1116 and 1118 which respectively carry the signals "not card no good latch" and "not OK to verify latch" which will be derived as subsequently described. The OR circuit 1114, in addition to having the AND circuit 460 as an input, also has a lead 1120 as an input which carries the signal "set K to P transfer latch" derived as will be subsequently described.

The K to P transfer latch 468 has an OR circuit 470 on its reset side which has an AND circuit 474 as an input in addition to an input lead 456 carrying the "POR" signal. The AND circuit 474 has two inputs—namely, leads 416 and 464 carrying the timed signals "keyboard" and "column 96".

Figure 13D:
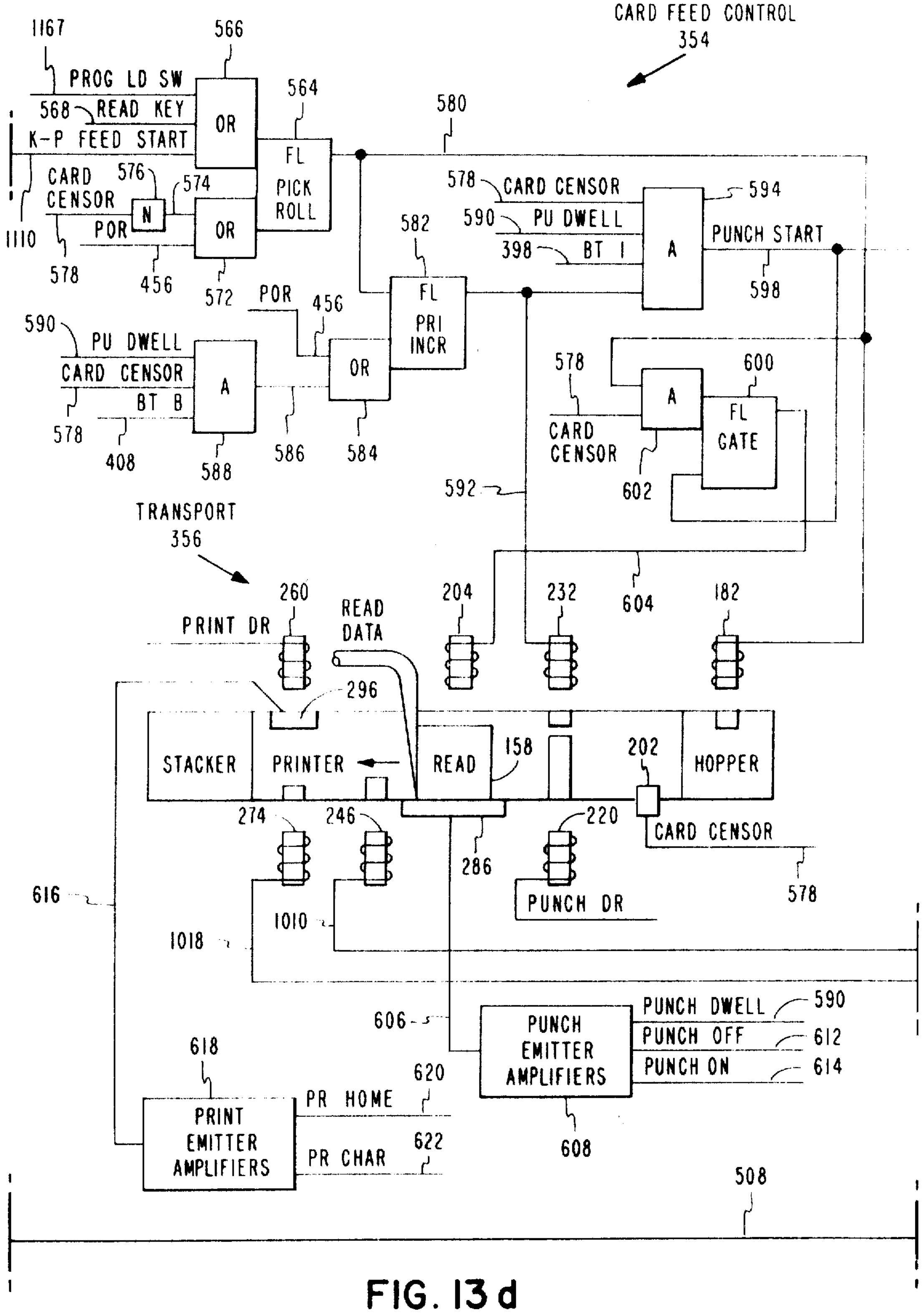
Figure 13E:
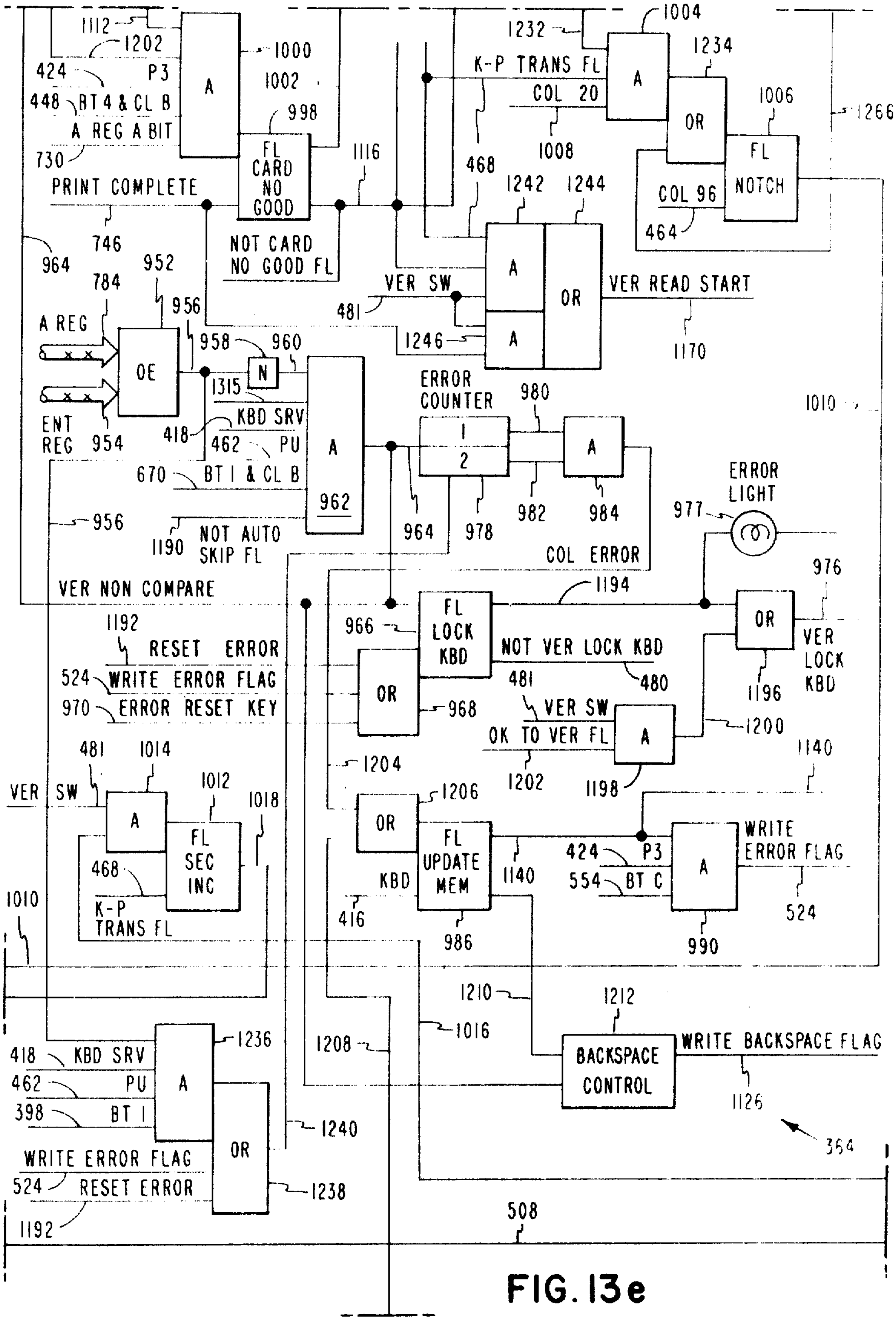
Figure 13F:
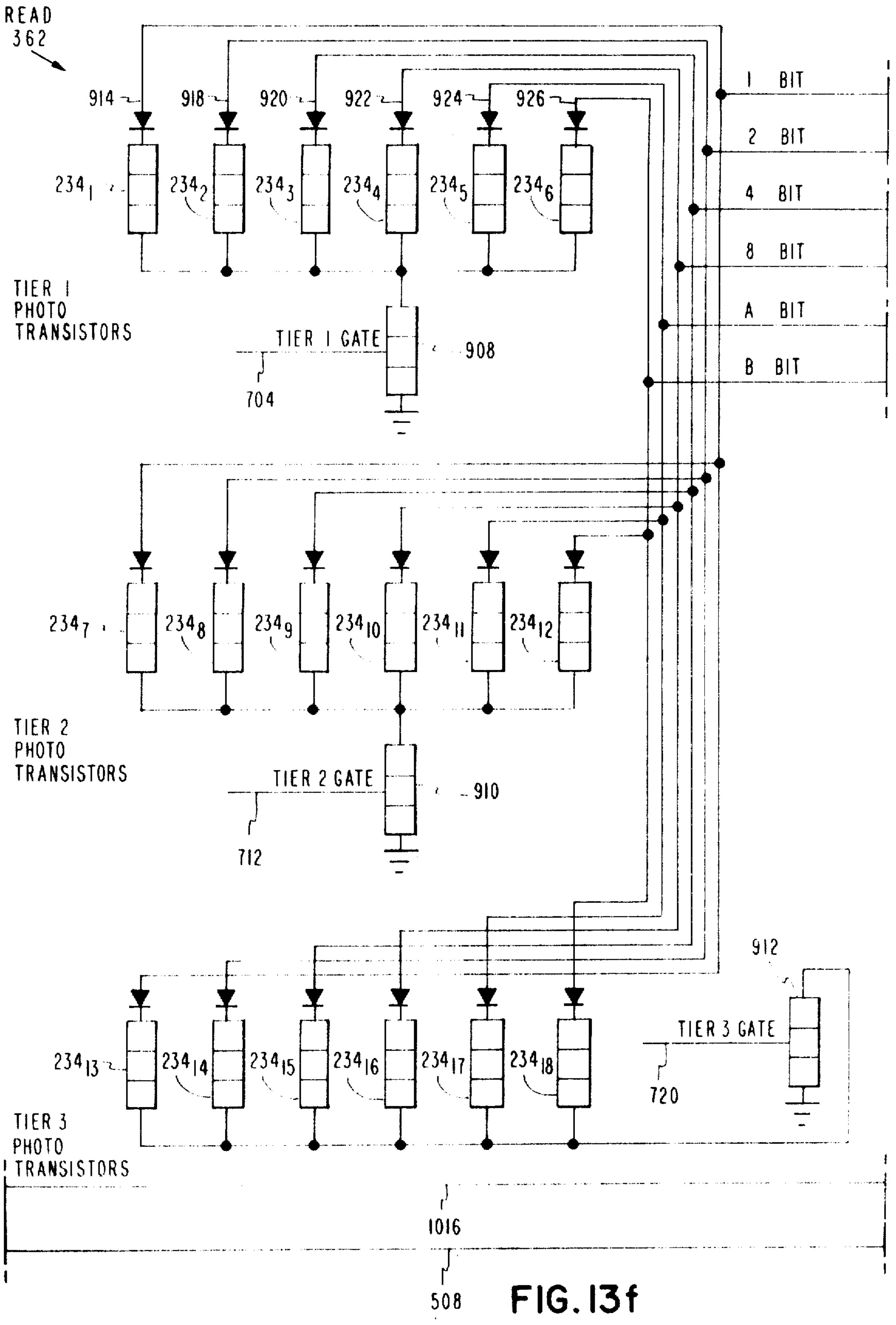
Figure 13G:
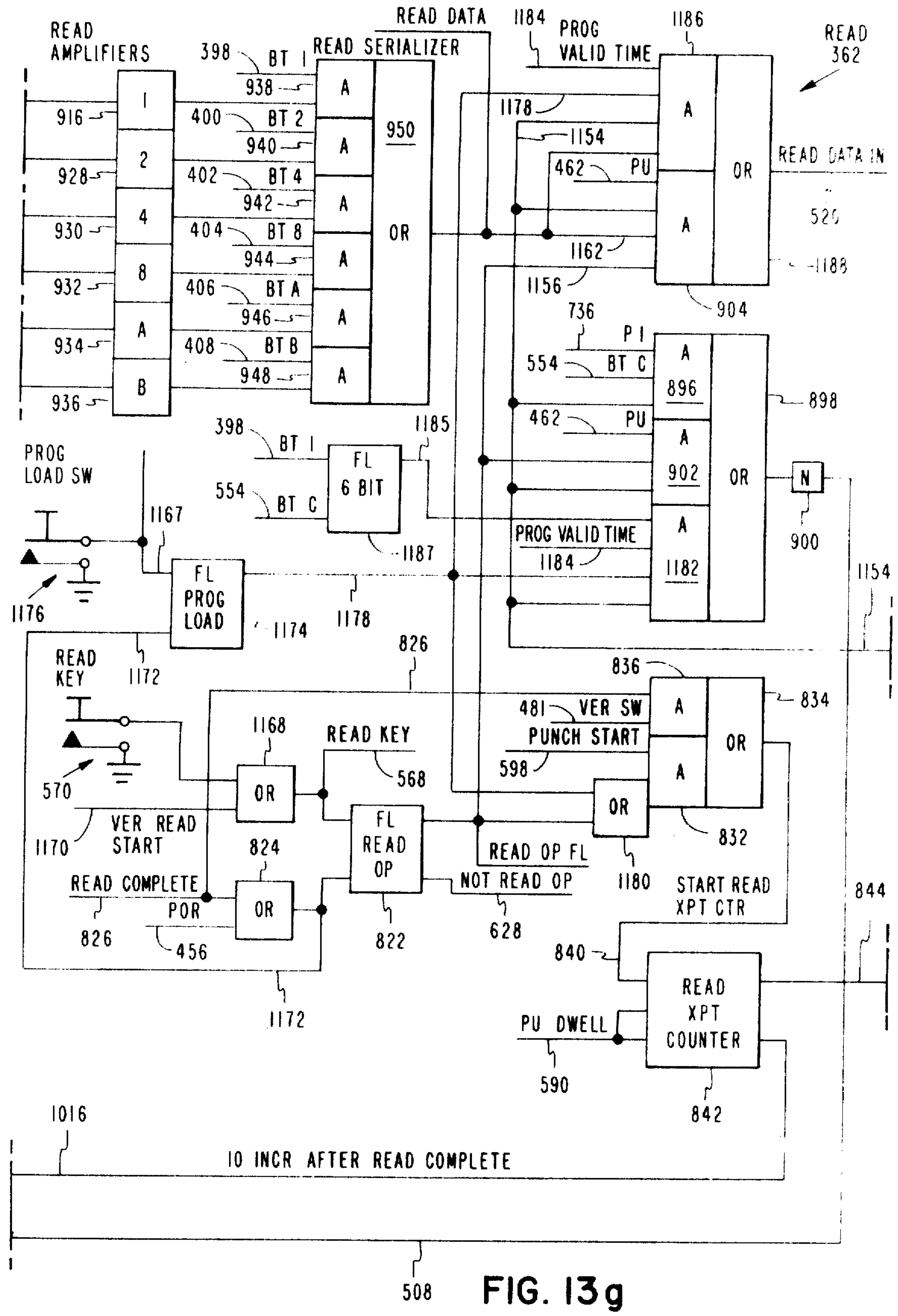
Figures 13H, 15:
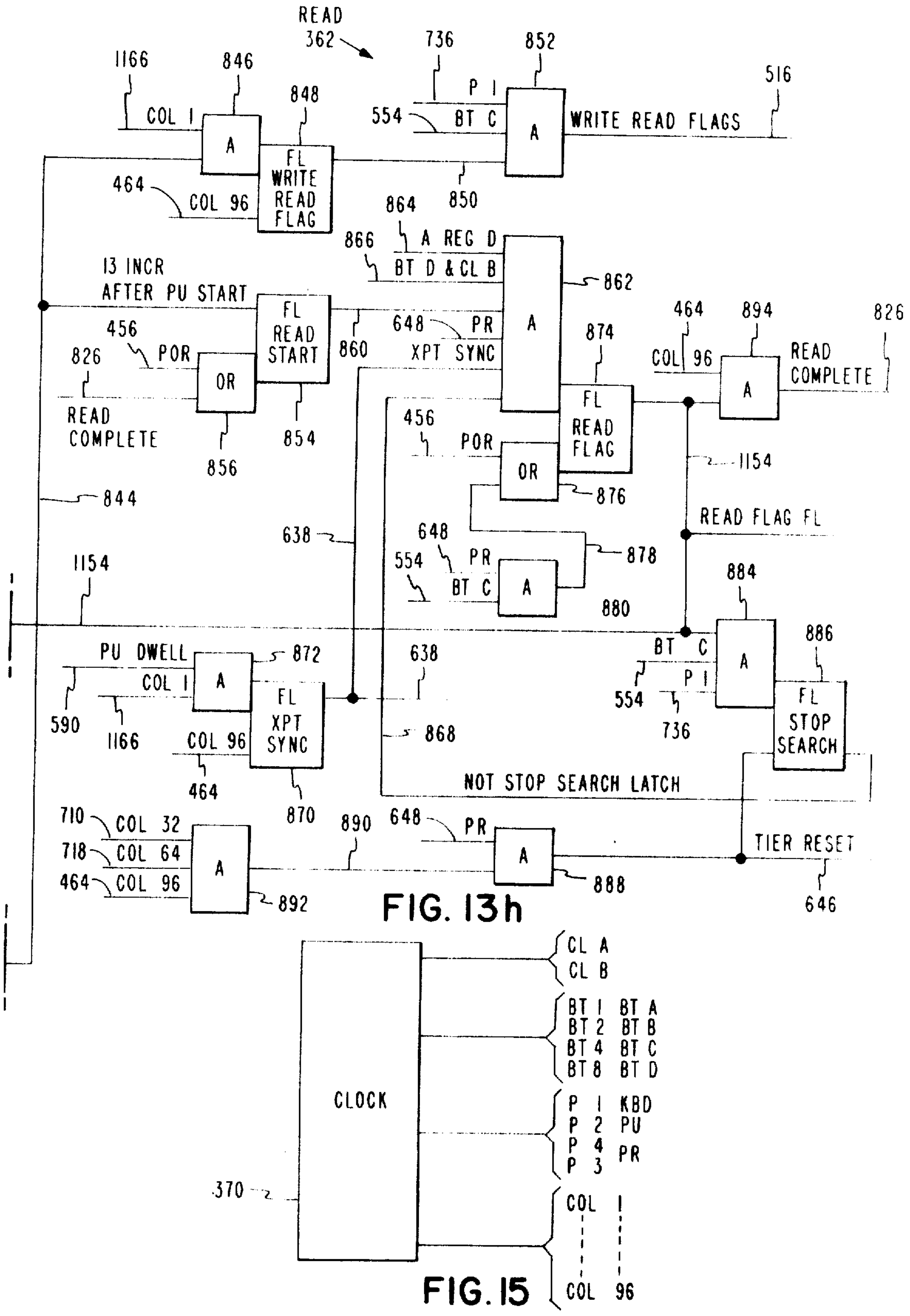
FIG. 15 is a diagram showing the clock forming a part of the electrical controls for the data recorder.
Figure 13I:
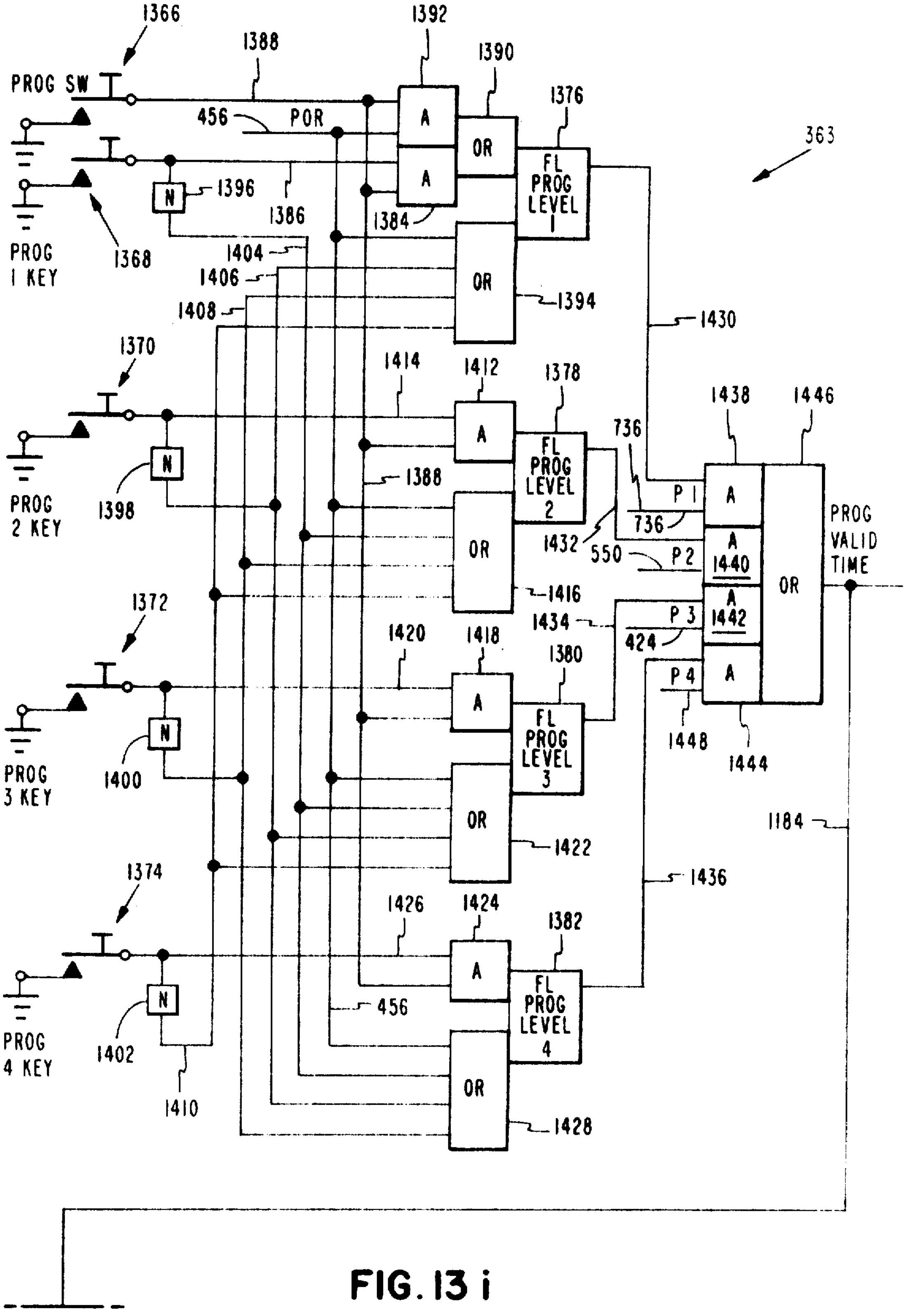
Figure 13K:
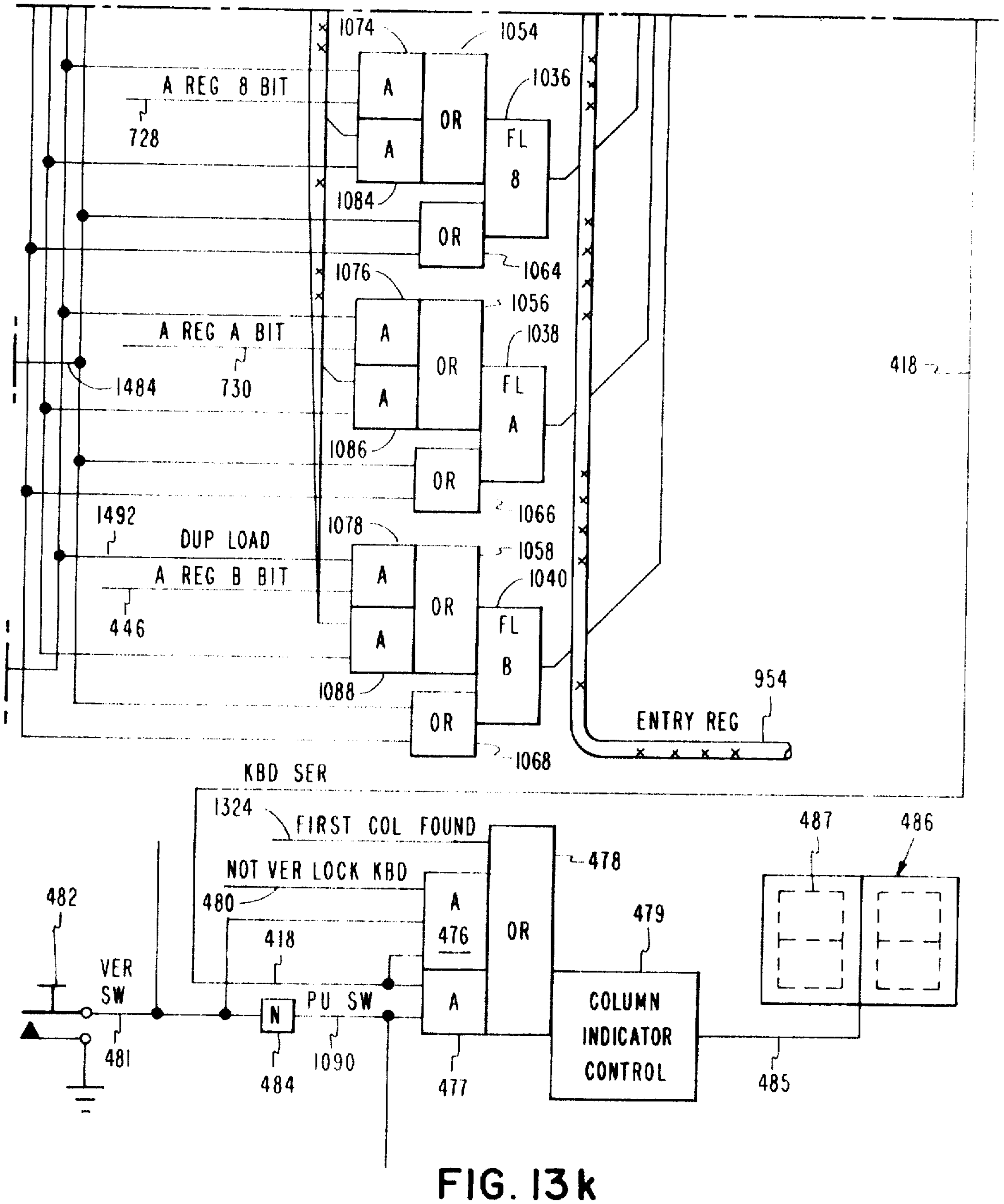

FIG. 13k shows column-indicating apparatus; and this apparatus includes two AND circuits 476 and 477 appended onto an OR circuit 478 which, in turn, is appended onto a column indicator control 479. A lead 1324 carrying the signal "first column found" is also an input to the OR circuit 478, and this signal is derived as will be subsequently explained. The AND circuit 476 has three inputs—namely, lead 418 carrying the "keyboard service" signal as previously mentioned, lead 480 carrying a signal "not verify lock keyboard", and lead 481 carrying the signal "verify switch". The signal "verify switch" is derived from a verify switch 482 in the switch bank 140. The AND circuit 477 has two inputs, one of these being the lead 418 carrying the "keyboard service" signal and the second being the lead 1090 carrying the "punch switch" signal and connected through an inverter circuit 484 with the lead 481. The column indicator control 479 is connected by means of a lead 485 with a column indicator 486 of the conventional type which includes a plurality of lighted bars 487.

The memory and control section 352 (see FIG. 13) includes the delay line 366 and A register 368 previously mentioned. The output of the delay line 366 is a lead 488, and this lead is connected to an AND circuit 490 as one of two inputs. The other input to the AND circuit 490 is an inverter circuit 492 which has an input lead 494. The AND circuit 490 is appended onto an OR circuit 496, and the OR circuit has an output in the form of a lead 498 which constitutes the input to the A register 368. The OR circuit 496 has another AND circuit 500 appended to it; and the AND circuit 500 has two inputs, one of which is the lead 494 and the other of which is a lead 502 that also constitutes the output lead from the A register 368.

An AND circuit 504 has the lead 502 as one of six inputs; and the other inputs are leads 432, 506, 508, 510, and 1122. The leads 506 and 510 carry the signals "not POR" and "erase flags" respectively derived as will be hereinafter explained. The AND circuit 504 has its output in the form of a lead 512 which constitutes one of the inputs to an OR circut 514. The OR circuit 514 has seven additional inputs; and these are leads 516, 518, 520, 522, 524, 1124, and 1126. The leads 516, 520, 522, 524, and 1126 respectively carry the signals "write read flags", "read data in", "write flags", "write error flags", and "write backspace flag"—the origins of which will be subsequently described.

The lead 1124 constitutes the output of an AND circuit 1128, and the AND circuit 1128 has two inputs in the form of delay line output lead 488 and a lead 1130 carrying the signal "A REG bypass"—the origin of which will be subsequently described. An inverter circuit 1132 is connected between the lead 1130 and the lead 1122 for providing a signal on the latter.

The lead 518 constitutes the output lead of an OR circuit 1134, and a lead 1136 constitutes the output of AND circuit 414 and is connected with OR circuit 1134. The OR circuit 1134 has an AND circuit 1138 appended to it; and the AND circuit 1138 has five inputs which are leads 481, 1140, 412, 418, and 462. The leads 481, 418, and 462 carry the signals "-verify switch", "keyboard service", and "punch" as has been previously described. The lead 1140 carries the signal "update memory latch"—the source of which will be subsequently described.

The leads 1140 and 481, carrying the signals "update memory latch" and "verify switch" respectively, constitute two of the inputs of an AND circuit 1142; and the circuit 1142 has a third input in the form of lead 462 carrying the "punch" signal. The AND circuit 1142 has a lead 1144 as an output, and this constitutes one of the inputs to OR circuit 428.

The output of the OR circuit 514 is in the form of a lead 526 constituting an input to an AND circuit 528. The AND circuit 528 has an additional input in the form of a lead 530, and the lead 530 carries the timed signal "not clock A" which is derived from the clock 370 and constitutes the inverse of the signal "clock A". The output of the AND circuit 528 is a lead 532 which constitutes the input for the delay line 366.

The memory and control section 352 includes the initialization control logic 534 (FIG. 13*c*) which has two outputs in the form of leads 456 and 536. The lead 456 carries the "POR" signal previously mentioned, and an inverter 538 is connected to the POR lead 456 so as to provide the signal "not POR" on lead 506. An OR circuit 540 has leads 536, 468, and 1146 as inputs. The lead 468 constitutes the output of the K to P transfer latch 466 and carries the signal "K to P transfer latch"; and the lead 1146 carries the signal "write keyboard flags" which is derived as will be subsequently described. The OR circuit 540 is appended onto an AND circuit 542 as one of the three inputs to the AND circuit 542. The other two inputs to the AND circuit 542 are the leads 424 and 426 respectively carrying the timed signals "P3" and "bit time D". The AND circuit 542 is appended onto an OR circuit 544 which has its output in the form of lead 522 carrying the signal "write flags".

Another AND circuit 548 is provided on the OR circuit 544 and has three inputs, one of which is the lead 426 carrying the "bit time D" signal. The second input is the lead 468 which carries the signal "K to P transfer latch", and the third input is a lead 550 carrying the timed signal "P2" derived from the clock 370. A third AND circuit 552 has three inputs, and one of these is the lead 550 carrying the timed "P2" signal. The other two inputs are leads 554 and 556. The lead 554 carries the "bit time C" signal derived from the clock 370, and the lead 556 carries the signal "print start" derived as will be subsequently described.

The lead 468 is connected as an input to an AND circuit 558 which has three inputs. The other two inputs are in the form of lead 416 carrying the timed "keyboard" signal and the lead 1090 carrying the "punch switch" signal. The AND circuit 558 is appended onto an OR circuit 560, and the output of the OR circuit 560 is the lead 494. Another AND circuit 562 is appended onto the OR circuit 560 and has two inputs—namely, leads 556 and 462. As previously mentioned, the lead 462 carries the timed signal "punch"; and the lead 556 carries the signal "print start".

The AND circuit 490, in addition to the delay line output lead 488 and inverter 492, has a third input in the form of lead 1148 which is connected through an inverter circuit 1150 to the output side of an AND circuit 1152. The AND circuit 1152 has four inputs—namely, leads 481, 1154, 462, and 1156. The leads 481 and 462 respectively carry the "verify switch" and "punch" signals as previously described. The leads 1154 and 1156 respectively carry the signals "read flags latch" and "read op latch" which are derived as will be subsequently described.

The OR circuit 496, in addition to the AND circuits 490 and 500, has an input in the form of a lead 1158 which constitutes the output of an AND circuit 1160. The AND circuit 1160 has five inputs; and these are leads 481, 1154, 1162, 462, and 1156. These leads respectively carry the signals "verify switch", "read flag latch", "read data", "punch", and "read op latch". The origin of the signal "read data" on lead 1162 will be subsequently described.

The AND circuit 1164 (see FIG. 13*c*) is provided to connect the preceding described logic with the card feed control section 354. The AND circuit 1164 is provided with four inputs—namely, leads 1165, 468, 1166, and 550. The lead 1165 constitutes the output of an OR circuit 1163 which has as inputs leads 1090 and 1230 respectively carrying the "punch switch" and "repunch latch" signals. The latter signal is derived as will be subsequently described. The lead 468 carries the signal "K to P transfer latch", and the lead 550 carries the timed signal "P2". The lead 1166 carries the timed signal "column 1" from the clock 370.

The card feed control section 354 (see FIG. 13d) comprises a pick roll latch 564 (FIG. 13*d*). The latch 564 has an OR circuit 566 on its set side; and the OR circuit 566 has three inputs, one of which is from the lead 1110 constituting the output of the AND circuit 1164 and carrying the signal "K to P feed start", another of which is lead 568 carrying the signal "read key" derived from a read key 570 on the keyboard 128, and the third of which is lead 1167 carrying the signal "program load switch" derived as will be subsequently explained.

The latch 564 has an OR circuit 572 on its reset side, and the OR circuit 572 has two inputs which are in the form of the "POR" signal lead 456 and a lead 574. The lead 574 constitutes the output of an inverter circuit 576, and the input to the inverter circuit 576 is a lead 578 that constitutes the output of the card sensor 202 and carries the signal "card sensor". The output of the latch 564 is a lead 580 that is connected to the pick roll magnet 182.

A primary incrementer latch 582 has its set side connected to the lead 580. The latch 582 has an OR circuit 584 on its reset side; and the OR circuit 584 has two input leads—namely, the POR lead 456 and a lead 586. The lead 586 constitutes the output of an AND circuit 588; and the AND circuit 588 has three inputs in the form of leads 590, 578, and 408. The leads 578 and 408 carry respectively the signals "card sensor"

and "bit time B" as previously mentioned, and the lead 590 carries the signal "punch dwell" derived as will be hereinafter described.

The primary incrementer latch 582 has its output in the form of lead 592 connected with the primary incrementer magnet 232. An AND circuit 594 has the lead 592 as one of its inputs and has additional inputs in the form of leads 578, 398, and 590 respectively carrying the signal "card sensor", the timed signal "bit time 1", and the "punch dwell " signal. The AND circuit 594 has a lead 598 as an output which carries a "-punch start" signal.

A gate latch 600 has an AND circuit 602 on its set side, and the AND circuit 602 has two inputs including the lead 578 having the "card sensor" signal thereon and the lead 580 constituting the output lead of the pick roll latch 564. The reset side of the gate latch 600 is connected with the lead 598, and the output of the gate latch 600 is a lead 604 connected to the electromagnetically energized pole piece 204.

Figure 5:
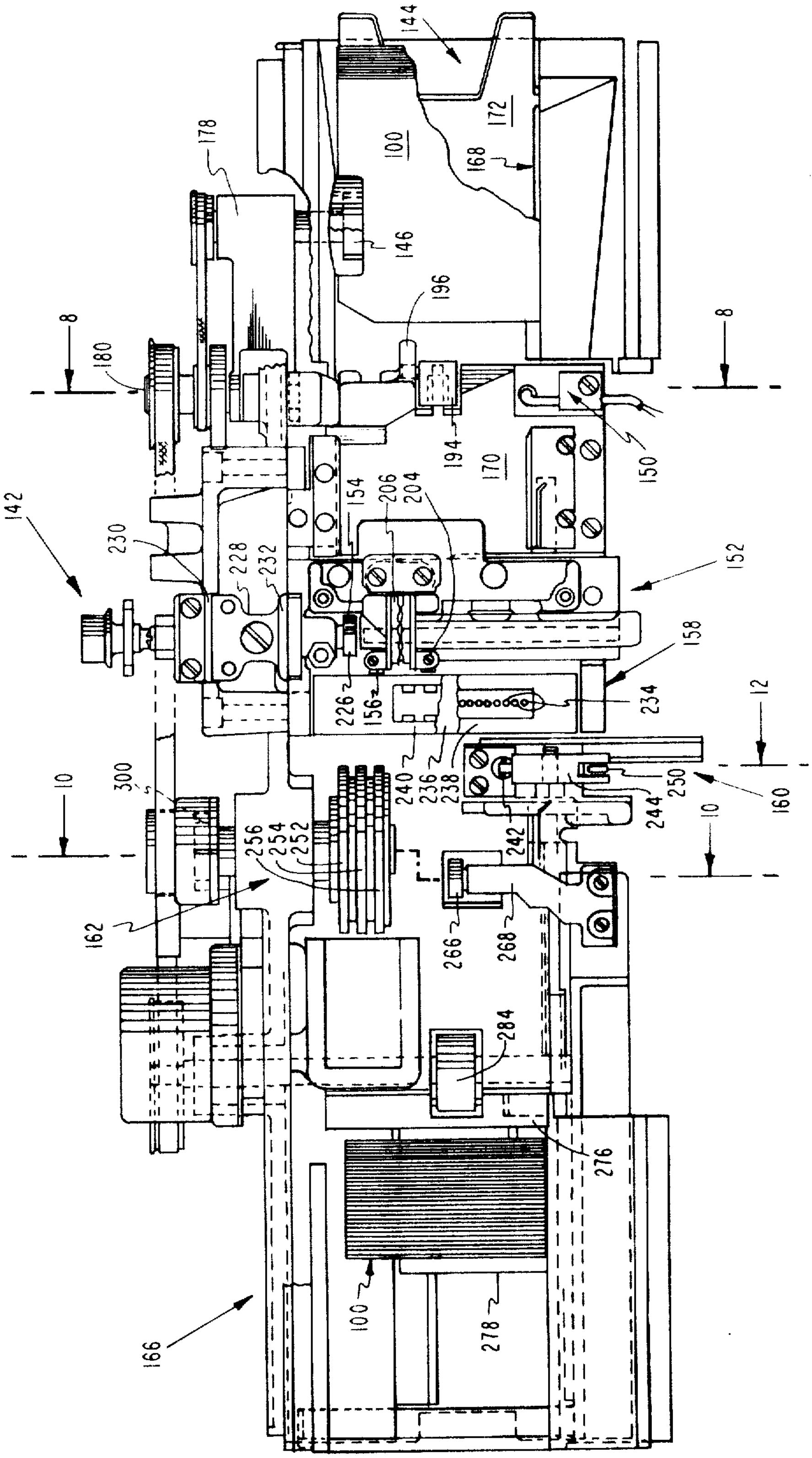
FIG. 5 is a plan view of the document card transport in the data recorder.
Figure 6:
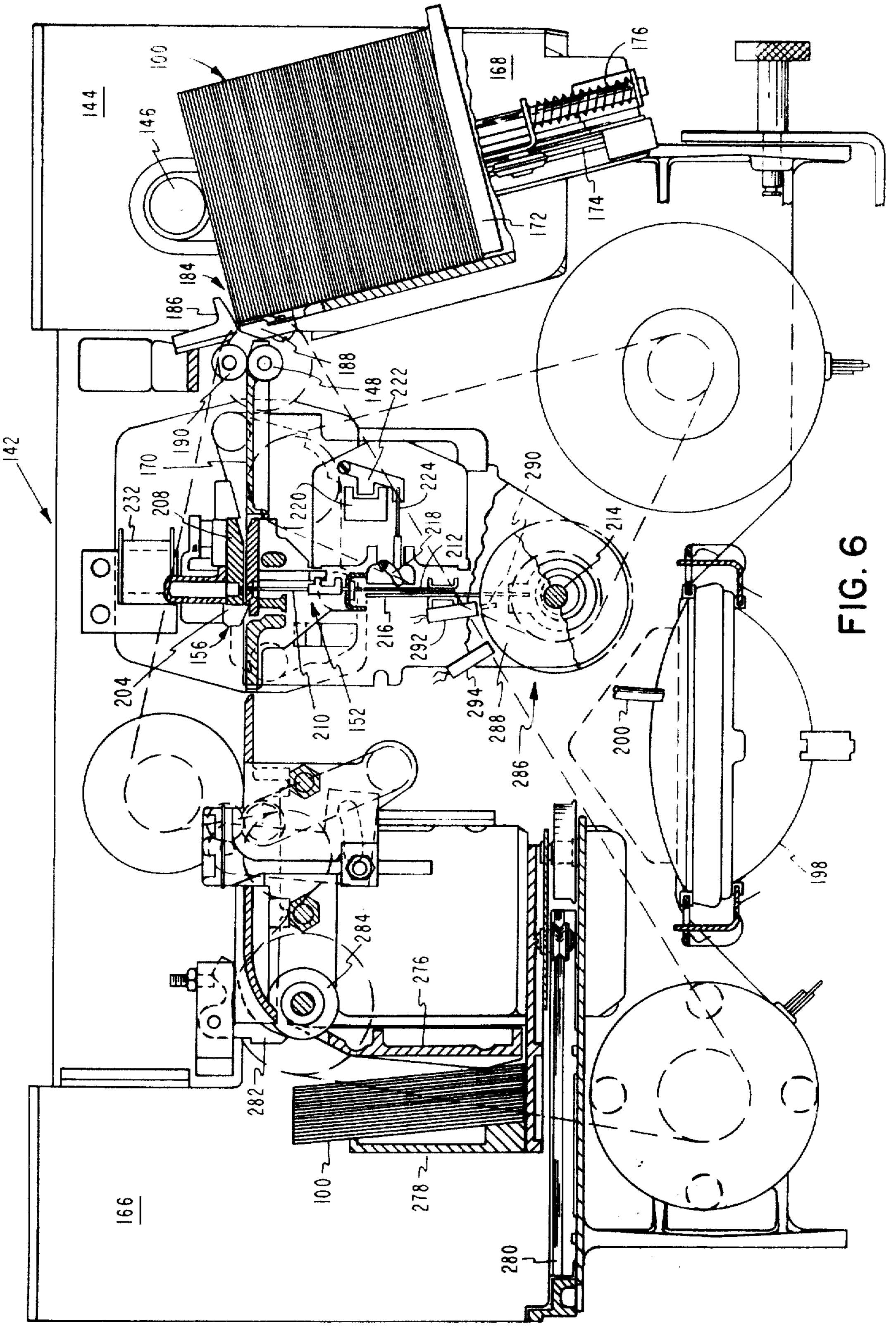
FIG. 6 is a side elevational view of the card transport.

The transport section 356, as shown in FIG. 5, has the various magnets 274, 232, and 182 and other devices previously described and includes the emitters 286 and 296. The punch emitter 286 is connected by means of a lead 606 with punch emitter amplifiers 608; and these amplifiers have outputs 590, 612, and 614 which respectively carry the signals "punch dwell", "punch off", and "punch on". The print emitters 296 are connected by means of a lead 616 with print emitter amplifiers 618, and these amplifiers have outputs in the form of leads 620 and 622 which respectively carry the signals "print home" and "print character".

The punch section 358 (see FIG. 14) comprises the punch op latch 624 having an AND circuit 626 on its set side. The AND circuit 626 has two inputs which are from a lead 628 that carries a "not read op" signal and from the lead 598 that carries the "punch start" signal. A lead 630, which carries a "-punch complete" signal, is connected to the reset side of the latch 624. The punch op latch 624 has its output in the form of a lead 632 which constitutes one of the inputs of an AND circuit 634 appended to the set side of a punch flag latch 636. The AND circuit 634 has six inputs including leads 448, 550, and 446 carrying respectively the signals "bit time 4 & clock B", "P2", and "A REG B" previously referred to. In addition, the AND circuit has the leads 638 and 640 as inputs, and the lead 638 carries a "transport sync" signal. The lead 640 constitutes the output of a latch 642 having two inputs—namely, a lead 644 on its set side and a lead 646 on its reset side which respectively carry the signals "erase punch flags" and "tier reset". The latch 636 has the lead 648 on its reset side, and the lead 648 carries the timed "print" signal from the clock 370.

The output of the punch flag latch 636 is a lead 650, and this constitutes one of the inputs to an AND circuit 652. The AND circuit 652 has three inputs, and the other two inputs are leads 550 and 426 having the timed signals "P2" and "bit time D" applied respectively thereon. The output of the AND circuit 652 is the lead 644 which is also an input to the latch 642, and an inverter circuit 654 is connected to the lead 644. The output of the inverter circuit 654 is the lead 510 carrying the "erase flag" signal.

The lead 632 constitutes one of the inputs to an AND circuit 658 which is applied onto the set side of the punch gate latch 660. The AND circuit 658 has two inputs, and the other input is the lead 614 carrying the "punch on" signal. The latch 660 on its reset side has the lead 612 carrying the "punch off" signal applied thereto. The latch 660 has its output in the form of a lead 666.

An AND circuit 668 has three inputs, one of which is the lead 650 and the other of which is the lead 462 carrying the timed "punch" signal from the clock 370. The third input to the latch 668 is a lead 670 carrying the timed signal "bit time 1 & clock B" produced by the clock 370 at the correspondence of the bit time 1 and clock B times. A lead 672 constitutes the output of the AND circuit 668 and carries a signal "load punch store".

The lead 650 is connected with another AND circuit 674 to be an input thereto. The AND circuit 674 has two other inputs, and these are leads 648 and 464 having the timed signals "print" and "column 96" thereon. The output of the AND circuit 674 is the lead 630 which carries the "punch complete" signal.

An AND circuit 678 is provided and has three inputs. Two of the inputs are the leads 550 and 638 having the timed "P2" signal and the "transport sync" signal respectively thereon. The other input constitutes lead 1166 carrying and "column 1" signal derived from the clock 370. The AND circuit 678 has an output in the form of a lead 684 carrying a "reset punch store" signal thereon.

As has been previously described, there are 18 punches 210 actuated by magnets 220. The respective magnets may be designated as magnets $220_1$ to $220_{18}$ in FIG. 14; and these magnets are energized respectively by punch drivers $686_1$ to $686_{18}$. The punch drivers $686_1$ to $686_6$ are controlled by a tier 1 punch register $689_1$; the punch drivers $686_7$ to $686_{12}$ are controlled by a tier 2 punch register $689_2$; and the punch drivers $689_{13}$ to $686_{18}$ are controlled by tier 3 punch register $689_3$. The punch register $689_1$ includes the punch latches $690_1$ to $690_6$; the punch register $689_2$ includes the punch latches $690_7$ to $690_{12}$; and the punch register $689_3$ includes the punch latches $690_{13}$ to $690_{18}$. The latches $690_1$ to $690_{18}$ are respectively connected to the AND circuits $688_1$ to $688_{18}$ which are respectively controlled by these latches. The latches $690_1$ to $690_{18}$ are respectively provided with the AND circuits $692_1$ to $692_{18}$ on their set sides.

Tier latches 694, 696, and 698 are provided to correspond to tiers 1, 2, and 3 respectively. Tier latch 694 is connected by means of a lead 700 with an AND circuit 702; and the AND circuit 702 has three inputs—namely, leads 464, 648, and 402 respectively carrying the timed signals "column 96", "print", and "bit time 4". The tier 1 latch 694 has its output in the form of lead 704. A lead 706 is connected to the reset side of the latch 694.

The latch 696 has its set side connected by means of the lead 706 with an AND circuit 708; and the AND circuit 708 has three inputs including the leads 648 and 402 carrying the "print" and "bit time 4" signals. The third input to the AND circuit 708 is a lead 710 carrying a "column 32" signal derived from the clock 370. The latch 696 has its output in the form of a lead 712. A lead 714 is connected to the latch 696 on the reset side of the latch.

The tier 3 latch 698 is connected by means of the lead 714 with an AND circuit 716 having three inputs, two of which are the leads 648 and 402 carrying the timed signals "print" and "bit time 4" respectively. The third input to the ANd circuit 716 is a lead 718 carrying a "column 64" signal derived from the clock 370. The output of the latch 698 is a lead 720, and the reset side of the latch 698 is connected to the lead 700.

Each of the AND circuits $692_1$ to $692_{18}$ has three inputs. The lead 672 is one of the inputs to each of these AND circuits. The lead 704, which carries the "tier 1 latch" signal, constitutes the second input to the AND circuits $692_1$ to $692_6$; the lead 712, which carries the "tier 2 latch" signal, constitutes the second input to the AND circuits $692_7$ to $692_{12}$; and the lead 720, which carries the signal "tier 3 latch", constitutes the second input for each of the AND circuits $692_{13}$ to $692_{18}$.

The third inputs to each of the AND circuits $692_1$ to $692_{18}$ are provided from the A register 368. The third input for the AND circuits $692_1$, $692_7$, and $692_{13}$ is the lead 722 carrying the "A REG 1" signal; the third input for the AND circuits $692_2$, $692_8$, and $692_{14}$ is the lead 724 carrying the "A REG 2" signal; the third input for the AND circuits $692_3$, $692_9$, and $692_{15}$ is the lead 726 carrying the "A REG 4" signal; the third input for the AND circuits $692_4$, $692_{10}$, and $692_{16}$ is the lead 728 carrying the "A REG 8" signal; the third input for the AND circuits $692_5$, $692_{11}$, and $692_{17}$ is the lead 730 carrying the "A REG A" signal; and the third input for the AND circuits $692_6$, $692_{12}$, and $692_{18}$ is the lead 446 carrying the "A REG B" signal. These signals are respectively secured from the triggers 1, 2, 4, 8, A, and B in the A register 368 and are indicative of the presence or absence of bits in these triggers.

The AND circuits $688_1$ to $688_{18}$ are respectively connected to the outputs of the latches $690_1$ to $690_{18}$; and, in addition, each of the AND circuits $688_1$ to $688_{18}$; is connected to the lead 666 which constitutes an input to the AND circuits. The AND circuits $688_1$ to $688_{18}$ are respectively connected to the punch drivers $686_1$ to $686_{18}$, and these punch drivers are respectively connected to the punch magnets $220_1$ to $220_{18}$.

The print section 360 (see FIG. 14) comprises the print start latch 732 which has the lead 630 connected to it on its set side. The print start latch 732 has an AND circuit 734 on its reset side; and the AND circuit 734 has three inputs. Lead 682, carrying the "column 1" timing signal, constitutes one of the inputs; and the other inputs are respectively leads 736 and 738. Lead 736 carries the "P1" signal derived from the clock 370. The output of the latch 732 is the lead 556 carrying the "-print start" signal, and this lead is connected to an AND circuit 742 disposed on the set side of a print op latch 744. The AND circuit 742 has three inputs; and two of these are the leads 550 and 464 carrying the timing signals "P2" and "-column 96" respectively. The reset side of the latch 744 has a lead 746 connected to it, and this lead at times carries a "print complete" signal. The lead 738 constitutes the output of the latch 744.

The lead 738 is connected to an AND circuit 748 which is disposed on the set side of the print flag latch 750. The AND circuit 748 has six inputs; and two of these inputs are the leads 670 and 550 carrying respectively the "bit time 1 & clock B" and "P2" timing signals. Another input is the lead 638 carrying the "transport sync" signal, and still another input is the lead 752 which carries the "A REG C" signal derived from the C trigger of the A register 368. The sixth input of the AND circuit 748 is a lead 754 which constitutes an output of a stop search latch 756. The latch 756 has a lead 758 on its set side which at times carries a signal "erase print flags" and has the lead 646 on its reset side which at times carries the signal "tier reset". The lead 736, carrying the timed "P1" signal, is connected to the print flag latch 750 on its reset side.

A lead 760 constitutes the output of the latch 750, and this constitutes one of the inputs to an AND circuit 762. The AND circuit 762 also has inputs from the leads 550 and 554 carrying the "P2" and "bit time C" timing signals. The output of the AND circuit 762 is the lead 758 carrying the signal "erase print flags". An inverter circuit 764 is connected to the lead 758 and has its output in the form of lead 510 carrying the signal "erase flags".

An AND circuit 766 has three inputs, one of which is the lead 760. The other two inputs to the AND circuit 766 are provided by the leads 648 and 670 respectively carrying the "-print" and "bit time 1 & clock B" signals. The AND circuit 766 has its output in the form of lead 768 which carries the signal "load print store"; and this lead is connected to print registers $770_1$, $770_2$, and $770_3$.

An AND circuit 776 has three inputs, namely, from leads 682, 736, and 638 respectively carrying the "column 1", "P1", and "transport sync" signals; and the AND circuit 776 has its output in the form of a lead 778 carrying the "reset print store" signal and connected with the print registers $770_1$, $770_2$, and $770_3$.

The print register $770_1$ is identical with the punch register $689_1$ and includes latches $780_1$ to $780_6$ which are respectively controlled by AND circuits $782_1$ to $782_6$. The print register $770_1$, like the punch register $689_1$, has its AND circuits $782_1$ to $782_6$ connected to the leads 722, 724, 726, 728, 730, and 446 respectively carrying the "A REG 1", "A REG 2", "A REG 4", "A REG 8", "A REG A", and "A REG B" signals; and these are indicated to come from a buss 784 from the A register 368. Also, all of the AND circuits $782_1$ to $782_6$, like AND circuits $692_1$ to $692_6$, have the lead 704 carrying the "tier 1 latch" signal as inputs. The AND circuits in the print register $770_1$ are connected to the load print store lead 768 and the latches $780_1$ to $780_6$ are connected to the reset print store lead 778, and these leads correspond to the leads 672 and 684 to which the punch register $689_1$ is connected. The outputs of the latches $780_1$ to $780_6$ are combined as separate leads in a buss 786 which applies the signals from the separate leads to a compare circuit 788.

The print register $770_2$ is identical to the register $770_1$ except that its AND circuits are connected to the tier 2 latch lead 712 in lieu of the tier 1 latch lead 704, and the register $770_2$ is thus similar to the punch register $689_2$ in this respect. The register $770_3$ is identical to the registers $770_1$ and $770_2$ except that its AND circuits are connected to the tier 3 latch lead 720 in lieu of the tier 1 latch lead 704 and tier 2 latch lead 712. The register $770_2$ is connected through a buss 790 with a compare circuit 792, and the register $770_3$ is connected through a buss 794 with a compare circuit 796. The compare circuits 792 and 796 correspond to the compare circuit 788 used in connection with the register $770_1$.

Each of the compare circuits 788, 792, and 796 is connected to a print counter 798 by means of a buss 800. The print counter 798 is energized by the "print character" and "-print home" signals in the leads 622 and 620; and this is a binary counter which counts from 0 through 63 and provides signals in leads 802, 804, 806, 808, 810, and 812 in binary fashion for this purpose, with these leads being combined in the form of the buss 800 which is applied onto the compare circuits 788, 792, and 796.

The compare circuits 788, 792, and 796 are respectively connected to driver circuits 814, 816, and 818; and these are respectively connected to magnets $260_1$, $260_2$, and $260_3$ for actuating the print hammers 258 respectively for the print rows 252, 254, and 256.

An AND circuit 820 is provided for terminating the printing operation; and this has the lead 760, constituting the output of the print flag latch 750 and leads 648 and 464 carrying the timing signals "print" and "column 96", as inputs. The output of the AND circuit 820 is the lead 746 carrying the "print complete" signal and applied on the reset side of the print of latch 744.

The read section 352 (see FIGS. 13_g_ and 13_h_) is primarily under the control of the read key 570. The read key 570 is connected as one input to an OR circuit 1168 and has, as a second input, a lead 1170 carrying the signal "verify read start" which will be obtained as subsequently described. The OR circuit has as its output the lead 568 carrying the "read key" signal. A read op latch 822 has its set side connected with the lead 568 and is connected on its reset side with an OR circuit 824 by means of a lead 1172. The OR circuit 824 has two inputs, one of which is the POR lead 456 and the other of which is a lead 826 carrying the signal "read complete". The latch 822 has two outputs—namely, the lead 1156 carrying the signal "read op latch" and the lead 628 which carries the signal "not read op".

The lead 1172 also constitutes an input to the reset side of the program load latch 1174, and the other input on the set side of the latch 1174 is from a program load switch 1176 which is disposed on the panel above the keyboard 128 and is connected to lead 1167 carrying the signal "program load switch". The program load latch 1174 has its output in the form of a lead 1178, and the two leads 1178 and 1156 constitute the two inputs to an OR circuit 1180. The OR circuit 1180 constitutes one of the inputs to an AND circuit 832, and the AND circuit 832 has a second input in the form of lead 598 carrying the signal "punch start". The AND circuit 832 is appended onto an OR circuit 834. A second AND circuit 836 is appended onto the OR circuit 834; and the AND circuit 836 has two inputs, one of which is the lead 826 carrying the "read complete" signal and the other of which is the lead 481 carrying the signal "verify switch".

The OR circuit 834 has its output in the form of lead 840 which carries the signal "start read transport counter", and the lead 840 is connected to a counter 842. The counter 842 is connected with the lead 590 carrying the signal "punch dwell", and the counter is operative for counting in response to the pulses in the punch dwell lead 590 which acts as a driver for the counter.

The counter 842 has a lead 844 as an output, and a signal is generated therein by the counter 842 thirteen increments after the counter 842 has been initially energized. The lead 844 is applied as an input to an AND circuit 846 which is appended onto the set side of a write read flag latch 848. The AND circuit 846 has two inputs, and the second input is the lead 1166 carrying the timing signal "column 1". The latch 848 has the lead 464 carrying the "column 96" timing signal attached to it on its reset side. The latch 848 has its output in the form of a lead 850, and the lead 850 constitutes one of the three inputs to an AND circuit 852. The other two inputs to the AND circuit 852 are the leads 736 and 554 respectively carrying the timing signals "P1" and "bit time C". The AND circuit 852 has the lead 516 as an output carrying the signal "-write read flags".

The lead 844, constituting the output of the counter 842, is connected on the set side of a read start latch 854. The latch 854 has an OR circuit 856 on its reset side; and the OR circuit 856 has two inputs, one of which is the POR lead 456 and the other of which is the lead 826 carrying the signal "read complete".

The read start latch 854 has its output in the form of a lead 860, and this lead constitutes one of the inputs to an AND circuit 862. The AND circuit 862 also has inputs from leads 648 and 638 carrying the timed "print" signal and the "transport sync" signal respectively and has still other inputs in the form of leads 864, 866, and 868. The lead 864 carries the signal "A REG D" which is derived from the D trigger in the A register 368, and the lead 866 carries the timing signal "bit time D & clock B" which is a pulse at the correspondence of clock B and bit time D. The "transport sync" signal carrying lead 638 constitutes the output of a transport sync latch 870 which has an AND circuit 872 on its set side. The AND circuit 872 has two inputs, one of which is the "punch dwell" signal carrying the lead 590 and the other of which is the lead 1166 carrying the "column 1" timing signal. The lead 464, carrying the "-column 96" timing signal, is connected to the latch 870 on its reset side.

The AND circuit 862 is appended on the set side of a read flag latch 874; and the latch 874 has an OR circuit 876 on its reset side having two inputs—namely, from the POR lead 456 and from a lead 878. The lead 878 constitutes the output of an AND circuit 880; and the AND circuit 880 has two inputs—namely, from the leads 648 and 554 respectively carrying the timing signals "print" and "bit time C".

The latch 874 has its output in the form of the lead 1154 carrying the signal "read flag latch", and this lead constitutes one of the three inputs to an AND circuit 884. The AND circuit 884, in addition, has inputs from the leads 554 and 736 respectively carrying the timing signals "bit time C" and "P1". The AND circuit 884 is appended on the set side of a stop search latch 886, and the latch 886 has the tier reset lead 646 connected to it on its reset side. The lead 646 constitutes the output of an AND circuit 888. The AND circuit 888 has two inputs, one of which is the lead 648 carrying the timed "print" signal and the other of which is a lead 890. The lead 890 constitutes the output of an OR circuit 892; and the OR circuit 892 has three inputs which are the leads 710, 718, and 464 respectively carrying the timing signals "column 32", "-column 64", and "column 96". The output of the stop search latch 886 is the lead 868 connected to the AND circuit 862 and providing the fifth input to the AND circuit 862.

The lead 1154 also constitutes the input to an AND circuit 894, and the AND circuit 894 has a second input in the form of lead 464 carrying the "column 96" timing signal. The output of the AND circuit 894 is the lead 826 carrying the "read complete" signal.

The lead 1154 also constitutes an input of an AND Circuit 896 (FIG. 13*g*). The AND circuit 896 has two additional inputs—namely, from leads 736 and 554 respectively carrying the "P1" and "bit time C" signals. The AND circuit 896 is appended onto an OR circuit 898, and an inverter circuit 900 is appended onto the OR circuit 898. The output of the inverter circuit 900 is the lead 508 constituting an input to the AND circuit 504 (FIG. 13*c*). The lead 1154 also constitutes an input to another AND circuit 902 appended onto the OR circuit 898, and the AND circuit 902 also has as inputs the lead 462 carrying the timed "punch" signal and the lead 1156 carrying the "read op latch" signal. A third AND circuit 1182 is appended onto the OR circuit 898. The AND circuit 1182 has leads 1154, 1184, 1185, and 1178 as inputs. The lead 1185 constitutes the output lead of a "6-bit latch" 1187 having as inputs the leads 398 and 554 respectively carrying the timed "bit time 1" and "bit time C" signals. The lead 1184 carries the signal "program valid time" which is derived as will be subsequently described. The lead 1154 also constitutes an input to an AND circuit 904. The AND circuit 904 has three additional inputs—namely, leads 1156, 1162, and 462. These leads respectively carry the signals "read op latch", "read data", and "punch". The lead 1154 is connected to still another AND circuit 1186; and this AND circuit in addition has inputs from leads 1162, 1178, and 1184—the latter carrying the signal "program valid time". The two AND circuits 904 and 1186 are appended onto an OR circuit 1188, and the output of the OR circuit 1188 is the lead 520 carrying the signal "read data in".

The read station 158 includes 18 phototransistors $234_1$ to $234_{18}$ (see FIG. 13*f*). These phototransistors are positioned in a row transversely of the movement of the cards 100 so that they may sense the openings in the three aligned columns of a tier, for example, to simultaneously sense the openings in columns 2, 34, and 66 of a card 100. Phototransistors $234_1$ to $234_6$ are positioned to detect the openings in tier 1, phototransistors $234_7$ to $234_{12}$ are positioned to detect the openings in tier 2, and phototransistors $234_{13}$ to $234_{18}$ are positioned to detect the openings in tier 3. The emitters of the phototransistors $234_1$ to $234_6$ are connected to the collector of a transistor 908 that has its base connected with the lead 704 having the signal "tier 1 latch" thereon. A transistor 910 is similarly connected to the emitters of the phototransistors $234_7$ to $234_{12}$, and the base of the transistor 910 is connected to the lead 712 carrying the signal "tier 2 latch". The emitters of the phototransistors $234_{13}$ to $234_{18}$ are similarly connected to a transistor 912 which, in turn, is connected to the lead 720 carrying the signal "tier 3 latch". The No. 1 phototransistors for each of the tiers have their collectors connected to a lead 914, and this lead is connected to a read amplifier 916 adapted to be energized when there is an opening in a No. 1 row in one of the particular columns being sensed. Similarly, the 2, 4, 8, A, and B phototransistors are connected to leads 918, 920, 922, 924, and 926 which are respectively connected to amplifiers 928, 930, 932, 934, and 936.

The amplifiers 916, 928, 930, 932, 934, and 936 are respectively connected with AND circuits 938, 940, 942, 944, 946, and 948. Each of these AND circuits has two inputs, one of which is from one of the read amplifiers just mentioned and the others of which are the leads 398, 400, 402, 404, 406, and 408 respectively carrying the timing signals "bit time 1", "bit time 2", "bit time 4", "bit time 8", "bit time A", and "bit time B". The AND circuits 938, 940, 942, 944, 946, and 948 are appended onto an OR circuit 950; and the output of the OR circuit 950 is the lead 1162 which constitutes one of the inputs to the AND circuit 904 and carries the signal "read data".

The verify section 364 includes a verify compare circuit 952 (see FIG. 13*e*). The compare circuit has inputs from the A REG buss 784 and from an entry REG buss 954, and the compare circuit 952 has an output in the form of lead 956. An inverter circuit 958 is connected to the lead 956 as an input and has its output in the form of lead 960. An AND circuit 962 has six inputs, one of which is the lead 960; and the other inputs are the lead 1315 connected as will be later mentioned, lead 418 carrying the "keyboard service " signal, lead 462 carrying the timed "punch" signal, lead 670 carrying the timed "bit time 1 & clock B" signal, and lead 1190 carrying the signal "not auto skip latch" derived as will be subsequently explained.

The AND circuit 962 has its output in the form of a lead 964 that at times carries a "verify noncompare" signal; and the lead 964 is connected to a latch 966, which may be termed a lock keyboard latch, on the set side of the latch. The latch 966 has an OR circuit 968 on its reset side; and the OR circuit 968 has three inputs— namely, leads 970, 524, and 1192. The lead 970 carries the signal "error reset key", and this signal is provided by an error reset key 974 on the keyboard 128. The lead 524 carries the signal "write error flag" as has been previously mentioned; and the lead 1192 has a signal "reset error" thereon which is derived as will be subsequently explained. The latch 966 has two outputs in the form of leads 1194 and 480. The lead 480 carries the signal "not verify lock keyboard", and this is applied to the AND circuit 476 (FIG. 13*k*) which controls the column indicator control 479. The lead 1194 is connected as an input to an OR circuit 1196, and the OR circuit 1196 has the lead 976 as its output which carries the signal "verify lock keyboard". An AND circuit 1198 has its output in the form of lead 1200 which constitutes another input to the OR circuit 1196; and the AND circuit 1198 has two inputs, one of which is the lead 481 carrying the signal "verify switch" and the other of which is a lead 1202 carrying the signal "OK to verify latch" derived as will be subsequently explained. An error light 977 is also connected to the lead 1194 as shown.

The lead 964 is connected also to an error counter 978, and the error counter 978 has two outputs in the form of leads 980 and 982. The leads 980 and 982 constitute the two inputs of an AND circuit 984, and the AND circuit has the lead 1204 as an output which at times carries a signal "column error". The lead 1204 is connected as an input of an OR circuit 1206 appended onto the set side of a latch 986 which may be termed an update memory latch. The OR circuit 1206 also has a lead 1208 as an input in addition to the lead 1204. The lead 416 carrying the timed "keyboard" signal is applied to the latch 986 on its reset side. The latch 986 has an output lead 1210 which, with the lead 964, constitutes the input to backspace control logic 1212. The logic 1212 has as its output the lead 1126 carrying the signal "write backspace flag". The latch 986 also has an output in the form of lead 1140 which carries the signal "update memory latch" and which is applied to the circuit 1138 (see FIG. 13*b*). The lead 1140 is connected to the AND circuit 990, and the AND circuit 990 has two additional inputs in the form of leads 424 and 554 carrying the timing signals "P3" and "bit time C". The output of the AND circuit 990 is the lead 524 carrying the signal "write error flag".

The verify section also includes an OR circuit 1214 (FIG. 13*n*) having two inputs in the form of leads 1216 and 1218. The lead 1218 carries the signal "record update latch", the origin of which will be subsequently described. The OR circuit 1214 has an output lead 1220 which constitutes an input to an AND circuit 994. The AND circuit 994 has two additional inputs in the form of leads 424 and 554 respectively carrying the timed "P3" and "bit time C" signals. The AND circuit has an output in the form of lead 1222 connected to an inverter 996, and the output of the inverter 996 is the lead 510 carrying the signal "erase flags".

The verify section also includes a card no good latch 998 (see FIG. 13*e*) having an AND circuit 1000 appended on its set side. The AND circuit 1000 has five inputs which are the lead 1112 carrying the "K to P transfer request latch" signal, the lead 1202 carrying the signal "OK to verify latch", the lead 730 carrying the signal "A REG A", the lead 424 carrying the timing signal "P3", and the lead 448 carrying the timing signal "bit time 4 & clock B". The latch 998 has the lead 746 carrying the "print complete" signal applied to it on its reset side.

The output of the card no good latch 998 is a lead 1002 which constitutes one of the inputs of an AND circuit 1224 constituting a part of the repunch section 359. The other input to the AND circuit 1224 is the repunch switch 1226 which is one of the switches located on the panel 140. The output of the AND circuit 1224 is the lead 1120 carrying the signal "set K to P transfer latch", and the lead 1120 is applied onto the set side of a repunch latch 1228. The card no good latch 998 also has the lead 1116 as an output carrying the signal "not card no good latch", and this lead is applied to the repunch latch 1228 on its reset side.

The repunch latch 1228 has two outputs—namely, leads 1230 and 1232. The lead 1232 constitutes an input to an AND circuit 1004, and the AND circuit 1004 has two additional inputs which are leads 468 and 1008 respectively carrying the signals "K to P transfer latch" and the timing signal "column 20". An OR circuit 1234 constitutes the output of the AND circuit 1004, and the OR circuit 1234 is appended onto the set side of a notch latch 1006. The lead 464 carrying the timing signal "column 96" is connected to the reset side of the latch 1006. The output of the latch 1006 is a lead 1010, and this lead is connected to the notch magnet 246.

The verify section also includes a secondary incrementer latch 1012 which has an AND circuit 1014 on its set side. The AND circuit 1014 has two inputs, one of which is the lead 481 carrying the "verify switch" signal and the other of which is a lead 1016 which constitutes an output of the read transport counter 842 (see FIG. 13*g*). The lead 1016 carries the signal "ten increments after read complete". The latch 1012 has an output lead 1018 connected with the second incrementer magnet 274. The reset side of the latch 1012 is connected to the K to P transfer latch lead 468.

The error counter 978 is reset by means of an AND circuit 1236 acting through an OR circuit 1238 (see FIG. 13*e*). The AND circuit has four inputs including leads 956, 418, 462, and 398. The leads 462 and 398 respectively have the timed signals "punch" and "bit time 1" thereon. The lead 418 has the signal "keyboard service" thereon, and the lead 956 is connected to the output of the exclusive OR circuit 952. The AND circuit 1236 constitutes an input to the OR circuit 1238, and the OR circuit 1238 in addition has input leads 524 and 1192 carrying signals "write error flag" and "reset error". The output of the OR circuit 1238 is a lead 1240 connected to the error counter 978.

The lead 1116 carrying the "not card no good latch" signal is connected to an AND circuit 1242 (FIG. 13*e*), and the AND circuit 1242 in addition has leads 468 and 481 as inputs. The leads 468 and 481 respectively carry the "K to P transfer latch" and the "verify switch" signals. The AND circuit 1242 is appended onto an OR circuit 1244, and a second AND circuit 1246 is appended onto the OR circuit 1244. The AND circuit 1246 has leads 481 and 746 as inputs which respectively carry the signals "verify switch" and "print complete". The OR circuit 1244 has the lead 1170 carrying the signal "verify read start" as an output.

The verify section also includes an AND circuit 1248 (FIG. 13*n*), and this AND circuit has four inputs from leads 481, 1156, 462, and 1154 respectively carrying the "verify switch", "read op latch", "punch", and "read flag latch" signals. The AND circuit 1248 has the lead 1250 as an output, and this lead carries the signal "verify read".

The lead 1250 is connected to an AND circuit 1252 as an input, and the AND circuit 1252 also has the lead 1166 carrying the timing signal "column 1" as an input. The AND circuit 1252 has its output in the form of lead 1254, and lead 1254 is connected to the set side of an erase error flag latch 1256. An AND circuit 1258 is connected on the reset side of the latch 1256, and the inputs to the AND circuit 1258 are the leads 464 and 462 respectively carrying the timing signals "column 96" and "punch". The output of the latch 1256 is the lead 1216.

The lead 1284, constituting the output of the AND circuit 1252, is connected to the set side of an OK to verify latch 1260. The latch 1260 has an output in the form of lead 1202 connected to the AND circuit 1000 and has an output in the form of lead 1118 which carries the signal "not OK to verify latch". An AND circuit 1261 is disposed on the reset side of the latch 1260 and has as inputs the leads 464, 416, and 1112 carrying the signals "column 96", "keyboard", and "K to P transfer request latch".

The repunch section 359 and the verify section 364 also include a verify transport counter 1262 having an AND circuit 1264 appended thereto and having the lead 630 carrying the signal "punch complete" as an input. The AND circuit 1264 has as inputs the lead 1230 and also the lead 590, the latter carrying the "punch dwell" signal. A lead 1266 constitutes the output of the counter 1262 and also constitutes one of the inputs to the OR circuit 1234.

The right adjust section 357 includes a right adjust start latch 1268 having an AND circuit 1270 on its set side and an AND circuit 1272 on its reset side. The AND circuit 1270 has leads 481, 722, 402, 1274, and 1276 as inputs. The leads 481, 722, and 402 carry the signals "verify switch", "A REG 1", and "bit time 4". The leads 1274 and 1276 carry the signals "-first column latch" and "program load sample" derived as will be subsequently described. The AND circuit 1272 has the leads 1278 and 402 as inputs, and the lead 402 carries the signal "bit time 4". The latch 1268 has the lead 1280 as its output.

The lead 1280 is connected as an input to AND circuits 1282 and 1284. The AND circuit 1284 also has the lead 964 as an input, and the AND circuit 1282 also has the lead 1286 as an input. Lead 1286 carries the signal "end of field latch" as will be subsequently described. The two AND circuits 1282 and 1284 are appended onto an OR circuit 1288 which in turn is appended onto the set side of a right adjust field latch 1290. The latch 1290 has the right adjust key 1292 connected to it on its reset side by means of lead 1294. The key 1292 is located on the keyboard 128.

The right adjust field latch 1290 has outputs in the form of the lead 1278 and a lead 1296. The leads 1280 and 1296 are applied as inputs to an AND circuit 1298, and this AND circuit has the lead 1096 as its output carrying the signal "right adjust skip". The leads 1280 and 1278 are applied onto an AND circuit 1300 as inputs, and this circuit has an additional input in the form of lead 400 carrying the timed signal "bit time 2". The AND circuit 1300 has as its output the lead 1192 carrying the signal "reset error".

The right adjust section also includes a right adjust last column latch 1302, and this latch has an AND circuit 1304 on its set side. The AND circuit 1304 has as its inputs leads 1278, 418, 402, and 1286. The leads 418, 402, and 1286 respectively carry the signals "keyboard service", "bit time 4", and "end of field latch". The latch 1302 has the lead 1104 as its output, and the right adjust key 1292 is connected to the reset side of the latch 1302.

The data erase section 361 (see FIG. 13*m*) comprises a field correct switch 1306, a field erase key 1308, and a record erase switch 1310. The key 1308 is located on the keyboard 128, and the field correct switch 1306 and the record erase switch 1310 are located on the switch panel 140 above the keyboard 128.

The field correct switch 1306 is connected by means of a lead 1312 carrying the signal "field correct switch" with the set side of a field correct latch 1314. Latch 1314 has lead 1315 connected to AND circuit 962 (FIG. 13*e*) An AND circuit 1316 is applied onto the reset side of the field correct latch 1314, and the AND circuit 1316 has three inputs—namely, leads 418, 1286, and 648 respectively carrying the signals "keyboard service", "end of field latch", and the timed signal "print".

An AND circuit 1318 is connected to the output of the field correct latch 1314 and has two additional inputs in the form of leads 462 and 418 respectively carrying the "punch" timed signal and the "keyboard service " signal. The lead 1208 constitutes the output of the AND circuit 1318; and, as previously described, the lead 1208 is connected to the OR circuit 1206 (FIG. 13*e*).

The lead 1208 also constitutes one of the inputs to an OR circuit 1320, and the other input to the OR circuit 1320 is the lead 1204 carrying the signal "column error". The OR circuit 1320 is appended onto the set side of a field error latch 1322, and the reset side of the latch 1322 is connected with a lead 1324 carrying the signal "first column found" which is derived as will be subsequently described.

The output of the field error latch 1322 is connected to an AND circuit 1326; and the lead 1286, carrying the signal "end of field latch" is applied to the AND circuit 1326 as a second input. An OR circuit 1328 is connected to the output side of the AND circuit 1326, and the OR circuit 1328 has the lead 1330 as its output. Lead 1330 carries the signal "set field erase". The OR circuit 1328 has two additional inputs in the form of leads 1332 and 1334. The lead 1332 is connected to the field erase key 1308 and carries a signal when the field erase key 1308 is closed. The lead 1334 is connected to an AND circuit 1336, and the AND circuit 1336 has two inputs in the form of leads 1312 and 1338. The lead 1312 carries the signal "field correct switch", and the lead 1338 is connected through an inverter circuit 1340 with the lead 1274 which carries the signal "first column latch".

The record erase switch 1310 is connected with a lead 1342 (which is applied to initialization control 534), and the leads 1332 and 1342 are applied as inputs to an OR circuit 1344. The OR circuit 1344 constitutes one of two inputs to an AND circuit 1346, and the other input of the AND circuit 1346 is the lead 481 carrying the signal "verify switch". The AND circuit 1346 is appended onto the set side of a verify erase latch 1348, and the latch 1348 has an AND circuit 1350 applied to it on its reset side. The AND circuit 1350 has two inputs in the form of the leads 1218 carrying the signal "record update latch" and the lead 648 carrying the timed signal "print".

The output of the latch 1348 is in the form of lead 1352 which is applied as one of two inputs to an AND circuit 1354. The other input to the AND circuit 1354 is the lead 1274 carrying the signal "first column latch". The AND circuit 1354 is applied onto the set side of a record update latch 1356, and an AND circuit 1358 is applied onto the reset side of the latch 1356. The AND circuit 1358 has two inputs in the form of leads 1166 and 416 respectively carrying the timed signals "-column 1" and "keyboard". The output of the latch 1356 is lead 1218 carrying the signal "record update latch".

The lead 1218 constitutes one of the two inputs to an AND circuit 1360, and the other input to the AND circuit 1360 is the lead 462 carrying the timed signal "punch". The AND circuit 1360 is applied as an input to an OR circuit 1362, and an AND circuit 1364 constitutes the other input to the OR circuit 1362. The AND circuit 1364 has four inputs which are in the form of leads 481, 488, 468, and 416 respectively carrying the signals "verify switch", "delay line output", "K to P transfer latch", and the timed signal "keyboard". The output of the OR circuit 1362 is the lead 1130 carrying the signal "A REG bypass".

The program control section 363 is under the control of a program switch 1366 (see FIG. 13*i*) , a program 1 key 1368, a program 2 key 1370, a program 3 key 1372, and a program 4 key 1374. The program switch 1366 is on the switch panel 140; and the switches 1368, 1370, 1372, and 1374 are located on the keyboard 128. The program control section 363 includes program level latches 1376, 1378, 1380, and 1382 corresponding respectively to the four program keys 1368, 1370, 1372, and 1374.

The program key 136 is connected to an AND circuit 1384 by means of lead 1386, and the second input to the AND circuit 1384 is the lead 1388 connected with the program switch 1366. The AND circuit 1384 constitutes one of two inputs to an OR circuit 1390, and the other input to the OR circuit 1390 is in the form of an AND circuit 1392. The AND circuit 1392 has two inputs in the form of leads 1388 and 456, the latter lead carrying the signal "POR". The OR circuit 1390 is applied onto the set side of the latch 1376, and an OR circuit 1394 is applied onto the reset side of the latch 1376. The program keys 1368, 1370, 1372, and 1374 are respectively connected through inverter circuits 1396, 1398, 1400, and 1402, to leads 1404, 1406, 1408, and 1410. The OR circuit 1394 has four inputs, one of which is the lead 456 carrying the "POR" signal and the others of which are leads 1406, 1408, and 1410 just mentioned.

An AND circuit 1412 is applied onto the set side of the latch 1378, and this AND circuit has two inputs in the form of lead 1388 and a lead 1414 connected with key 1370. An OR circuit 1416 is applied onto the reset side of the latch 1378, and the OR circuit 1416 has the leads 456, 1404, 1408, and 1410 as inputs. An AND circuit 1418 is applied onto the set side of the latch 1380, and this AND circuit has a lead 1420 connected with the key 1372 and also the lead 1388 as inputs. An OR circuit 1422 is applied onto the reset side of the latch 1380 and has the leads 456, 1404, 1406, and 1410 as inputs. An AND circuit 1424 is applied to the set side of the latch 1382 and has inputs in the form of lead 1388 and a lead 1426 connected to the key 1374. An OR circuit 1428 is applied onto the reset side of the latch 1382 and has leads 456, 1404, 1406, and 1408 as inputs.

The latches 1376, 1378, 1380, and 1382 have outputs in the form of leads 1430, 1432, 1434, and 1436; and these leads are respectively connected as inputs to AND circuits 1438, 1440, 1442, and 1444, all of which are applied as inputs on an OR circuit 1446. The AND circuits 1438, 1440, 1442, and 1444 respectively have the leads 736, 550, 424, and 1448 applied as inputs thereto; and these leads respectively carry the timed signals "P1", "P2", "P3", and "P4" derived from the clock 370. The OR circuit 1446 has as its output the lead 1184 carrying the signal "program valid time".

The program control section 363 includes an auto skip latch 1450 (FIG. 13*j*), an auto dup latch 1452, and an end of field latch 1454, all of which are indirectly under the control of the signal "program valid time" on the lead 1184. The lead 1184 is connected as an input to an AND circuit 1456, and the AND circuit 1456 has two additional inputs in the form of leads 418 and 670 respectively carrying the signals "keyboard service" and the timed signal "bit time 1 & clock B". The output of the AND circuit 1456 is the lead 1276 carrying the signal "program load sample". The lead 1276 constitutes the input to AND circuits 1458, 1460, and 1462 respectively applied onto the set sides of the latches 1450, 1452, and 1454. The AND circuit 1458 has the lead 730 carrying the signal "A REG A" as a second input, the AND circuit 1460 has the lead 728 carrying the signal "A REG 8" as a second input, and the AND circuit 1462 has the lead 446 carrying the signal "A REG B" as an additional input.

An AND circuit 1464 (FIG. 13*j*) has three inputs in the form of leads 418, 648, and 402 respectively carrying the "-keyboard service" signal, the timed signal "print", and the timed signal "bit time 4". The AND circuit 1464 constitutes an input to an OR circuit 1466, and the other input to the OR circuit 1466 is the lead 456 carrying the signal "POR". A lead 1468 constitutes the output of the OR circuit 1466, and this lead is applied onto the reset sides of the latches 1450, 1452, and 1454.

The latch 1450 has the leads 1098 and 1190 as outputs respectively carrying the signals "auto skip latch" and "not auto skip latch". The latch 1452 has the lead 1100 as its output carrying the signal "auto dup latch". The latch 1454 has the lead 1286 as its output carrying the signal "end of field latch".

The lead 1286 carrying the signal "end of field latch" is applied onto an AND circuit 1470, and the AND circuit in addition has as inputs the leads 400, 418, and 648 carrying the timed signal "bit time 2", the signal "keyboard service", and the timed signal "print" respectively. The AND circuit 1470 is appended onto the set side of a first column latch 1472, and this latch has as its output the lead 1274 carrying the signal "-first column latch". An OR circuit 1474 is appended onto the reset side of the latch 1472, and the OR circuit 1474 has as inputs the lead 456 carrying the "POR" signal and an AND circuit 1476. The AND circuit 1476 has as its inputs the leads 418, 648, and 398 respectively carrying the "keyboard service" signal, the timed "print" signal, and the "bit time 1" signal.

The lead 1286 is also connected as an input to the field erase control logic 1478, and this logic in addition has the leads 1274 and 1330 as inputs which respectively carry the signals "first column latch" and "set field erase". The logic 1478 has the leads 1324 and 1146 as outputs which respectively carry the signals "first column found " and "write keyboard flags".

The lead 1100, constituting the output of the auto dup latch 1452, is connected as one of the inputs to an OR circuit 1480; and the OR circuit 1480 has the lead 1096 carrying the signal "right adjust skip" as a second input. The OR circuit 1480 constitutes one of the inputs of an AND circuit 1482, and the circuit 1482 also has as inputs the leads 424 and 426 respectively carrying the timed signals "P3" and "bit time D". The AND circuit 1482 has as its output a lead 1484 which carries the signal "reset entry register".

The lead 1100 carrying the signal "auto dup latch" is applied to an AND circuit 1486 as an input; and the AND circuit 1496 has as additional inputs the leads 670, 416, and 481 respectively carrying the signals "bit time 1 & clock B", "-keyboard", and "verify switch". The AND circuit 1486 constitutes the input to an OR circuit 1488, and the OR circuit 1488 has an AND circuit 1490 as an additional input. The AND circuit 1490 has the leads 1100, 670, 462, and 1090 as inputs; and these leads respectively carry the signals "auto dup latch", "bit time 1 & clock B", "punch", and "punch switch". The output of the OR circuit 1488 is a lead 1492 carrying the signal "dup load".

The signals "reset entry register" on lead 1484 and "dup load" on lead 1492 control the entry register 372; and the lead 1484, in addition to the lead 1092 carrying the signal "-keyboard control reset", is connected as an input to each of the OR circuits 1048, 1060, 1062, 1064, 1066, and 1068 (FIGS. 13*a* and 13*k*). The lead 1492 is connected as an input to the AND circuits 1044, 1070, 1072, 1074, 1076, and 1078; and these circuits respectively have as additional inputs the leads 722, 724, 726, 728, 730, and 446 carrying the signals "A REG 1", "A REG 2", "A REG 4", "A REG 8", "A REG A", and "A REG B".

In operation, the initialization control 534 is first energized in order to condition the machine for operation. Energization of the initialization control 534 applies a "POR" signal on the lead 456; and, as has been previously described, this lead is connected to the reset sides of the various latches in the system; and the "POR" signal thus has the effect of resetting the various latches. The "POR" lead 456 is, for example, connected to the latches 450 and 466 respectively through the OR circuits 452 and 470.

Energization of the initialization control logic 534 also has the effect of providing a signal in the lead 536 which has the effect of writing keyboard flags for the 96 columns of data circulating through the delay line 366 and the A register 368. This circulating data takes the form shown in FIG. 4; and the circulation is controlled by clock 370 so that the data passing any one point in the data loop, including delay line 366 and A register 368, is synchronized with the column, character, and bit times shown in FIG. 16. It will be observed from FIG. 4 that the D bit in the P3 character for each of the 96 columns constitutes the keyboard flag for each column. The signal is the lead 536 is applied through OR circuit 540 onto AND circuit 542; and the AND circuit 542, having the timing signals "P3" and "bit time D" from leads 424 and 426 also applied thereto, provides a signal in the write flags lead 522 through the OR circuit 544 at P3 time and bit time D for each of the 96 columns. This signal in the lead 522 is applied through OR circuit 514 onto the lead 526 constituting a part of the loop for the data circulating through the delay line 366 and A register 368; and, therefore, a keyboard flag has thus been written in the data loop for each of the 96 columns. The signal provided by the logic 534 in the lead 536 may exist for a duration of 5.4 milliseconds which is the time for one complete memory cycle and is sufficiently long so as to provide all of the 96 keyboard flags.

The 96 columns of data circulating through the data loop including the delay line 366 and A register 368 circulates from the OR circuit 514 through the lead 526, the AND circuit 528, and the lead 532 into one end of the delay line 366. The data is clocked into the delay line by virtue of the "not clock A" signal in the lead 530—the "clock A" signal being a signal of 500 nanoseconds duration. Since, under these condition, there is no signal on the lead 494, the inverter 492 provides a constant input on the AND circuit 490; and, likewise, the inverter 1150 provides a constant input on the AND circuit 490 since the AND circuit 1152 does not have all of its inputs satisfied at this time. Therefore, the 96 columns of data flow serially from the delay line 366 through lead 488, AND circuit 490, OR circuit 496, and lead 498 into the A register 368. The A register 368 comprises eight triggers—one for each of the 1, 2, 4, 8, A, B, C, and D bits in a column; and the register 368 thus, at one time, contains the contents of a single column. The data emerges from the register 368 and flows through lead 502, AND circuit 504, and lead 512 back to the OR circuit 514. Ordinarily, the leads 510, 508, 506, 1122, and 432 have signals on them so as to allow the free circulation of the data from the lead 502 to the lead 512 and OR circuit 514. In this connection, the inverters 654, 764, 996, 900, 538, 1132, and 430 should be noted. As has been mentioned, at this time there is also no signal on the lead 494. Therefore, the AND circuit 500 does not have all of its inputs satisfied; and the data flowing through the lead 502, therefore, cannot shunt the AND circuit 504, the OR circuit 514, and the delay line 366.

Although the entry of only the keyboard flag in the bit D position of the character P3 for each of the 96 columns of data has been described, other bits may also be entered by means to be hereinafter described into the various characters for the 96 columns circulating in the data loop including the delay line 366 and A register 368. Such additional bits may include bits 2, 4, 8, A, and B, for example, in the various characters P1, P2, P4, and P3 indicating numeric shift, lower shift, auto dup, auto skip, and end of field (see FIG. 4).

After the machine has been set for operation by energizing the initialization control logic 534, one of the data keys 132 or the space key 134 on the keyboard 128 may be depressed for the purpose of making the corresponding entry in the data for column 1 circulating through the delay line 366 and A register 368. The keyboard 128 includes encoding logic for the purpose of raising one or more of the 1, 2, 4, 8, A, and B bits. For example, the bits 1, 2, and A are raised for the letter "T" (see FIG. 1). These raised bits are transmitted through the buss 373 to the entry register 372, and the entry register 372 stores these bits in its various latches. Depression of the space key 134, incidentally, preferably does not raise any of the bits 1, 2, 4, 8, A, and B. The bits 1, 2, and A corresponding to the letter "T" are, for example, stored in the latches 1030, 1032, and 1038. This data is transmitted through the AND circuit 1046 and OR circuit 1042 to the set side of the latch 1030 for the 1 bit; and, correspondingly, the latches 1032 and 1038 are set due to data being transmitted through the AND circuit 1080 and OR circuit 1050 for the latch 1032 and through the AND circuit 1086 and OR circuit 1056 for the latch 1038. These AND circuits 1046, 1080, and 1086 have their inputs satisfied at this time since the "keyboard control" signal in lead 436 exists at this time, when one of the data keys 132 or the space key 134 is actuated.

The keyboard 128 includes a conventional system of interlock balls that prevents the simultaneous depression of more than one of the data keys 132 or the space key 134 at a time. This interlock ball system is also under the control of the keyboard restore magnet 442 so that, when the magnet 442 is energized, the keyboard is normally operable so that a data key 132 or the space key 134 may be depressed.

In ordinary operation, the keyboard 128 and keyboard control logic 434 cooperate to first de-energize the magnet 442 so as to temporarily lock the keyboard 128 to prevent any of the data keys 132 or the space key 134 from being depressed once one of these keys has been depressed. Immediately thereafter, the keyboard control logic 434 is operative to again energize the magnet 442 so that the keyboard 128 is restored back into operative condition to allow one of the data keys 132 or the space key 134 to be actuated.

The keyboard control logic 434, energized by the "-keyboard control" signal in lead 436 also provides an "any data key" signal on the lead 438 on the depression of a data key 132 or the space key 134; and this signal is applied to the AND circuit 444 through the OR circuit 1094. The purpose of the AND circuit 444 is to scan memory and more particularly the A register 368 for the presence of a keyboard flag, which is in the D position of the P3 character for each of the 96 columns, once the machine has been put into operating condition as above described. The AND circuit 444, as above mentioned, has the inputs inhibit keyboard service, A REG B, P3, and bit time 4 & clock B from the leads 1104, 446, 424, and 448; and if a keyboard flag exists in a particular column, it will exist in the B trigger of the A register 368 at P3 time and at bit time 4 & clock B time. The signal "inhibit keyboard service" exists at this time, since the latch 1302 (see FIG. 13*n*) is in reset condition at this time. The inputs to the AND circuit 444 will thus all be satisfied at the existence of a keyboard flag and upon depression of one of the data keys 132 or the space key 134; and thus, upon the location of a keyboard flag by the AND circuit 444, the keyboard service latch 450 will be set. The any data key lead 438 has a signal first raised on it at column 1 time due to any suitable control of the keyboard control logic 434 by the clock 370; and, therefore, the AND circuit 444 is effective to start examining the circulating data for a keyboard flag starting in column 1. Thus, the keyboard service latch 450 is set at column 1, P3, bit time 4, and clock B.

The keyboard service latch 450 has its output on the lead 418 applied onto the AND circuit 414. The signal "punch switch" on lead 1090 exists at this time; and thus, when the keyboard service latch 450 is set and at keyboard time existing as a signal on lead 416 applied to AND circuit 414, three of the four inputs of the AND circuit 414 are raised.

The data in the entry register 372 provided by a depression of one of the data keys 132 (or the lack of data in the entry register 372 provided by the depression of the space key 134) is gated in serial form to the AND circuit 414 as a third input to the AND circuit 414. The bits 1, 2, 4, 8, A, and B in the entry register 372 are respectively applied onto the AND circuits 374, 376, 378, 380, 382, and 384 through the leads 386, 388, 390, 392, 394, and 396; and respectively at bit times 1, 2, 4, 8, A, and B applied as signals through leads 398, 400, 402, 404, 406, and 408 on these AND circuits, these AND circuits become operative to transmit the respective bits through the OR circuit 410 and lead 412 to the AND circuit 414. The bits are thus serialized by these AND circuits; and the bits are transmitted in serial form at keyboard time through the AND circuit 414, lead 1136, OR circuit 1134, lead 518, and OR circuit 514 to the data loop which includes the delay line 366 and A register 368.

The keyboard service latch 450 is subsequently reset at P3, bit time 2, due to the application of these timed signals on the AND circuit 458 and thereby onto the reset side of the latch 450 through the OR circuit 452.

The "keyboard service" signal in lead 418 is also effective on the AND circuit 422 which also has the timing signals "P3" and "bit time D" applied to it as inputs from the leads 424 and 426. Therefore, while the "keyboard service" signal is raised and at the times P3 and bit time D, the AND circuit 422 is satisfied and provides a signal through OR circuit 428 to the inverter 430. Therefore, at this time, the signal on lead 432 applied to AND circuit 504 is discontinued; and the AND circuit 504 is ineffective for allowing flow at this particular time through the data loop to the delay line 366. At this particular time, the keyboard flag for column 1 is about to pass through the AND circuit 504; and since the AND circuit 504, at this particular time, is not effective for passing data therethrough, the AND circuit 504 has the effect of erasing the keyboard flag for column 1 in the data flow through the data loop.

The "keyboard service" signal on lead 418 is also effective on the AND circuit 420, which also has the timed input "-keyboard " from the lead 416; and, therefore, during keyboard time, the AND circuit 420 is satisfied and transmits a signal through OR circuit 428 to the inverter circuit 430. The inverter circuit 430 has the same effect on the AND circuit 504 as just described; and, therefore, since there is no signal in lead 432 during KBD time while the "keyboard service" signal 418 is raised, the AND circuit 504 is effective to erase any data that may be present at this time in the keyboard character of column 1 in the data circulating through the data loop. Such data, for example, may be present due to a preceding record. Thereupon, as above described, the new data from the entry register 372, occurring because of the depression of the first data key 132, is entered into the data loop through the AND circuit 414 and OR circuit 514 in the keyboard character of column 1 of the data circulating through the data loop.

The actuation of a second key 132 or of the space key 134 has the effect of searching for and locating a keyboard flag in the second column of data circulating through the data loop including the delay line 366, erasing this keyboard flag, erasing any data in column 2, and also in entering the data due to the actuation of the key in the same manner as just described in connection with actuation of the first key of the keyboard 128. The AND circuit 444 is effective in this case for searching out the first keyboard flag following column 1; and this is, of course, found in column 2. Subsequent actuation of additional data keys 132 or the space key 134 is effective in the same manner for entering data in the remainder of the 96 columns of data circulating through the data loop.

The "keyboard service" signal in lead 418 also has another function and that is with respect to the column indicator 486. The lead 418, carrying the "keyboard service" signal, is applied to AND circuit 477. Each time that the "keyboard service" signal is provided in lead 418, the AND circuit 477 is satisfied since, under the conditions as so far described, there is no "verify switch" signal in lead 481; and the inverter circuit 484 provides the "punch switch" signal in lead 483 which is one of the inputs to AND circuit 477. The "keyboard service" signal is thus transmitted through AND circuit 477 and OR circuit 478 to the column indicator control 479, and the control 479 is effective through lead 485 to update the column indicator 486 for each application of the "keyboard service" signal. The column indicator 486 initially registers the digit "1"; and on the first application of the "keyboard service" signal, the column indicator 486 is updated to show the digit "2" thereon thus indicating that the next entry of data will be in column 2. Likewise, the column indicator 486 is updated for all of the 96 columns of data as the data is entered into the circulating data loop.

Thus, it is apparent that on each actuation of a data key 132 or the space key 134, a keyboard flag is located in the data circulating through the data loop including the delay line 366 and the A register 368. This keyboard flag is erased; any data in the particular column under consideration is also erased; the new data is loaded into this column position in the circulating data; and this data, along with any other data in the circulating loop, continues to circulate. In addition, the column indicator 486 is updated on each depression of a data key 132 or the space key 134. The circulation of data through the data loop is in serial form, and the data for any particular character is loaded into the entry register 372 in parallel. This data is then serialized at bit time 1 through bit time B by the AND circuits 374, 376, 378, 380, 382, and 384 so that the data is loaded serially by bits into the data loop.

Subsequent to the entry of data into all of the 96 columns of data circulating in the data loop, the next main operation performed by the machine is to punch one of the cards 100 so that it contains punched openings therethrough corresponding to all of the 96 columns of data that have been entered into the data loop including the delay line 366. First, however, before a card 100 can be so punched, it must be fed from the hopper 144 to a position in the punch 152. Card feed is initiated by the K to P transfer latch 466; and this latch also has the effect, in general, of indicating to the logic that an entire record of 96 columns has been entered into the circulating data loop. In particular, the latch 466, in addition, causes the transfer of data entered into the keyboard sections of the data circulating through the delay line 366 into the PU or punch sections of this data, preparing the machine for punching by writing punch flags in the circulating data and writing new keyboard flags in the circulating data for the entry of the next record. The punch flags are written in the D bit position of the P2 character for each of the columns of data circulating through the delay line 366; and as previously mentioned, the keyboard flags exist in the D bit position of the P3 character for each of the 96 columns.

The K to P transfer latch 456 is under the control of the K to P transfer request latch 1108 and the AND circuit 460. The K to P transfer request latch 1108 in turn is under the control of AND circuit 1106 on the set side of the latch 1108; and, as will be observed, the timed signals "column 96", "punch", and "bit time 4" are applied as inputs to the AND circuit 1106 together with the "keyboard service" signal in lead 418. Therefore, during column 96, after the "keyboard service" signal appears, the K to P transfer request latch 1108 is set so as to provide the "K to P transfer request latch" signal on its output lead 1112 to the AND circuit 460. The AND circuit 460 also has the timed signals "column 96", "punch", and "bit time 4" applied to it; and all of the inputs, therefore, to the AND circuit 460 will be supplied at the same time that the inputs for the AND circuit 1106 are supplied assuming that the signals "not card no good latch" on lead 1116 and "not OK to verify latch" on lead 1118 are present as is the case under these conditions.

Therefore, after the entry of an entire record of 96 columns has been completed into the data loop including the delay line 366, the K to P transfer signal is raised in the lead 468; and this signal is supplied to the OR circuit 540. As has been previously described, this OR circuit was supplied by a signal in lead 536 from the initialization control logic 534 for the purpose of writing keyboard flags in the P3 and bit time D positions of the data circulating in the delay line 366 (the "P3" and "bit time D" signals are provided to the AND circuit 542 for this purpose); and, therefore, keyboard flags will be written in the P3, bit time D positions in each of the 96 columns of data circulating through the delay line 366 in the same manner as the keyboard flags were initially written under the control of the initialization control logic 534. It will be observed that the K to P transfer latch is reset at bit time 2, punch, and column 96 since these timing signals are effective on the AND circuit 474. The K to P transfer latch 466 is thus effective for substantially one complete memory cycle; therefore, keyboard flags are written into the data circulating through the delay line 366 for all 96 columns so that this data is in condition for the entry of new data for another record.

The "K to P transfer latch" signal on lead 468 is also supplied to the AND circuit 1164 (see FIG. 13c) which has the additional "column 1" and "P2" signals supplied to it; and, therefore, the "K to P feed start" signal on lead 1110 is supplied at column 1 and P2 times. The "K to P feed start" signal in lead 1110 is supplied to the reset side of the K to P transfer request latch 1108; and, therefore, the latch 1108 is reset immediately after having been set and supplying the "K to P transfer request latch" signal in lead 1112 and causing the "K to P transfer latch" signal to exist in lead 468.

The "K to P transfer latch" signal in lead 468 is also applied onto AND circuit 548, and it will be observed that the AND circuit 548 also has the "bit time D" and "P2" timing signals applied to it from leads 426 and 550. Therefore, all of the inputs to the AND circuit 548 are satisfied at this time; and a "-write flags" signal is thus supplied through the OR circuit 544 at these times onto lead 522. This signal is transmitted through the OR circuit 514 onto the lead 526 in the data loop; and since punch flags are at bit position D in character P2, punch flags are thus written in all of the 96 columns of circulating data in the delay line 366 at the same time as the keyboard flags have been rewritten as just described.

The transfer of data from the keyboard character to the punch character in each of the 96 columns of data circulating through the delay line 366 is accomplished by means of the action of AND circuits 490 and 500. The "K to P transfer latch" signal in lead 468 is also applied onto AND circuit 558, and this AND circuit also has the timed "keyboard" signal on lead 416, as well as the "punch switch" signal on lead 1090, applied to the AND circuit 558. The "punch switch" signal exists continuously at this time; and, therefore, at each keyboard time, a signal is applied onto the lead 494 through the OR circuit 560. Lead 494 applies a signal to the inverter circuit 492, and the inverter circuit 492 functions to discontinue one input to the AND circuit 490 at every keyboard time while the "K to P transfer latch" signal is present on lead 468. Therefore, the output of the delay line 366 is prevented from being gated into the A register 368 at keyboard time during this period. The signal on lead 494 is also applied as one input to the AND circuit 500; and, therefore, at keyboard time, the AND circuit 500 is enabled and the output of the A register 368 is gated back into the input of the A register. Thus, the action of the AND circuits 490 and 500 is to block the entry of data from the delay line 366 to the A register 368 at keyboard time and instead gate the keyboard character which is in the A register 368 at this time back into the A register during the succeeding character which is the PU or punch character. Therefore, the keyboard character has been loaded back into the PU or punch section of the particular column of data circulating in the data loop which includes the delay line 366. At the same time, however, the keyboard character is being gated back into the input end of the delay line 366 by means of the lead 502, AND circuit 504, lead 512, OR circuit 514, and lead 526. Therefore, actually, the data existing previously only in the keyboard character is located both in the keyboard character and the punch column under consideration. This transfer of data continues for the entire time of 96 columns during which the K to P transfer latch 466 is set. As has been previously mentioned, the AND circuit 420 is effective for erasing the keyboard data just prior to the entry of new keyboard data by the actuation of another data key 132 or space key 134.

The "K to P feed start" signal on lead 1110 has the effect of setting the pick roll latch 564 (FIG. **13*d*) through the OR circuit 566. A signal is thereby produced on lead 580 for the purpose of energizing the pick roll magnet 182, and the constantly rotating pick roll 146 is dropped onto the uppermost card 100 in the hopper 144. The card is then fed out of the hopper toward the transport roll 148 and the card sensor 150. The car sensor 150, when uncovered by a card 100, provides a "card sensor" signal in lead 578; and when the card 100 is fed from the hopper 144 and covers the sensor 150, this signal is discontinued. The card sensor lead 578 is connected with the inverter circuit 576; and when the "card sensor" signal disappears with coverage of the card sensor by a card 100, a signal is applied through the lead 574 onto the reset side of the pick roll latch 566 which is reset at this time. The pick roll magnet 182 is thus de-energized; and the pick roll 156 is lifted off the card 100 being fed through the transport. Further movement of the card to the primary incrementer wheel 154 is maintained by the feed roll 148**.

The primary incrementer latch 582 has its set side connected with the lead 580 constituting the output of the pick roll latch 564, and the incrementer latch 582 is set at the time the pick roll latch 564 is set. The primary incrementer latch 582, when set, provides an output signal through its lead 592 in order to energize the primary incrementer magnet 232; and the primary incrementer roll 226 is lifted so that if a card were to reach the primary incrementer wheel 154 at this time, the card would not be moved by the wheel 154. The transport roll 148 and its cooperating roll 190 move the card 100 passing through the transport through the punch 152 and into contact with the pole piece 204 which constitutes a registration gate for the card. The cam 194 swings downwardly at this time to hold the card 100 firmly in position against the pole piece 204. The pole piece 204 at this time is energized due to the action of the gate latch 600. The gate latch 600 is under the control of the AND circuit 602, and the AND circuit 602 is enabled by the "pick roll latch" signal in lead 580 and by the "card sensor" signal in lead 578. The card at this time has cleared the card sensor 150 so that light again shines on the phototransistor 202 whereby the "card sensor" signal appears on lead 578 and the gate latch 600 is set.

At this time, the "card sensor" signal appears in lead 578, since the card 100 has cleared the card sensor 150; and the "-card sensor" signal is applied on AND circuit 594 along with the output of the primary incrementer latch 582, the "punch dwell" signal in lead 590, and the "bit time 1" signal in lead 398. The "punch dwell" signal is a pulse from the punch emitter 286 that indicates a start of dwell of the card 100; that is, it is the beginning of the time in which motion of the card 100 has ceased and the card is stationary in the transport. The AND circuit 594 thus generates a signal in lead 598 that may be termed "punch start"; and this is the signal, as will be described, that is used to initialize the punch control logic 358. Punching initially takes place at the time of the first dwell of the card 100 (after the dwell of "punch start"), and subsequent punching in the additional columns takes place during other incremental dwell times which are caused by the primary incrementer wheel 154 and roll 226. The primary incrementer wheel 154 and roll 226 continue to increment the card 100 through the transport as punching continues.

The "card sensor" signal is provided as an input on the AND circuit 588 (FIG. **13*d*), and the "punch dwell" signal on lead 590 is also an input to this AND circuit. When the "-punch dwell" and "card sensor" signals are on the leads 590 and 578, and at bit time B (applied as a signal by means of lead 408 onto AND circuit 588), the AND circuit 588 is effective through lead 586 and OR circuit 584 to reset the primary incrementer latch 582. The "primary incrementer latch" signal in lead 592 is thus discontinued to de-energize the primary incrementer magnet 232 so that the primary incrementer roll 266 contacts the card 100**.

The signal "punch start" on the lead 598 is applied on the set side of the punch op latch 624 through AND circuit 626 (see FIG. **14*e*). The lead 628 also applied on AND circuit 626 at this time has a signal on it since the read key 570 is not actuated and the read op latch 822 (FIG. 13*g*) is in its reset condition; and, therefore, the AND circuit 626 is satisfied to set the latch 624 indicating that a punch operation is in effect. The output of the latch 624 is applied by means of a lead 632 onto the AND circuit 634; and the AND circuit 634 also has the output of the stop search latch 642, the "transport sync" signal in lead 638, the "A REG B" signal in lead 446, and the timing signals "P2" and "bit time 4 & clock B" in leads 550 and 448 applied to it. The function of the AND circuit 634 is to search for a punch flag in bit D position of the P2 character of the data circulating through the delay line 366, and the AND circuit 634 starts this functioning in column 1 for the same reasons and under the same controls as the AND circuit 444 starts searching for keyboard flags beginning in column 1. The stop search latch 642 at this time is not set, and it provides a signal onto the AND circuit 634 through the lead 640. The "transport sync" signal also exists at this time in lead 638, and this signal is applied from latch 870 in the read section 362. It will be noted that the latch 870 is set by a signal from AND circuit 872, and the AND circuit 872 is satisfied when a "-punch dwell" signal exists in lead 590 and at column 1 time supplied as a signal through lead 1166. It will be noted, therefore, that the latch 870 is set at column 1 time; and this latch is reset at column 96 time. The function of the latch 870 in this connection is to assure that the AND circuit 634 does not look for punch flags arbitrarily but only during the time that the card 100 is going through a dwell cycle. Therefore, the search for the punch flags will occur only once during each dwell or increment cycle of the card 100 through the transport. Under these conditions, if a punch flag exists in column 1, it will appear in the B trigger position of the A register 368 at P3 time, bit time 4, and clock B time. Under these conditions, with a punch flag existing, the AND circuit 634 has its inputs satisfied and provides a signal on the punch flag latch 636** to set this latch.

At the time of satisfaction of the inputs of the AND circuit 634 and prior to this time, the latches $690_1$ to $690_{18}$ are put into and assured to be in reset condition. Resetting of the latches $690_1$ to $690_{18}$ is under the control of the "transport sync" signal in lead 638 derived from the transport sync latch 870 as just described, and the AND circuit 678 also has the timing signals "P2" and "column 1" applied to it through leads 550 and 1166. Therefore, under punch dwell conditions and at these times, the AND circuit 678 provides a "reset punch store" signal in lead 684 applied to the reset sides of each of the latches $690_1$ to $690_{18}$.

Upon satisfaction of the AND circuit 634, with a punch flag being located in column 1 of the data circulating through the delay line 366, the punch flag latch 636 is set and provides a signal in its output lead 650. The lead 650 constitutes an input to AND circuit 652, and the function of the AND circuit 652 is to erase the punch flag just discovered. The AND circuit 652 has the timing signals "P2" and "bit time D" applied to it from leads 550 and 426; and, therefore, when the latch 636 is set and at these times, the AND circuit 652 is satisfied and provides a signal in lead 644. Under ordinary conditions, the inverter circuit 654 provides an "erase flags" signal through lead 510 to AND circuit 504 (FIG. 13*c*) in the memory and control section 352; and when a signal is thus provided on lead 644, the inverter circuit 654 functions to discontinue the signal in lead 510 so as to inhibit the output of AND circuit 504 in the circulating data loop. Therefore, at bit time D and P2 time (which is in correspondence to the location of the punch flag in the circulating data for column 1 in the data loop), the AND circuit 504 is disenabled; and the punch flag does not pass through the AND circuit 504 and is thereby erased.

Figure 14A:
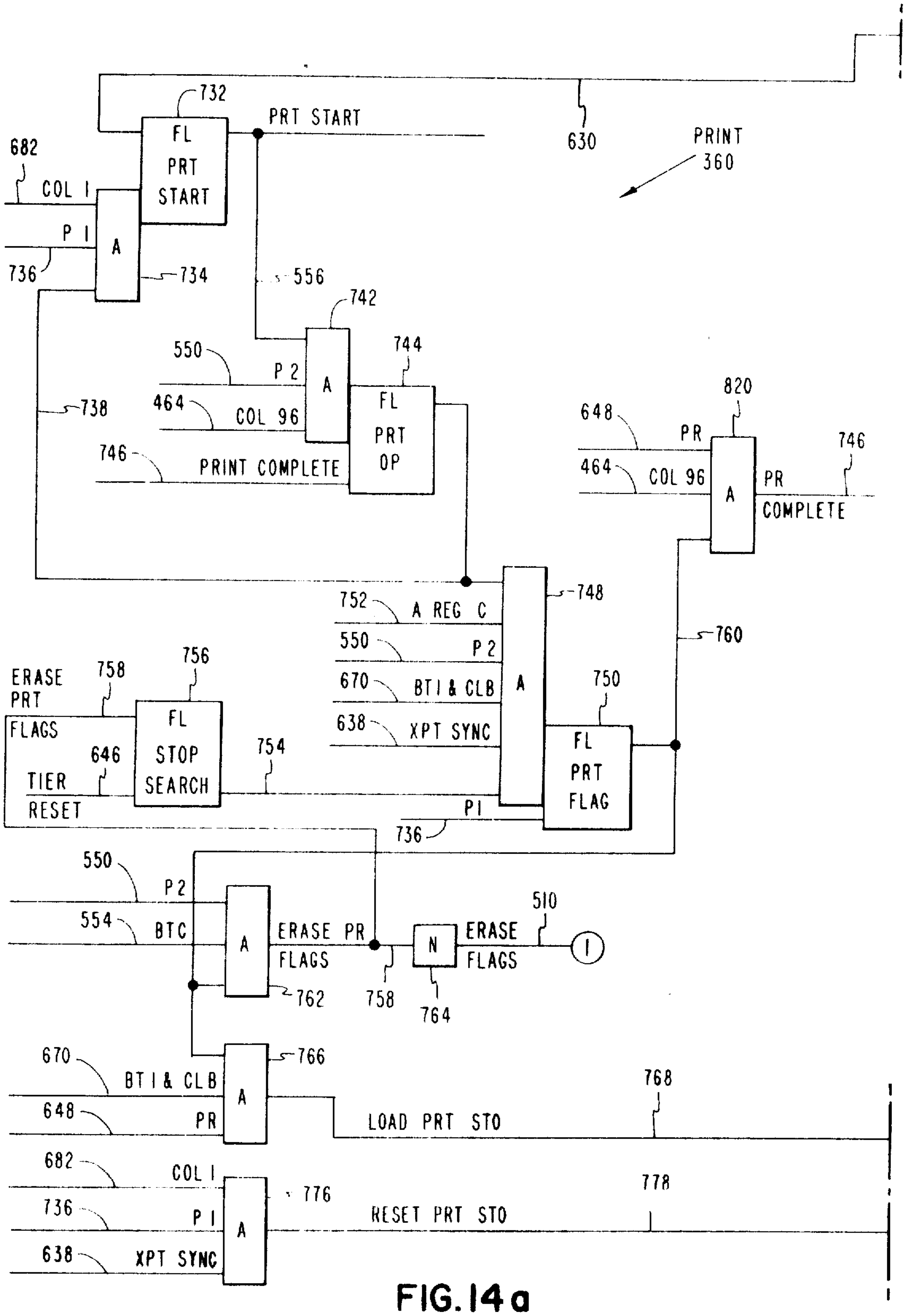
Figure 14B:
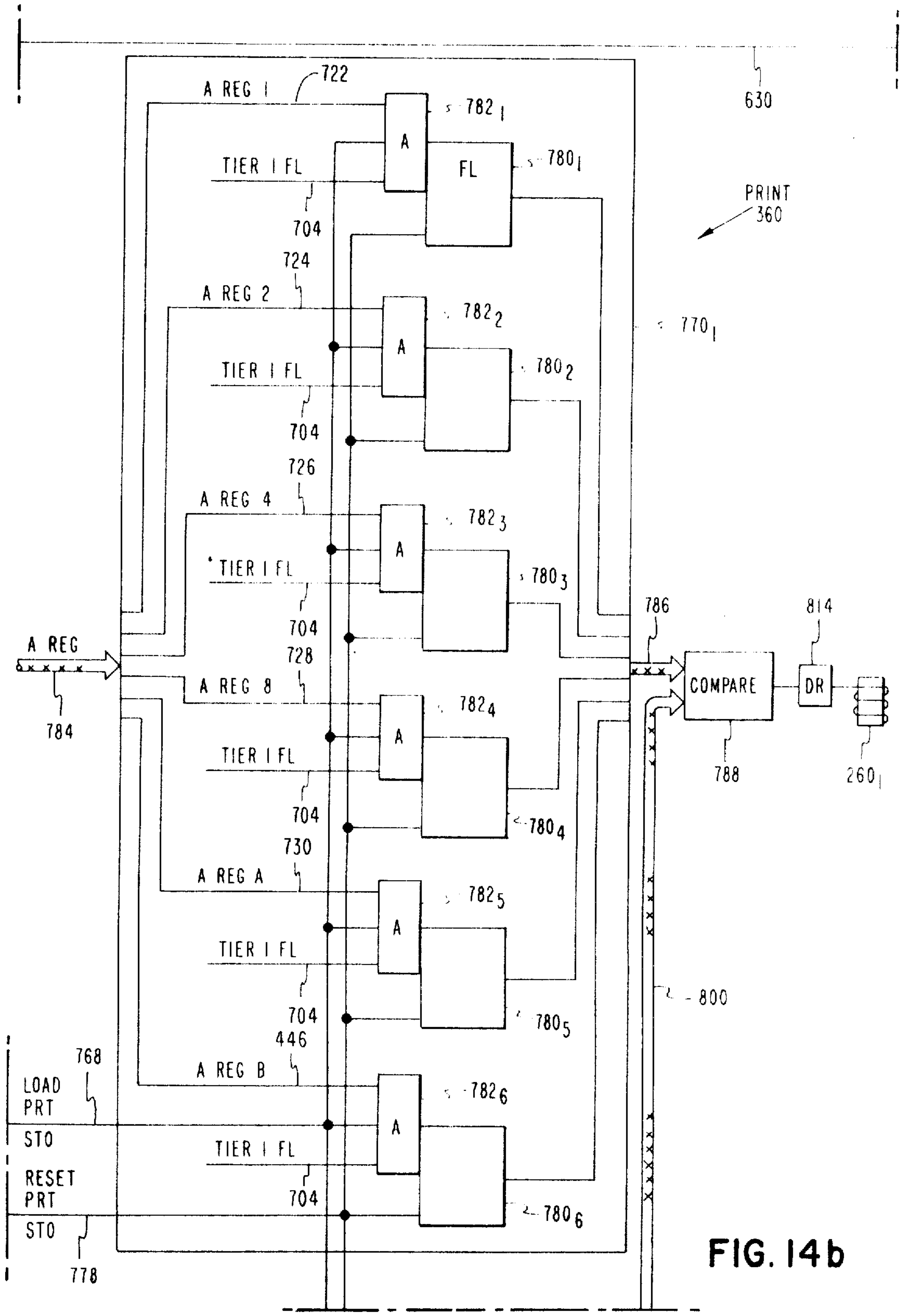
Figure 14D:
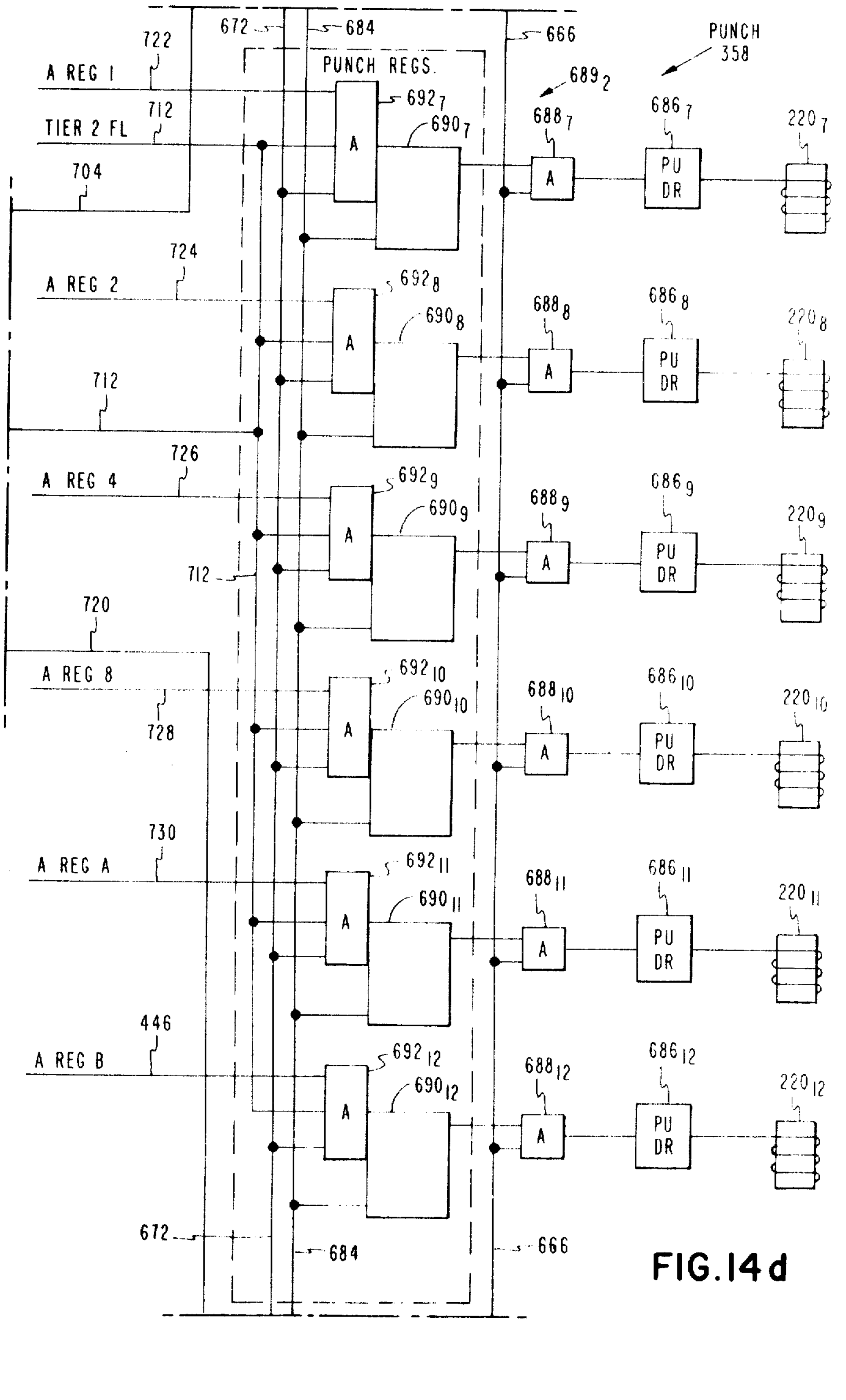
Figure 14E:
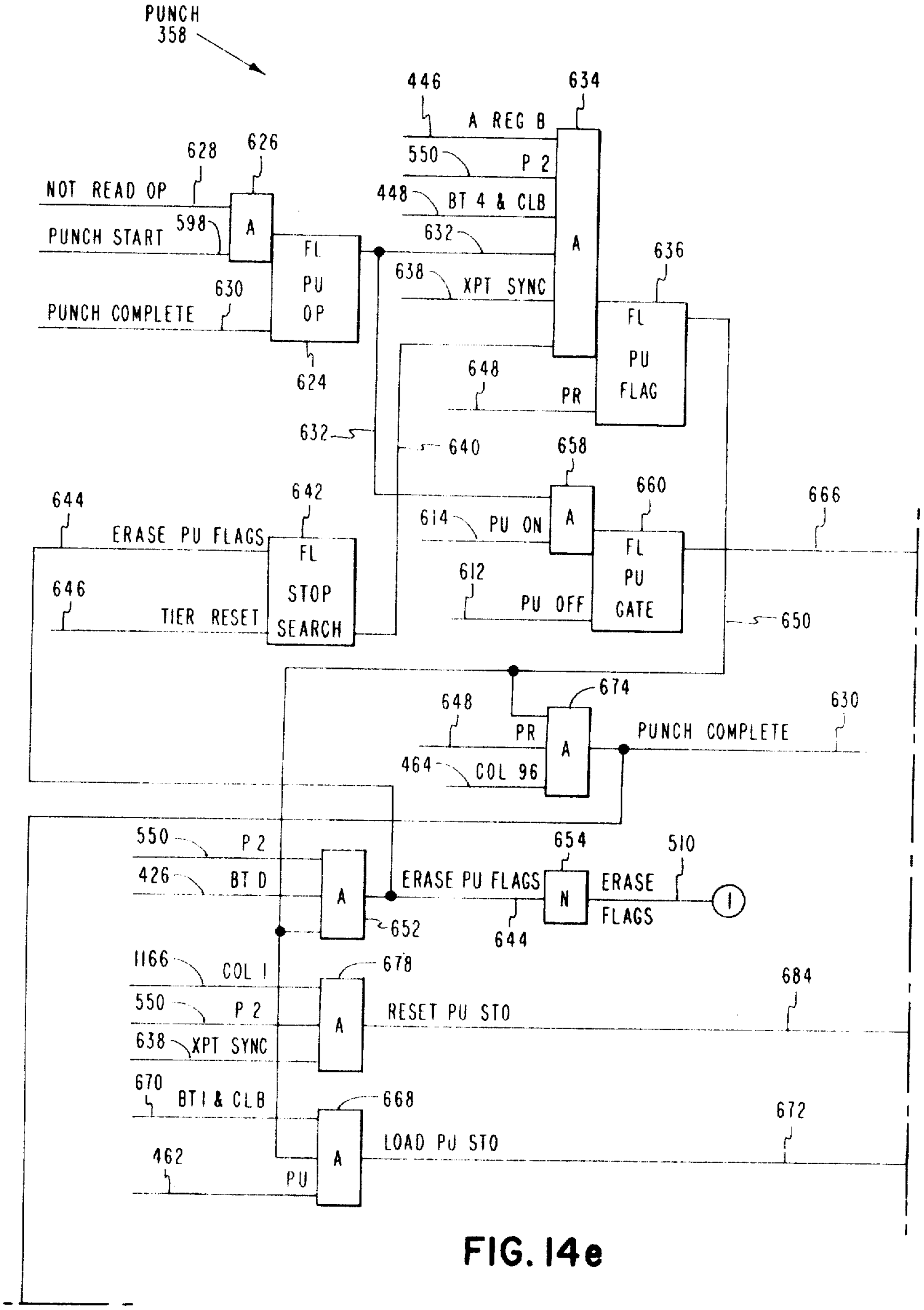
Figure 14F:
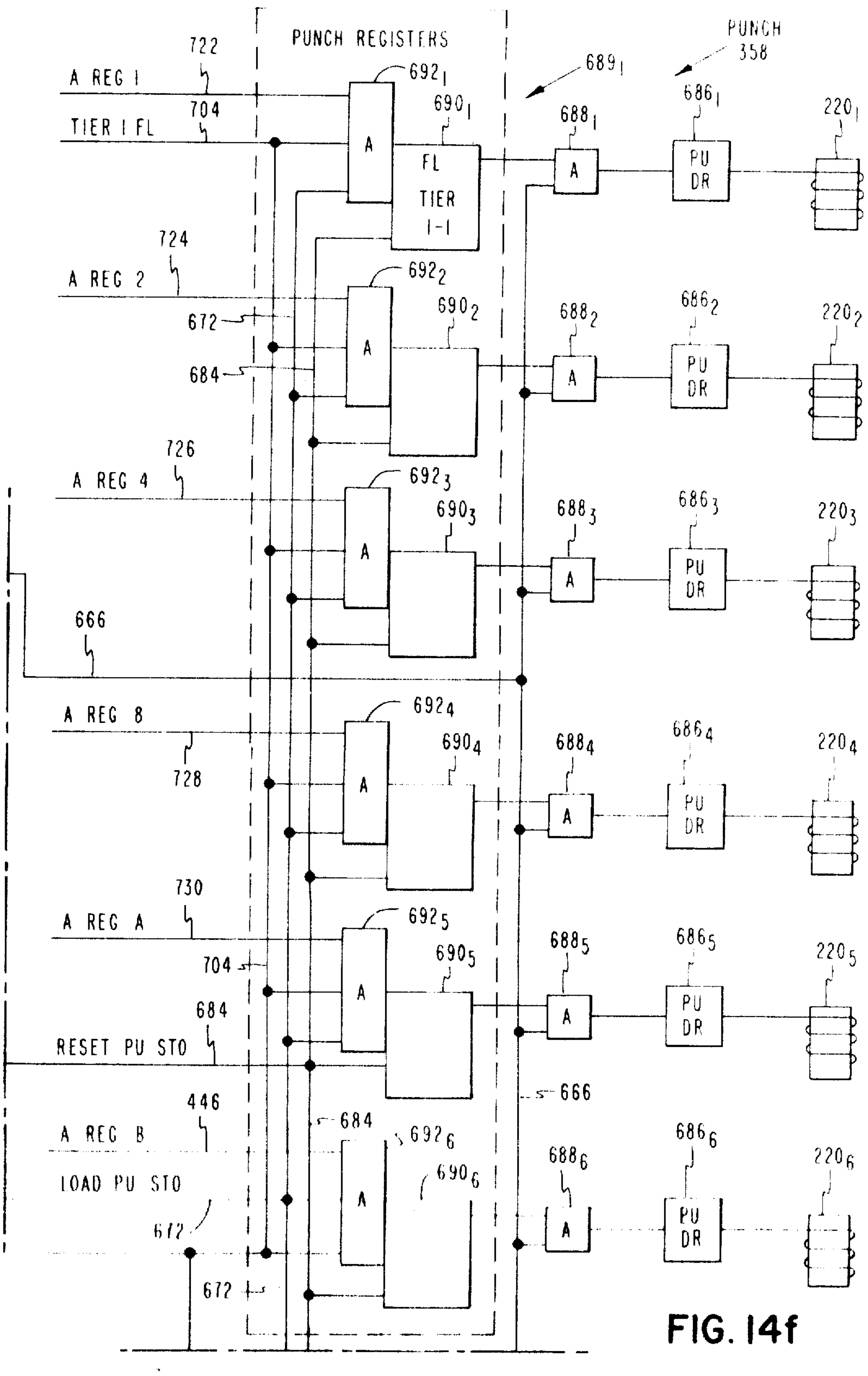
Figure 14G:
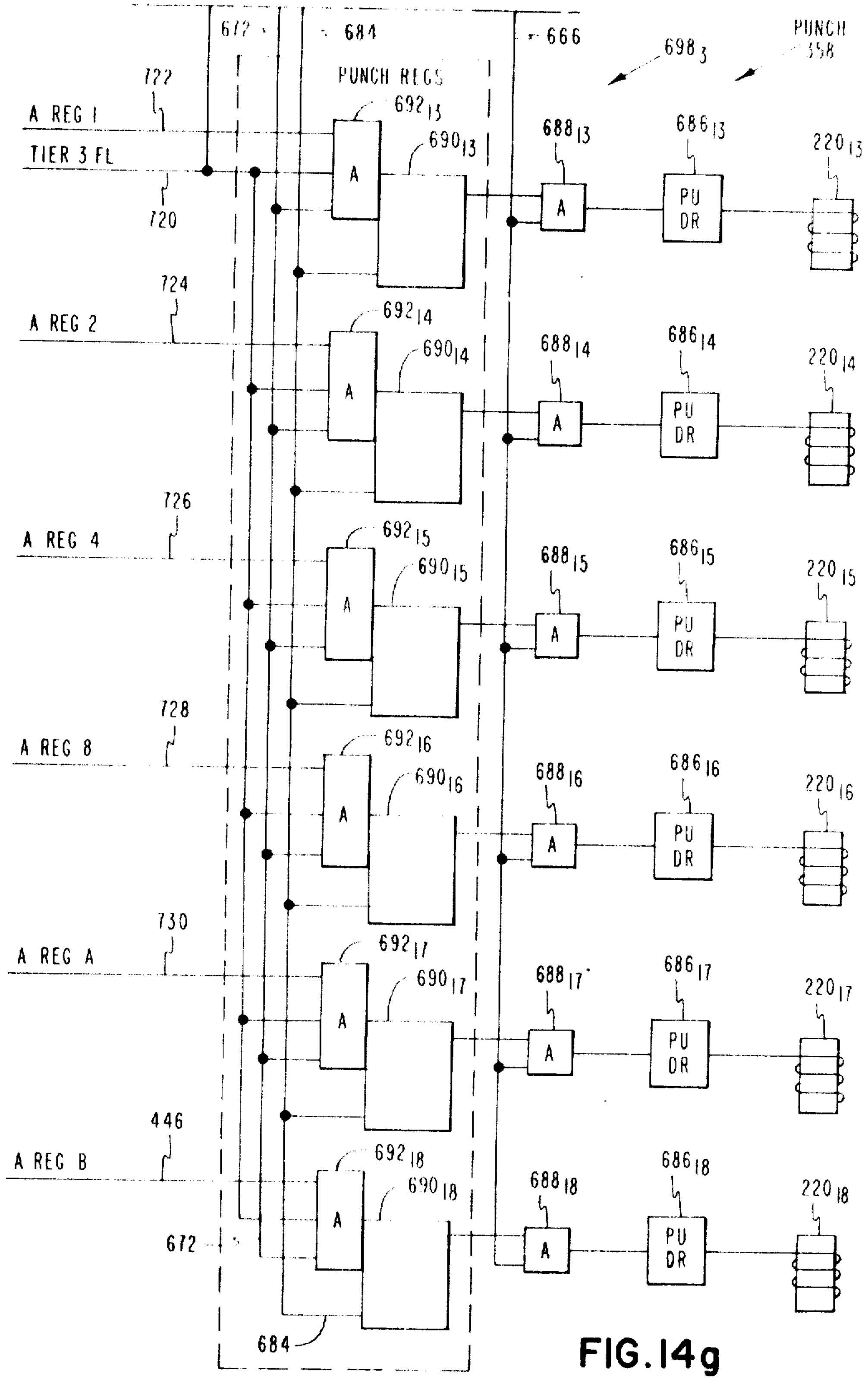

The "punch flag latch" signal in lead 650 is also applied onto the AND circuit 668 (FIG. 14*e*) which is for the general purpose of gating the data contained in the punch sections of the data circulating through the data loop into the punch register latches $690_1$ to $690_{18}$. The AND circuit 668, in addition to the "punch flag latch" signal in lead 650, also has applied to it the timing signals "bit time 1 & clock B" and "punch"; therefore, at these times with the latch 636 set, a "load punch store" signal is supplied by the AND circuit 668 to the lead 672. The lead 672 is applied to each of the AND circuits $692_1$ to $692_{18}$, and these AND circuits will be enabled in accordance with the other signals supplied to the AND circuits.

The timing signals "tier 1 latch", "tier 2 latch", and "tier 3 latch" are applied respectively to AND circuits $692_1$ to $692_6$, AND circuits $692_7$ to $692_{12}$, and AND circuits $692_{13}$ to $692_{18}$ as shown. The "tier 1 latch" signal is provided in lead 704 from the tier 1 latch 694, and this latch is set when the inputs to the AND circuit 702 are present—these inputs being the timing signals "column 96", "print", and "bit time 4" from leads 464, 648, and 402. The "tier 2 latch" signal in lead 712 is provided by the tier 2 latch 696 under the control of AND circuit 708, and this AND circuit is enabled at the times of column 32, print, and bit time 4 as determined by the signals in leads 710, 648, and 402 to set the latch 696. The signal from AND circuit 708 applied on the latch 696 is present in lead 706, and this lead also is applied on the reset side of the tier 1 latch 694 so that the "tier 1 latch" signal is effective for the first 32 column times of clock 370. The tier 3 latch 698 is similarly set at column 64, print, and bit time 4 by virtue of the AND circuit 716; and the output of the AND circuit 716 is on the lead 714 which is connected to the reset side of the tier 2 latch 696. Similarly, therefore, the "tier 2 latch" signal in lead 712 is effective for the duration of columns 33 through 64 from clock 370. A similar analysis of the action of the tier 3 latch 698 indicates that the "tier 3 latch" signal in lead 720 is effective for column times 65 to 96. As will be noted from FIG. 1 showing the card 100, the card has columns 1 to 32 in the first tier, columns 33 to 64 in the second tier, and columns 65 to 96 in the third tier; and the latches 694, 696, and 698, as will hereinafter appear from further discussion, are applicable to these three tiers. Only one of the three latches 694, 696, and 698 will be set at any given time; and they are set only during the time that the columns of data in the data circulation loop apply to the specific tier with which these latches are labeled. These latches, as will hereinafter appear, distinguish the columns of data which are serially loaded in the delay line 366 and A register 368 and determine which columns of data apply to the three tiers, so that the data is read out of the data circulation loop in a parallel condition.

Data is loaded initially from column 1 of the data circulating through the delay line 366, and the tier 1 latch 694 is initially the one of the tier latches that is set. The "tier 1 latch" signal in lead 704 is applied to the latches $690_1$ to $690_6$ in the tier 1 punch register $689_1$; and, therefore, the latches $690_1$ to $690_6$ are those latches which receive data initially. The AND circuits $692_1$ to $692_6$ respectively have the "A REG 1", "A REG 2", "A REG 4", "A REG 8", "A REG A", and "A REG B" signals thereon, together with the "tier 1 latch" signal and the "load punch store" signal in lead 672 thereon. Therefore, at this time, the latches $690_1$ to $690_6$ respectively have the data transferred to them that is in the 1, 2, 4, 8, A, and B positions in the A register 368. For example, if there is a bit in the 2 position of the A register 368, this information will be transferred to the latch $690_2$; and the latch $690_2$ will be set. Thus, the data in column 1 has been loaded into the latches $690_1$ through $690_6$.

As previously described, the AND circuit 652 when provided with a signal from the punch flag latch 636 was effective to erase a punch flag; and this flag was the flag for column 1. The signal from the AND circuit 652, which may be termed the "erase punch flags" signal, is also applied onto the stop search latch 642; and the purpose of the latch 642 is to prevent the immediate search, subsequent to the location of the column 1 flag, for any further punch flags by means of AND circuit 634. When the stop search latch 642 is set, the signal provided on the lead 640 from this latch is discontinued; and the AND circuit 634 is disenabled.

The stop search latch 642 has the signal "tier reset" applied to it on its reset side by means of lead 646, and this signal is derived from the OR circuit 888 in the read section 362. As will be observed, the "column 32", "column 64", and "-column 96" timed signals are applied to the OR circuit 892; and, therefore, after the search has been completed for column 1, a signal is provided on the lead 890 by means of the OR circuit 892; and the "tier reset" signal is supplied to the lead 646 and to the latch 642 at column 32, print time, by means of AND circuit 888. The application of the "tier reset" signal on the latch 642 resets the latch 642 so that the signal in lead 640 reappears and re-enables the AND circuit 644 so that it can resume its function to search for punch flags.

The punch flag scanning AND circuit 634 is then effective to look for a punch flag starting in column 33. In the case given, a punch flag is located in column 33; and the punch flag latch 636 is set. The latch 636 functions similarly as for column 1 to erase a punch flag, which is in column 33 in this case, and to generate a "load storage" signal in lead 672. At this time, however, the tier 2 latch 696, instead of the tier 1 latch 694, is set; and, therefore, the data from the 1, 2, 4, 8, A, and B positions in the A register 368 is gated into the punch register $689_2$ for the second tier. This gating is similar to the gating of the column 1 data into the latches $690_1$ to $690_6$ but occurs for the latches $690_7$ to $690_{12}$ in view of the fact that the "tier 2 latch" signal in lead 712 is effective on the latches $690_7$ to $690_{12}$. In this case also, for column 33, the stop search latch 642 is set so as to suspend the search for punch flags by the AND circuit 634. The stop search latch 642 is reset by the "tier reset" signal in lead 646; and this occurs at column 64, print time, due to the action of the OR circuit 892 and the AND circuit 888.

The data for column 65 is transferred into the latches $690_{13}$ to $690_{18}$ of the punch register $689_3$ for the third tier in the same manner as the data was transferred into the latches $690_1$ to $690_{12}$ for the first two tiers; and, therefore, the 18 punch latches $690_1$ to $690_{18}$ are now loaded with data which applies to the three aligned columns 1, 33, and 65 in the first incremented position of the card 100 as it passes through the transport. At this time, the further search for punch flags by the AND circuit 634 is discontinued in view of the fact that the transport sync latch 870 is reset at column 96 time due to the application of the timed "column 96" signal onto the latch 870 by means of the lead 464. The "transport sync" signal therefore is discontinued in the lead 638 applied onto the punch flag searching AND circuit 634; and the AND circuit 634 will not be able to search further for punch flags until another "punch dwell" pulse occurs that indicates that the card 100 has moved to the next incremented position.

The punch registers $689_1$, $689_2$, and $689_3$ are now loaded with data ready for punching; and this data is gated to the punch drivers $686_1$ to $686_{18}$ by means of the AND circuits $688_1$ to $688_{18}$. These AND circuits are enabled by means of a signal on lead 666 from the punch gate latch 660, and the latch 660 is set by the "punch op" signal in lead 632 from the punch op latch 624 which, as previously mentioned, indicates that a punch operation is in effect. The signal in lead 632 is applied along with a "punch on" signal in lead 614 to the AND circuit 658 which is on the set side of the latch 660 for this purpose. The signal "punch on" from the punch emitter 286 and from the punch emitter amplifiers 608 indicates the time during the card motion cycle at which the punch magnets $220_1$ to $220_{18}$ should be energized for proper punching while the card 100 is stationary. The output of the punch gate latch 660 is reset by the "punch off" signal in lead 612 which is also derived from the emitter 286 and the amplifiers 608—the signal "punch off" indicating that the time has arrived at which the magnets $220_1$ to $220_{18}$ should be de-energized for proper withdrawal of the punches 210 while the card 100 is still stationary.

When the AND circuits $688_1$ to $688_{18}$ are satisfied, they energize the punch drivers $686_1$ to $686_{18}$ and energize the corresponding magnets $220_1$ to $220_{18}$ so as to cause the corresponding punches 210 to make perforations through the card 100. As is apparent, only those of the latches $689_1$ to $689_{18}$ are set which correspond to bits in the circulating data in the delay line 366 in columns 1, 33, and 65; and, therefore, only those of the punches $220_1$ to $220_{18}$ that correspond also to these bits are energized to cause corresponding holes to be punched in the card 100. Therefore, the aligned columns 1, 33, and 65 in the particular bit positions corresponding to the bits existing in columns 1, 33, and 65 of the circulating data in the delay line 366 have been punched; and the punching of these aligned columns in the first incremented position of the card 100 has been completed.

The punching for the remaining columns 2 to 32 in the top tier and for the aligned columns 34 to 64 and columns 66 to 96 in the second and third tiers proceeds in the same manner as the punching occurred for the first three columns 1, 33, and 65. The punching for each incremental movement of the card 100 to successive column positions by means of the first incrementer wheel 154 is controlled in particular by the transport sync latch 870. This latch is reset for each memory pass by means of the timed "column 96" signal applied through lead 464 on the reset side of the latch 890; and since the card is next incremented to the second incremental position in which columns 2, 34, and 66 are in alignment with the punches 210, the transport sync latch 870 is again set by the "punch dwell" signal applied to the AND circuit 872 by means of lead 590. The "transport sync" signal is thus applied by means of lead 638 on the AND circuit 634; and the AND CIRCUIT 634 again starts its search for punch flags in the recirculating data in the circulating data loop including the delay line 366 starting in column 1. In view of the fact that the punch flags in columns 1, 33, and 65 have been erased in the recirculating data, the first punch flag located by the AND circuit 634 will be in column 2; and subsequently, the punch flags for columns 34 and 66 will be located by the AND circuit 634. The punch registers $689_1$, $689_2$, and $689_3$ are loaded with the data in columns 2, 34, and 66 of the data circulating through storage 366; and punching of this data will occur by means of the magnets $220_1$ to $220_{18}$ in columns 2, 34, and 66 of the card 100 in the same manner as the data was punched into columns 1, 33, and 65. The transport sync latch 890 controls the subsequent punching of data into the succeeding columns of the card 100 in the same manner while the card is being moved through the transport by the primary incrementer wheel 154 until the three last aligned columns 32, 64, and 96 have been punched.

When the punch operation in columns 32, 64, and 96 is being completed, the "punch flag latch" signal exists in lead 650; and at print and column 96 times, the AND circuit 674 has its inputs satisfied so that it produces a "punch complete" signal in lead 630. This lead is applied onto the reset side of the punch op latch 624 so that this latch is reset, thus ending the punching operation including the search for data during the punching operation.

The lead 630 is also applied onto the set side of the print start latch 732, and this latch is set to provide a "print start" signal on its output lead 556. The print start latch 732 has functions very similar to those of the K to P transfer latch 446 in connection with the punch operation. The purposes of the print start latch 732 are to write print flags in every column in memory (in bit position C of character P2 for each column), and it also causes data to be transferred from the PU or punch sections of the data circulating through the delay line 366 to the print sections of this circulating data for the purpose of printing.

Print flags are written particularly due to the action of the AND circuit 552 (see FIG. 13c). The "print start" signal in lead 556 is applied to the AND circuit 552 along with the "P2" and "bit time C" timing signals, and this generates the signal "write flags" in lead 522 at these times. The "write flags" signal is applied on OR circuit 514; and, therefore, the print flags are written in bit position C of character P2 for each of the 96 columns of data circulating through the delay line 366—this writing of flags being similar to the writing of keyboard and punch flags previously described.

The print start latch 732 also has the function of transferring data from the punch to the print positions in the circulating data in the delay line 366; and this function is particularly due to the action of the AND circuit 562 (see FIG. 13c). The AND circuit 562 has the "print start" signal in lead 556 and the timed "punch" signal in lead 462 applied to it as inputs, and the AND circuit 562 is effective for transferring the data from the punch to the print characters in the recirculating data in the same manner as the AND circuit 558 was effective to cause a transfer of data from the keyboard characters to the punch characters as previously described. For this purpose, as is apparent, the timing signal "punch" from lead 462 is used on the AND circuit 562 instead of the timed "keyboard" signal that is used on the AND circuit 558 for transferring data from the KBD to the PU characters. In particular, the AND circuit 562 functioning with the AND circuit 490 inhibits the output of the delay line 366 at punch time and functioning with the AND circuit 500 gates the output of the A register 368 back to its input thus completing a transfer of data from a PU character to a PR character of the data circulating through the delay line 366.

After having accomplished the transfer of data from the PU characters to the PR characters in the data circulating through the delay line 366 and having written print flags in the bit C positions of the P2 characters of this circulating data, the print op latch 744 is set at the following column 96 time and punch time. The AND circuit 742 is effective for this purpose and has the "print start" signal in lead 556 and the "P2" and "-column 96" timing signals in leads 550 and 464 applied to it for this purpose. The print op latch 744 when set indicates that a print operation is being performed. When the latch 744 is set, its output on lead 738 is applied onto the AND circuit 734 which also has the timed "column 1" and "P1" signals applied to it from leads 682 and 736. The print start latch 732 is thus reset so as to end the data transfer operation from the PU characters to the PR characters and so as to end the flag writing operation utilizing the AND circuit 562.

The printing operation is quite similar to the punching operation in that three columns of data must first be located in the data circulating through the delay line 366 for each triad of aligned columns on the card 100. This function is accomplished by the AND circuit 748 (FIG. 14a) which searches for the print flags located in bit position C of character P2 in the columns of data circulating through the delay line 366. The AND circuit 748, in addition to inputs from the print op latch 744 and the stop search latch 756, has the "transport sync" signal from lead 638, the signal from the C trigger of the A register 368 in lead 752, and the timing signals "P2" and "bit time 1 & clock B" from leads 550 and 670 applied to it as inputs. The latch 756 is in its reset condition at this time and thus supplies a signal on lead 754. The AND circuit 748 thus has substantially the same inputs as the AND circuit 634 which functions to search for punch flags except that the C trigger of the A register 368 is examined instead of the B trigger; and, therefore, the AND circuit 748 searches for print flags. This search begins in column 1 under the same controls as those provided for the AND circuit 634 searching for punch flags and the AND circuit 444 searching for keyboard flags.

When the first print flag in bit position C of character P2 in column 1 of the data circulating through the delay line 366 is located, all of the inputs of the AND circuit 748 are satisfied; and the print flag latch 750 is set. A signal is thus provided on lead 760, and this signal is applied onto the AND circuit 762 which has the additional timing signals "P2" and "bit time C" applied thereto from leads 554 and 550. The AND circuit 762 is therefore satisfied at P2 time and bit time C and provides an "erase print flags" signal in lead 758. Due to the inverter circuit 764, a signal ordinarily is raised in lead 510; however, when the "erase print flags" signal appears in lead 758, the signal on lead 510 which is applied on AND circuit 504 (see FIG. 13c) is discontinued. Therefore, at bit time C and P2 time, the AND circuit 504 does not have all of its inputs satisfied and is effective to inhibit or erase the print flag in bit position C of character P2 in column 1 of the data circulating through the delay line 366. The signal "erase print flags" on lead 758 is also applied to set the stop search latch 756; and, therefore, the signal in lead 754 is discontinued so that the AND circuit 748 is suspended from its operation in searching for print flags at this time.

During the time the AND circuit 748 is effective for searching for the first print flag and prior thereto, the print registers $770_1$, $770_2$, and $770_3$ are reset. This resetting operation occurs once for each increment that the card 100 travels and is under the control of the AND circuit 776 (see FIG. 14*a*). The AND circuit 776 has the "transport sync" signal from lead 638 and the timing signals "P1" and "column 1" from leads 736 and 682 applied to it as inputs; and, therefore, just prior to a printing operation in columns 1, 33, and 65 (and just prior to printing in any others of the aligned columns in tiers 1, 2, and 3 of card 100) the AND circuit 776 provides a signal on lead 778. This signal is supplied onto the reset sides of the latches in the print registers $770_1$, $770_2$, and $770_3$, for example, on the latches $780_1$ to $780_6$ of the register $770_1$ so as to reset these latches.

Subsequently, at bit time 1, clock B, and print times applied as signals on leads 648 and 670 on AND circuit 766 and subsequent to setting of the latch 750, the AND circuit 766 is effective to generate the signal "load print store" in lead 768. The "load print store" signal in lead 768 conditions each of the latches in the print registers $770_1$, $770_2$, and $770_3$ for operation; and the latches $780_1$ to $780_6$ are loaded from the 1, 2, 4, 8, A, and B triggers of the A register 368 so as to contain in effect the corresponding data bits in the PR character of column 1 of the data circulating through the delay line 366. The construction and operation of the print register $770_1$ is very similar to that of the punch register $689_1$.

The loading of the circulating column 33 print data and of the column 65 print data from the data circulating through the delay line 366 into the print registers $770_2$ and $770_3$ takes place substantially in the same manner as the registers $689_2$ and $689_3$ are loaded with punch data as previously described. The stop search latch 756 functions in the case of printing in the same manner as the stop search latch 642 functions for punching—the resetting of both of these latches being under the control of the OR circuit 892 (see FIG. 13*h*) having the "-column 32", "column 64", and "column 96" timing signals applied thereto so as to select the print flags in columns 33 and 65 and the corresponding data in these columns from the circulating data for loading the column 33 and column 65 data into the print registers $770_2$ and $770_3$. In particular, the "tier reset" signal on lead 646 resets the stop search latch 756 so that a signal appears on lead 754 and conditions the AND circuit 748 to search for a print flag in column 33. The AND circuit 748 locates the flag in column 33, loads the data from column 33 into the print register $770_2$ utilizing the AND circuit 766, erases the print flag in column 33 utilizing the AND circuit 762, and sets the stop search latch 756 so as to suspend the search for further print flags until the "tier reset" signal in lead 646 again appears for the column 64 time. The stop search latch 756 is reset in column 64 so that the AND circuit 748 is effective for searching for a print flag in column 65, and the AND circuit 748 is effective to cause the erasing of the column 65 print flag and to load the column 65 data into the print register $770_3$ in the same manner as such erasing and data loading occurred for the other columns. The registers $770_2$ and $770_3$ are respectively conditioned to receive the tier 1, tier 2, and tier 3 data similarly as are the registers $689_1$, $689_2$, and $689_3$ since the "tier 1 latch" signal, the "tier 2 latch" signal, and the "tier 3 latch" signal in leads 704, 712, and 720 are respectively applied onto the latches for the print registers $770_1$, $770_2$, and $770_3$ preliminary to printing this information onto the card 100.

Figure 14H:
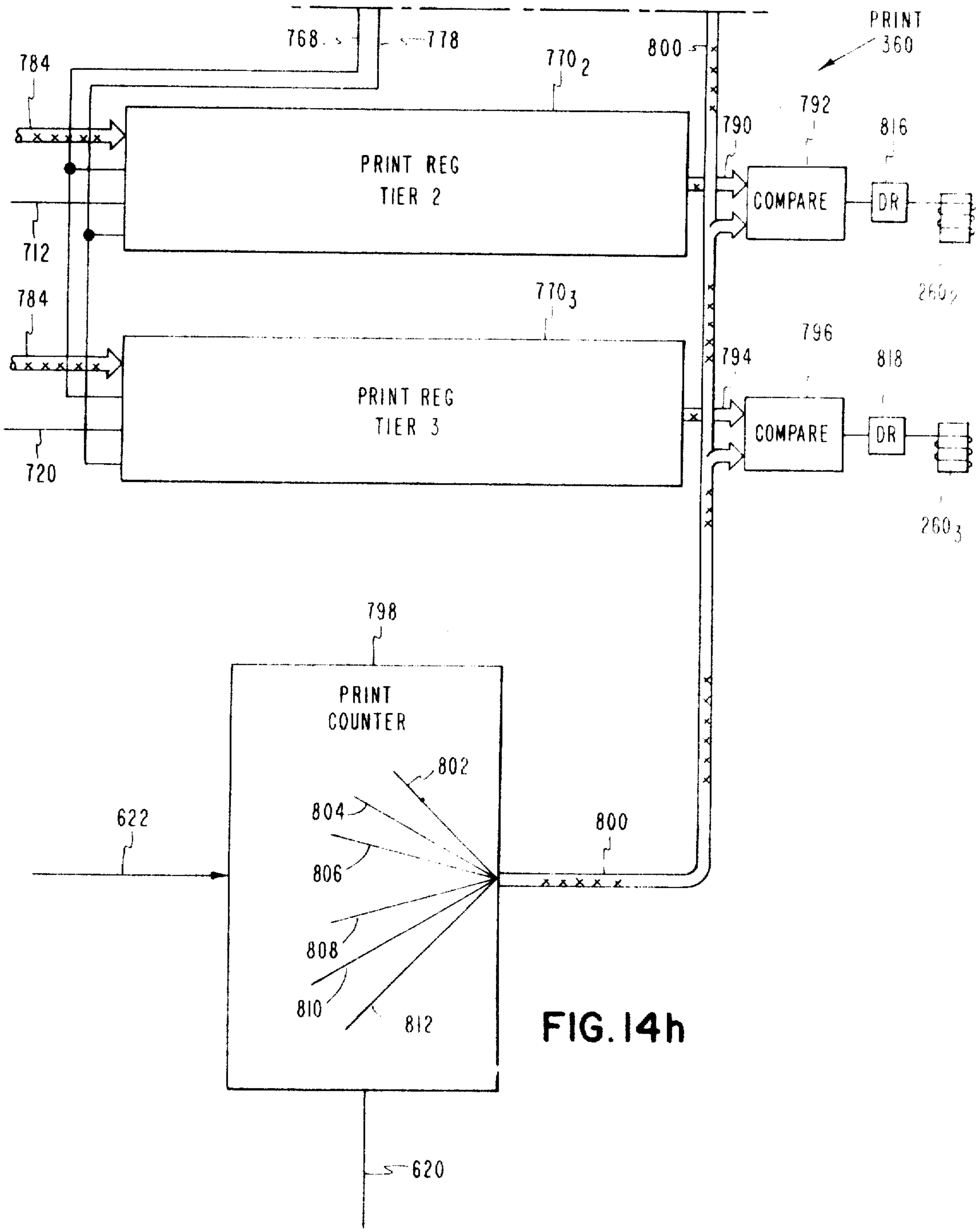

Printing occurs in a slightly different manner than does punching in view of the fact that there are only three print hammers 258 as compared to the 18 punches 210 while in the case of both punch and print, there are three registers and eighteen latches in these registers—the punch registers being $689_1$, $689_2$, and $689_3$ and the print registers being $770_1$, $770_2$, and $770_3$. In the case of printing, the contents of the print register $770_1$ is printed in print column 1; the contents of the print register $770_2$ is printing in print column 33; and the contents of the print register $770_3$ is printed in print column 65. As previously mentioned, the printing mechanism includes the three print rows 252, 254, and 256 which are respectively for printing print lines 1, 2, and 3 together with a hammer 258 for each of the print rows. These print rows 252, 254, and 256 each have 63 characters and a blank on its peripheries; and they continuously rotate. In order to print, therefore, it is necessary that the print wheel be synchronized with motion of the corresponding print hammers so that the print hammer strikes the periphery of the print wheel at the time that the particular character to be printed is in correspondence with the hammer. This is accomplished using the compare circuits 788, 792, and 796 (see FIGS. 14*b* and 14*h*).

The buss 800, carrying the output of the print counter 798, is connected with each of the compare circuits 788, 792, and 796. The counter 798 is a binary counter which counts from 0 through 63; and its output is a bit pattern with a 1, 2, 4, 8, A, and B bit configuration. The bits 1, 2, 4, 8, A, and B are respectively provided on the leads 802, 804, 806, 810, and 812 which together constitute the buss 800. The characters on the print wheel are arranged sequentially from 0 to 63; and each of these characters corresponds to different combinations of bits 1, 2, 4, 8, A, and B. The counter 798 is under the control of print emitter 296 and the print emitter amplifiers 618; and, under the control of the print emitter 296, the amplifiers 618 produce one "print home" signal in lead 620 for each revolution of the print wheel 251 and produce 64 "print character" signals on the lead 622 for each revolution of the print wheel. The "print home" and "print character" signals are applied onto the counter 798, and the counter is stepped one time for each of the "print character" signals. The "print home" signal is effective on the counter 798 so as to synchronize the output of the counter in buss 800 with particular characters on the peripheries of the print wheels.

The arrangement of bits in the output of the counter 798 is such that, if these bits are matched with the bits contained by any of the registers $770_1$, $770_2$, and $770_3$, the particular characters on the peripheries of the print wheel corresponding to the contents of the registers $770_1$, $770_2$, and $770_3$ will appear opposite the respective print hammers 258 when the print hammers 258 strike the printing wheel peripheries.

The contents of the register $770_1$ in the bit pattern 1, 2, 4, 8, A, and B are applied by means of the buss 786 by means of the compare circuit 788; and likewise, the output of the counter 798 in the same bit pattern is applied through buss 800 on the compare circuit 788. When the bit patterns provided by the two busses 786 and 800 are the same, the compare circuit 788 produces a signal on the print driver 814 which, in turn, energizes the magnet $260_1$ so as to move the corresponding print hammer 258 into contact with the print wheel 252 that is in alignment with column 1, print line 1 on the card 100. Therefore, the character on this print row that corresponds to the contents of register $770_1$ is printed on the card 100 in column 1, print line 1. In like manner, the contents of print registers $770_2$ and $770_3$ functioning with the respective compare circuits 792 and 796, magnet drivers 816 and 818, and magnets $260_2$ and $260_3$, cause the printing of the characters in print columns 33 and 65 in print lines 2 and 3 on the card 100 that correspond to the contents of registers $770_2$ and $770_3$.

Printing for the other columns on the card 100 occurs in the same manner as for print columns 1, 33, and 65. Since the AND circuit 762 has been effective to erase the print flags for columns 1, 33, and 65 in the data circulating through the delay line 366, the AND circuit 748, which functions to search for print flags beginning in column 1, is not effective for searching for the second column of data until the second print flag is located which occurs in column 2 of the data circulating through the delay line 366. The AND circuit 748 is under the control of the "transport sync" signal in lead 638; and this signal does not exist until the next "punch dwell" signal appears in lead 590 which, as previously described, occurs at the start of a dwell of the card 100; and the search for print flags does not start until the card 100 is in its second incremented position in the card transport. Thus, all of the 96 print columns are printed with the characters corresponding to the contents of the 96 columns of data circulating through the delay line 366.

At this time, the AND circuit 820 has all of its inputs satisfied. The print flag latch 750 is operative at column 96 time to produce a signal on its output lead 760; and, therefore, at print time and column 96 time provided as signals on AND circuit 820 through leads 648 and 464, the AND circuit 820 is satisfied and produces a "print complete" signal on lead 746. These three inputs to the AND circuit 820 indicate that the next character from the data circulating through the delay line 366 is now being loaded into the register $770_3$; therefore, the AND circuit 820 and its "print complete" signal 746 at this time terminates the printing operation by resetting the latch 744. Therefore, all of the characters circulating within the data loop including the delay line 366 have now been punched and printed.

Insofar as the card transport is concerned, at some time during the printing operation, the trailing edge of the card 100 will have passed out from between the primary incrementing wheel 154 and roll 226; and the secondary incrementing wheel 164 and roll 266 are active to move the card 100 through additional increments. The card is moved through the complete 33 increments necessary for printing and then passes between the stacker shoe 282 and the stacker wheel 284, and the wheel 284 drives the card into the stacker 166. Additional cards 100 are punched and printed with data from the keyboard 128 in the same manner, and these additional cards 100 also enter the stacker 166 behind the preceding card or cards to form a stack. The cards move into the stacker 166 and are held in stacked relationship by the tray back 278 which is under the influence of the spring 280.

After the document card 100 has been punched and printed as above described, the machine may be used for verifying the card, particularly for determining whether or not the correct characters have been punched into the card. This is done by placing the card in the hopper 144 as the top card in the hopper; and then, after the card has been fed from the hopper 144 into the card transport mechanism, the operator may use the original source document in order to rekey the characters. If the characters that are rekeyed in the verify operation are identical with those that have been punched in the card, verification has been accomplished; and the notcher 160 is then effective to put a small notch into the card indicating that it has been verified.

The verify operation is normally done after a program has been loaded, although the verify operation may be carried out without using a program. A program may be placed in any or all of the P1, P2, P4, and P3 characters circulating through the delay line 366; and a program consists in particular in the P1, P2, P4, and P3 characters of bits in the 1 position corresponding to verify right adjust, bits in the 2 position corresponding to program numeric shift, bits in the 4 position corresponding to program lower shift, bits in the eight position corresponding to auto dup, bits in the A position corresponding to auto skip, and bits in the B position corresponding to end of field.

In loading a program, a card 100 containing the program is put into the hopper 144. Then the program switch 1366 is closed; and one of the switches 1368, 1370, 1372, and 1374 is then closed which determines into which of the characters P1, P2, P4, and P3, circulating through the delay line 366, the program information is put. The closing of the program 1 key 1368 causes a setting of the program level 1 latch 1376 through the AND circuit 1384 and OR circuit 1390, with both inputs to the AND circuit 1384 being satisfied; and a signal is therefore put onto the OR circuit 1446 at P1 time since the timed "P1" signal is applied onto the AND circuit 1438 by means of the lead 736. A "program valid time" signal is therefore put onto lead 1184 at P1 time by means of the OR circuit 1446. Correspondingly, in the event one of the other program keys 1370, 1372, or 1374 is closed, the corresponding latch 1378, 1380, or 1382 will be set by the corresponding AND circuit 1412, 1418, and 1424.

After one of the switches 1368, 1370, 1372, and 1374 has been closed, the operator then closes the program load switch (see FIG. 13*g*) producing the "program load switch" signal on lead 1167, thus setting the program load latch. The "program load switch" signal on lead 1167 is also applied onto the pick roll latch 564 (see FIG. 13*d*) through OR circuit 566, and latch 564 is thus set to provide a signal on lead 580 to energize the pick roll magnet 182. The constantly rotating pick roll 146 is thus dropped onto the uppermost card 100 in the hopper 144 bearing the program information. The card 100 is then fed out of the hopper similarly as for the punching of a card as previously described. The signal on the line 580 also is applied onto the set side of the primary incrementer latch 582, and the latch 582 is thus set at the time the pick roll latch 564 is set providing a signal on lead 592. The primary incrementer magnet 232 is thus energized similarly as for the punch operation so that the primary incrementer roll 226 is lifted. As previously described, the card sensor, when uncovered by a card 100, provides a "card sensor" signal on lead 578; and, therefore, the AND circuit 594 provides the "punch start" signal on lead 598 at this time. The gate latch 600 is set as in the punch operation, and the pole piece 204 is magnetically held engaged with the deck 170 so that the card 100 is registered at column zero in the punch station. The "punch start" signal on lead 598 is applied onto the AND circuit 832 (see FIG. 13g); and this signal, along with that in lead 1178 from the program load latch 1174 which is set on a closing of the program load switch 1176, provides all of the necessary inputs to the AND circuit 832 to satisfy this circuit so that a "start read transport counter" signal is applied on lead 840 through the OR circuit 834.

The "punch start" signal indicates that the card is registered in the punch station at column zero in contact with the pole piece 204; and, in the read operation which will take place presently, operation will begin on the card in some manner beginning with this position. In the case of punching the card, punching begins at the station as above described. However, in the case of reading, the card must be incremented 13 more columns before it reaches the read station. When the "start read transport counter" signal is applied on lead 840, as just mentioned, the counter 842 is energized and begins operation. The counter 842 is basically a binary counter that counts increments; and as previously described, it is driven by the "-punch dwell" signal in lead 590 which is a signal indicating each time that the card 100 reaches a dwell.

After the counter 842 has counted 13 dwells, it produces the signal "13 increments after punch start" in lead 844; and this signal is applied on the AND circuit 846 along with the timed signal "column 1" in lead 1166. The write read flag latch 848 is thus set at this time, 13 increments after the card has left its column zero position, producing a signal in lead 850 which is applied onto AND circuit 852. The AND circuit 852 has the timed signals "P1" and "bit time C" applied thereto as inputs from leads 736 and 554; and, therefore, a "-write read flags" signal in lead 516 is produced at P1 time and bit time C. Referring to FIG. 4, read flags are located at bit position C in the P1 character in each of the columns of data circulating through the delay line 366; and the "write read flags" signal in lead 516 has the effect of writing such a flag in column 1, the signal in lead 516 being transmitted through the OR circuit 514 (FIG. 13c) onto lead 526 and thereby into the data loop. Similarly, read flags will be written in columns 2 through 96 at bit C position in character P1 in the data circulating through the delay line 366 under the action of the AND circuit 852 which is effective at each bit time C and P1 time. At the end of one memory cycle, the timed signal "column 96" applied by lead 464 to the reset side of the write read flag latch 848 functions to reset the latch 848 so that the AND circuit 852 is inoperative at this time for writing read flags.

After read flags have thus been written into the 96 columns of data circulating through the delay line 366, the system is now ready for reading data from the card 100. The signal 13 increments after "punch start" in lead 844 is also applied to the read start latch 854, and this latch is set. The latch 854 provides a "read start" signal in lead 860 which is applied to AND circuit 862, and the AND circuit 862 is thereupon effective for searching for a read flag. The AND circuit 862 also has the "not stop search latch" signal in lead 868 applied to it, and this signal is raised at this time. In addition, the "transport sync" signal in lead 638 is applied to the AND circuit 862; and this signal is raised at this time after an incremental movement of the card 100. The timed signals "print" and "bit time D & clock B" are also applied to the AND circuit 862 through leads 648 and 866 along with the "A REG D" signal in lead 864 derived from the D trigger in the A register 368. A read flag will exist in the D trigger position of the A register 368 at PR time, bit time D, and clock B time. Therefore, the AND circuit 862, on thus searching for a read flag, locates such a read flag and has all of its inputs satisfied This searching operation by the AND circuit 862 starts in column 1 of the data circulating through the delay line 366 due to the same reasons and mechanism applicable to the AND circuit 446 which is effective for searching for keyboard flags as above mentioned.

The AND circuit 862 on thus locating a read flag at position C of character P1 of column 1 of the data circulating through the delay line 366 sets the read flag latch 874. A "read flag latch" signal is thus provided on lead 1154, and this signal is applied onto the AND circuit 896 (FIG. 13g). The purpose of the AND circuit 896 is to erase the read flag in column 1, and the AND circuit 896 provides a signal through OR circuit 898 onto the inverter circuit 900. The AND circuit 896 also has the timed signals "P1" and "bit time C" effective thereon from leads 736 and 554; and, therefore, while the read flag latch 874 is set, the AND circuit 896 provides a signal through OR circuit 898 onto the inverter circuit 900 during P1 time and bit time C. The output of the inverter circuit 900 generally is raised; however, when the AND circuit 896 is thus effective, the signal on lead 508 ceases so that the AND circuit 504 (FIG. 13c), during P1 time and bit time C, is inhibited. The AND circuit 504 thus blocks the output of the A register 368 at P1 time and bit time C and thus inhibits and erases the read flag in column 1 that existed at bit time C in character P1 in this column.

Under these conditions, AND circuits 1182 and 1186 (FIG. 13g) are also operative, the AND circuit 1186 being operative to gate data into the selected program area in memory and the AND circuit 1182 being operative to erase old data in the program area. Both of these AND circuits 1182 and 1186 at this time have as inputs the "read flag latch" signal in lead 1184, the output signal of the program load latch 1174 in lead 1178, and the "program valid time" signal on lead 1184.

As previously described, the "program valid time" signal on lead 1184 occurs during times P1, P2, P3, and P4 depending on which of the program keys 1368, 1370, 1372, and 1374 has been closed. Therefore, the AND circuit 1182 produces a pulse through OR circuit 898 and onto the inverter circuit 900 so as to cause the signal on lead 508 to cease at this program time and cause the AND circuit 504 to block the output of the A register 368 at this program time whereby to erase old data in the character P1, P2, P4, or P3 circulating through the delay line 366 depending on which of the switches 1368, 1370, 1372, and 1374 has been closed. The six-bit latch 1187, connected by lead 1185, at this time functions to cause the AND circuit 1182 to be active for erasing old data in the program area only between bit time 1 and through bit time B so as to assure that any flags that are in the C and D bit positions of the various characters P1, P2, P4, and P3 are not erased.

The "read flag latch" signal in lead 1154 is also effective utilizing the AND circuit 1186 (FIG. 13g) to cause the reading of data from the punched holes in column 1 of card 100 into the appropriate program section of the data circulating through the delay line 366. At this time, column 1 of card 100 is located over the phototransistors $234_1$ to $234_6$; and a signal is applied onto the transistor 908 from the tier 1 latch 694 through the lead 704. Therefore, if punched holes appear in column 1 in any of the 1, 2, 4, 8, A, and B positions, the corresponding phototransistors $234_1$ to $234_6$ are energized; and the corresponding read amplifiers 916, 928, 930, 932, 934, and 936 are energized through leads 914, 918, 920, 922, 924, and 926. For the program load operation for the verify right adjust, auto dup, auto skip, and end of field functions, only the 1, 8, A, and B bits will be used as is apparent from FIG. 4. The energized ones of these read amplifiers apply signals onto the respective ones of the AND circuits 938, 940, 942, 944, 946, and 948; and these AND circuits are respectively gated to lead 1162 through OR circuit 950 at bit time 1, bit time 2, bit time 4, bit time 8, bit time A, and bit time B due to the fact that these timing signals are respectively applied to these AND circuits by means of leads 398, 400, 402, 404, 406, and 408. These AND circuits thus serialize the data, which is read from the card 100 and which exists in these amplifiers, onto the lead 1162. The AND circuit 1186 is enabled under these conditions as mentioned; and, therefore, the serialized data in lead 1162 from OR circuit 950 and AND circuits 938, 940, 942, 944, 946, and 948 passes through the AND circuit 1186, OR circuit 1188, and lead 520 to OR circuit 514 (FIG. 13c) and to lead 526 in the data loop including the delay line 366. The punched contents of column 1 in card 100 for the particular program selected (P1, P2, P4, and P3, by means of one of the program keys 1368, 1370, 1372, and 1374) has thus been read into the delay line 366 and particularly into the corresponding character P1, P2, P4, or P3 in column 1 of the data circulating through the delay line 366.

Shortly after the read flag latch 874 has been set, the stop search latch 886 is effective to stop the searching of memory by the AND circuit 862 for read flags. The AND circuit 884 is satisfied when the read flag latch 874 is set; and at bit time C and P1 time, due to these signals being applied to the AND circuit 884 at these times through the leads 554 and 736, the stop search latch 886 is set. This discontinues the "not stop search latch" signal in lead 868 applied to the AND circuit 862, and the AND circuit 862 is thereupon inhibited. Subsequently, the read flag latch 874 is reset at print time and bit time C applied as signals onto AND circuit 880 by means of leads 648 and 554. The stop search latch 886 is reset by the "tier reset" signal in lead 646 that occurs at column 32 time applied as a signal on the OR circuit 892, and the signal on lead 868 appears so that the AND circuit 862 is effective to find a read flag at bit position C in character P1 of column 33 of the data circulating through the delay line 366. The circuitry is then effective, as for the data in column 1 of the card 100, to read the openings in column 33 in the card 100. The AND circuit 1182 is utilized for erasing the read flag in column 33, and the AND circuit 1186 is utilized for writing new data into the program area of memory selected by one of the switches 1368, 1370, 1372, and 1374 for this column after the old data in this particular character in memory has been erased by means of the AND circuit 1182. The new data is detected by the phototransistors $234_7$ to $234_{12}$ which are effective for the second tier by virtue of the "tier 2 latch" signal in lead 712. The reading of the punched program data in column 65 similarly occurs as for the reading of the program data for column 33, except that in this case the phototransistors $234_{13}$ to $234_{18}$ are operative by virtue of the "tier 3 latch" signal in lead 720.

Thus, one complete column of reading has been completed, reading the punched program data from the aligned columns 1, 33, and 65 of the card 100; and at this time, the transport sync latch 870 (FIG. 13h) is reset by the "column 96" timed signal effective on the reset side of this latch by means of lead 464. The "transport sync" signal in lead 638 is therefore discontinued, and the AND circuit 862 is thereby inhibited so that it cannot be effective at this time to search for additional read flags. The AND circuit 862 is rendered again effective when another incremental movement of the card 100 takes place; and at this time, another "punch dwell" signal in lead 590 occurs so that the transport sync latch 870 is again set. The setting of the latch 870 indicates that the card 100 has moved another increment so that another column including columns 2, 34, and 66 from the card 100 are positioned in alignment with the phototransistors $234_1$ to $234_{18}$ and may be read. The reading of the punched program information in columns 2, 34, and 66 takes place in the same manner as the punched program information has been read from columns 1, 33, and 65 of the card 100; and the reading of the punched program information from the rest of the card takes place in the same manner. At the time the punched program information in column 96 is being read, the read flag latch 874 is set to provide a signal in lead 1154. The "column 96" signal exists in lead 464, and both of these signals are applied onto the AND circuit 894 to produce the "read complete" signal in lead 826. This signal is applied onto the reset side of the read start latch 854 through the OR circuit 856, and the reading operation is terminated on the resetting of this latch.

At this time, just prior to verification, the operator closes the verify switch 482 (FIG. 13k) if not previously closed, thereby putting the machine into verify mode. It will be assumed at first that the program switch 1366 is open so that the verifying operation takes place without the action of any loaded programs.

The verify switch 482 provides a "verify switch" signal on lead 481 discontinuing the "punch switch" signal on lead 1090 due to the action of the inverter 484. The operator then puts the card 100 to be verified into the hopper 144 and closes the read key 570 (see FIG. 13g), and the action of the latter switch is to cause a read operation to take place. This read operation is similar to the read operation just described in connection with loading programs into the P1, P2, P4, and P3 characters in memory but differs in some details. Closing of the read key 570 provides a "read key" signal on lead 568 through OR circuit 1168 thus setting the read op latch 822. The read op latch 822 thus provides a "read op latch" signal on lead 1156, and this signal is applied to AND circuits 902 and 904. AND circuit 1186, which allowed program data to be read into P1, P2, P4, or P3 in memory during a program load operation, is inoperative because the program load latch 1174 is reset removing the signal on lead 1178 from AND circuit 1186. The "read op" signal on lead 1156 has the same effect on OR circuit 1180 as the signal on lead 1178 had when programs were being loaded; and the AND circuit 832 functions in the same manner as previously described in connection with program loading to provide a "read transport counter" signal on lead 840 which causes the binary counter 842 to count and causes read flags to be written and read, etc. The "read key" signal on lead 568 also has the same effect on the pick roll latch 564 as does the "program load switch" signal on lead 1167 so that the pick roll 146 is lowered onto the card 100 to be verified, and the card is fed by the pick roll 146 and transport 148 to the gate pole piece 204 of the gate 156. The "read op latch" signal is on lead 1156 at this time, and the "read flag latch" signal appears on lead 1154 when reading begins. Therefore, the AND circuit 1248 (FIG. 13n) has all of its inputs satisfied at punch time supplied as a signal to this AND circuit by lead 462. A "verify read" signal is thus provided on the lead 1250 satisfying both of the inputs to the AND circuit 1252 at column 1, punch time; and a signal is thus supplied to lead 1254. The lead 1254 is connected to the set side of the OK to verify latch 1260, and the latch 1260 is thus set while column 1 of the card 100 is being read. This allows the operator to immediately begin verifying while the card being verified is still being read. The OK to verify latch 1260, when thus in set condition, also interrupts the signal "not OK to verify latch" on lead 1118; and, since this signal is supplied to AND circuit 460 (FIG. 13b), the AND circuit 460 and the K to P transfer latch 456 are disabled at this time so that the "K to P transfer latch" signal on lead 468 is not provided even though the K to P transfer request latch 1108 may be set.

The signal on lead 1254 is also supplied to the set side of the erase error flag latch 1256 setting this latch to thereby provide a signal on lead 1216. The AND circuit 994 is therefore satisfied at this time and at P3 and bit time C to thereby provide a signal on lead 1222 and an "erase flags" signal on lead 510. The "erase flags" signal on lead 510 is thus effective for the first column at P3, bit time C, so as to erase the error flag existing at the bit C position of character P3 for column 1. The AND circuit 994 is similarly effective to subsequently erase the error flags for the remainder of the columns 2 through 96. After erasing all of the error flags, the erase error flag latch 1256 is reset at column 96 and punch time which are effective as signals on AND circuit 1258.

As has been described in connection with the program loading operation, data is read by the phototransistors $234_1$ to $234_{18}$, and the read data is provided by the read serializer comprising the AND circuits 938, 940, 942, 944, 946, and 948 and the OR circuit 950, on the read data lead 1162. For each column of data to be read into memory, in this case, the AND circuit 904 is operative instead of the AND circuit 1186 so that this data is read through OR circuit 1188, lead 520, and OR circuit 514 (FIG. 13*c*) into the data loop including lead 526. This reading of data is into the punch character for the particular column of information circulating through the data loop including the delay line 366, since the AND circuit 904 is effective at punch time due to the fact that the timed "punch" signal is impressed on AND circuit 904 by means of lead 462.

Under these conditions, the AND circuit 902 functions to erase old data in the punch character for the particular column of data circulating through the data loop since signals are present in both of the leads 1154 and 1156; and the timed "punch" signal on lead 462 is applied onto the AND circuit 902 as an input. Therefore, at punch time, the OR circuit 898, inverter 900, and AND circuit 504 (FIG. 13*c*) are effective to erase the old data in the PU character of the data circulating through the data loop for the particular column being read.

For purposes to be described, the data read from a card 100 to be verified is also inserted into the PR character of the data circulating through the delay line 366; and the circuits 1152 and 1160 (FIG. 13*c*) have the function of inserting the data also into the print section of memory for the particular column under consideration. The AND circuit 1152 has all of its inputs satisfied at this time—the "verify switch" signal 481 is in existence due to the closure of the verify switch 482; and the "read op latch" signal is present on lead 1156 since the read op latch 822 is set. The "read flag latch" signal is in existence on lead 1154 as is described in connection with reading a program into memory. The AND circuit 1152 has the timed "-punch" signal effective on it as an input, and the output of the AND circuit 1152 is inverted by the inverter 1150 to be effective on AND circuit 490 so that any prior data in the particular column under consideration is thereby erased due to the function of the AND circuit 490 having the output lead 1148 from the inverter 1150 as an input to the AND circuit. The inputs to the AND circuit 1160 are the same as those of the AND circuit 1152 except that the "read data" signal on lead 1162 is also an input, this being the data to be read into memory. Therefore, the data read by the read section 362 at this time is read into memory by the AND circuit 1160 and the connected OR circuit 496; and, in view of the fact that the OR circuit 496 is at the output end of the delay line 366, this reading is done into the print section of the particular column under consideration even though it is the timed "punch" signal on lead 462 that is used on both of the AND circuits 1160 and 1152. The other columns of data read from the card 100 to be verified are thus read into the PR characters of the data circulating through the delay line 366 so that the full contents of the card is in memory.

Verification consists in general of rekeying the 96 columns of data from the original source document, which should contain the same data as the card 100 that has just been read, assuring that no mistakes occurred either in the original keying or in rekeying. The new data—namely, the data that is entered from the keyboard 128 on a rekeying—is compared against the data that was read from the card and which now is in the PU characters of the data circulating through the delay line 366. If the two pieces of data correspond, there has been no error in the original keying or in the rekeying; and the card 100 will be notched by means of the notcher 160 so as to provide a visible evidence that the card has been checked and is a valid card. On the other hand, if a mistake has been made, the error light 977 will be lighted and the keyboard 128 will be locked. The operator may then attempt to rekey the data again; and if a continuing error is made on the second keystroke as indicated by the error light 977 continuing to be lighted, the operator may then rekey the data with a third keystroke causing the data in that particular column circulating through the delay line 366 to be changed. The simultaneous indication will be made that this document card 100 attempted to be verified has an error, and the system writes an error flag in memory. This particular card may be considered an error card and will not be notched.

The 96 columns of data have been read from the document card 100 into the data circulating through the delay line 366 as above described, and the document card is stopped at a notcher station in which the card is disposed beneath the notcher 160 so that the notcher 160 may be effective to notch the card adjacent its trailing edge if the card is completely verified. The AND circuit 836 (FIG. 13*g*) in the read section 362 has the signal "verify switch" applied to it from the lead 481, and it also has the signal "read complete" applied to it at this time from the lead 826. The AND circuit 836 is thus effective to provide a signal through the OR circuit 834 and the lead 840 to the counter 842, and the counter at this time generates a signal in the lead 1016 which may be termed "ten increments after read complete". This is a signal generated by the counter 842 after the document card 100 has been incremented ten positions beyond the point at which reading of the card was finished. The signal "ten increments after read complete" in the lead 1016 is applied to the AND circuit 1014 (FIG. 13*e*) along with the signal "verify switch" in the lead 481, and the AND circuit 1014 is thus satisfied and sets the secondary incrementer latch 1012. The latch 1012 being set provides a signal in the lead 1018, and the second incrementer magnet 274 is thus energized so that it is effective to lift the second incrementer pressure roll 266 off the card 100 so as to thereby stop the card 100 with its trailing edge under the notcher 160. The card 100 remains in this position, which may be considered to be a verify station, throughout the entire verify operation as the operator attempts to rekey the entire 96 columns of data and until verification is complete; and at this time, the notcher 160 is either actuated to notch the card 100 or remains unactuated in the case of an error card.

With the card 100 in its verify position in the card transport, the operator proceeds to rekey the first column of data from the source document; and the encoded data, due to this depression of a data key 132 or the space key 134, is entered into the entry register 372 as has been previously described. The keystroke also has the effect through the keyboard control logic 434 to provide the "any data key" signal in the lead 438 and to cause the AND circuit 444 to search for keyboard flags as previously described. When the keyboard flag in the first column of the data circulating through the delay line 366 is located, the AND circuit 444 causes the keyboard service latch 450 to be set so as to provide a "keyboard service" signal on the lead 418. There is no transfer of data at this time from the entry register 372 into memory including the delay line 366 by virtue of the fact that the "punch switch" signal on lead 483 connected to AND circuit 414 (FIG. 13*b*) is not present in verify mode; and the AND circuit 414, normally allowing transfer of data to the delay line from the entry register, is inhibited.

The bits 1, 2, 4, 8, A, and B from the entry register 372 are provided through the buss 954 to the compare circuit 952 (see FIG. 13*e*); and the bits 1, 2, 4, 8, A, and B in the A register 368 are provided through the buss 784 to the compare circuit 952. In view of the fact that the 96 columns of data are circulating through the A register 368, these bits of data provided from the A register 368 to the compare circuit 952 are continuously changing.

When there is a compare of the data provided from the entry register 372 and from the A register, the compare circuit 952 provides a signal in the lead 956. At this time, the inverter circuit 958 does not supply a signal to its output lead 960. Nothing in addition takes place at this time as a result of the compare; however, the keyboard flag is erased for the particular column keyed. This is done by the AND circuit 422 (FIG. 13b) as previously described; and this AND circuit functions to erase keyboard flags since it acts through OR circuit 428, inverter 430, and AND circuit 504 at P3, bit time D. The operator may then proceed to verify the next column of data. On the other hand, if the data supplied from the A register and from the entry register 372 to the compare circuit 952 does not compare, there is no signal on the lead 956; and the inverter circuit 958 provides a signal on lead 960. The "- keyboard service" signal is effective on location of the keyboard flag in column 1 of the data circulating through the delay line 366; and at punch time and at bit time 1 & clock B times, the signals for which are provided by the leads 462 and 670, the AND circuit 962 provides the "verify noncompare" output signal in lead 964. The signal "not auto skip latch" as an input to AND circuit 962 exists at this time. The use of the timing signals "punch" and "bit time 1 & clock B" assure that the AND circuit 962 is effective in this regard only with respect to the data in the PU character of the first column of data circulating through the delay line 366 which is that data that has been read from column 1 of the card 100.

The "verify noncompare" signal in lead 964 applied on the set side of the lock keyboard latch 966 causes the latch 966 to be set and provides a signal on lead 1194 and provides the "-verify lock keyboard" signal on lead 976 through OR circuit 1196. This signal on lead 976 is applied onto the keyboard control logic 434 which is effective to discontinue a signal on lead 440 for de-energizing the keyboard restore magnet 442 to lock the keys 132 and 134 of the keyboard 128. The signal on the lead 1194 also has the effect of lighting the error light 977 indicating to the operator that an error has occurred. The signal on lead 964 is also applied onto the error counter 978, and the counter 978 is stepped and is effective to provide an output signal on lead 980.

The "verify noncompare" signal on lead 964 is also effective on the backspace control logic 1212; and, since at this time the update memory latch 986 is in reset condition, the backspace control logic 1212 is energized to provide a "write backspace flag" signal on output lead 1126. As previously described in connection with the actuation of a data key 132 or the space bar 134, the AND circuit 504 (FIG. **13*c*) is effective at this time to effect the erasing of the keyboard flag for the column for which the data key or space bar has been actuated which in this case is considered to be column 1. The backspace control logic 1212 is of such construction that the "write backspace flag" signal is provided at column 1, P3, and bit time D; and this signal is effective on OR circuit 514 so as to rewrite the keyboard flag back into bit D, character P3, column 1, of the data circulating through the delay line 366 so that the column 1 keyboard flag is back in again for this column in the circulating data. The backspace control logic 1212 is similarly effective, assuming that the machine is operating in an advanced column such as column 10, to rewrite a keyboard flag in the preceding column of the data circulating through memory; and the backspace control logic is effective to so perform its function when both the "verify noncompare" signal and the signal on lead 1210 from the update memory latch 986 exists. In either of these cases, just prior to a backspace, the column indicator 486** has not yet been set to its succeeding column indication and remains in its preceding column indication so that the column indicator correctly indicates the column in which the machine is operating.

The lock keyboard latch 966 may be reset by use of the error reset key 974 that provides the "error reset key" signal on the lead 970. On resetting of the latch 966, the keyboard 128 is unlocked; and the error light 977 is turned off. The operator may then re-enter the first column character by using the proper data key 132 or space key 134. Assuming that the mistake was made on the first rekeying, there is a compare by means of the compare circuit 952 so that there is a signal in the lead 956 but none in the lead 960 to be effective on the AND circuit 962; and the operator may continue by verifying the second column of data.

The error counter 978 is reset at this time by means of the AND circuit 1236 (FIG. **13*e*). The AND circuit 1236 has its inputs satisfied when the second keystroke takes place to provide the "keyboard service" signal on lead 418, and the signal on lead 956 is present when the compare takes place in the compare circuit 952. Therefore, at punch time and bit time 1 applied as signals on AND circuit 1236 by means of leads 462 and 398, the AND circuit 1236 has its inputs satisfied. The output signal from the AND circuit 1236 is transmitted through the OR circuit 1238 and lead 1240 to the error counter 978, and the error counter 978 is of such construction that the signal on lead 1240** resets the error counter.

Assuming however that on the second rekeying of the column there is another noncompare, the inverter 958 supplies a signal on lead 960; and the AND circuit 962 is effective as before to provide a "verify noncompare" signal on the lead 964. This signal on lead 964 is effective on the error counter 978 to again step the error counter, and the error counter at this time provides a signal on lead 982 but none on lead 980. At this time, the operator resets the lock keyboard latch 966 using the error reset key 974 and depresses another key 132 or 134 on the keyboard 128. If there is still a noncompare at this second keying, the lock keyboard latch 966 is set as before and the backspace control 1212 is effective for providing a "-write backspace flag" signal on lead 1126 to again rewrite the keyboard flag into column 1 (P3, bit D positions) and to again turn the error light 977 on.

At this time, the operator resets the system again with the error reset key 974 and applies a third keystroke from the keyboard using one of the keys 132 or 134; and on this third keystroke, if the data from the keyboard does not match that from memory so that there is no compare by the circuit 952, the signals will again appear on leads 960 and 964 to set the error counter 978 to its "3" condition. At this time, the counter 978 provides output signals on both leads 980 and 982 so that the AND circuit 984 is enabled to provide a "-column error" signal on its output lead 1204.

The "column error" signal on lead 1204 is applied through OR circuit 1206 on the update memory latch 986 to set this latch so that it provides the "update memory latch" signal on the output lead 1140. At this time, the data from the entry register 372 which is the data resulting from the third keystroke is gated into memory including delay line 366 using the AND circuit 1138 (FIG. **13*b*). As will be observed, the AND circuit 1138 has the input signals "verify switch", "update memory latch", and "punch" in addition to the "keyboard service" signal on lead 418 which is present at this time; and, therefore, the AND circuit 1138 is satisfied at punch time to gate the contents of the entry register 372 through AND circuit 1138, OR circuit 1134 and OR circuit 514 into the data circulating through the delay line 366. Therefore, the update memory latch 966 together with the associated circuitry has been effective to place the last character that the operator keyed and thereby placed in the entry register 372** into memory at punch time of that column (column 1 in the present instance).

The "update memory latch" signal on lead 1140 is effective on AND circuit 990 so that the inputs of this AND circuit are satisfied at bit time C of P3 time to provide the "write error flag" signal on lead 524 and thereby onto OR circuit 514 (FIG. 13c) to write an error flag at P3, bit time C, of the next column (column 2) of the data circulating through the delay line 366. The update memory latch 986 is reset at the following keyboard time so as to discontinue the writing of error flags. The "write error flag" signal on lead 524 is also applied through OR circuit 968 (FIG. 13e) at this time onto the reset side of the lock keyboard latch 966 so that the latch 966 is reset. In addition, the setting of the update memory latch 986 inhibits the signal on lead 1210 so that the backspace control logic 1212 at this time is not utilized for writing a backspace flag on lead 1126; and there thus is no backspace effective on the third try in the event of an error. The signal "write error flag" on lead 524 is also effective at this time through OR circuit 1238 and lead 1240 to reset the error counter 978 in its original condition. The lock keyboard latch 966 is reset at this time as mentioned; and, therefore, the keyboard control logic 434 unlocks the keyboard 128. The "not verify lock keyboard" signal on lead 480 is also supplied from latch 966 under these conditions, and this signal is effective on the AND circuit 476 (FIG. **13*k*) with the "verify switch" signal in lead 481 and "keyboard service" signal in lead 418 to energize the column indicator control 479 through the OR circuit 478 so as to cause an updating of the column indicator 486 so that the digit "2" appears on the column indicator. The following actuation of one of the data keys 132 or of the space key 134** thus has the effect of causing a compare to take place with respect to column 2 data.

Compare operations are performed with respect to the data circulating through the delay line 366 for the column 2 and the succeeding columns in the same manner as the compare operation was performed between the data of column 1 circulating through the delay line and that provided to the entry register 372 by the first depression of a data key 132. Eventually, comparison operations will have been performed with respect to the entire record; and the K to P transfer request latch 1108 is set as above described in connection with initial data entry prior to punching, so as to provide the "K to P transfer request latch" signal on lead 1112. The AND circuit 1000 has applied to it the "K to P transfer request latch" signal on lead 1112, the "OK to verify latch" signal on lead 1202, the "A REG A" signal on lead 730 derived from the A trigger of the A register 368, and the timing signals "P3" and "bit time 4 & clock B" on leads 424 and 448; and the AND circuit 1000 functions to search for any error flags in memory during the K to P transfer cycle. As above described, the error flags occur in bit position C of the P3 character in those of the 96 columns of data circulating through the delay line 366 for which errors were detected; and these errors will be present in the A trigger of the A register 368 at P3 time, bit time 4, and clock B time so that the AND circuit 1000 is thus effective to search for any of the error flags in the circulating data. If the AND circuit 1000 is satisfied, it indicates that the card under examination contains at least one error and perhaps others. The AND circuit 1000 is on the set side of the card no good latch 998; and, with a card having such an error in it, the latch 998 is set and discontinues the signal from the latch 998 in the lead 1002. The general effect of the card no good latch 998 on setting is to indicate that the particular card under examination is in error and should not be notched.

Assuming that no errors have been found in the card under examination, the AND circuit 1000 is not satisfied any time during the examination of a document card 100; and under these conditions, the card no good latch 998 remains in its reset condition. Under these conditions, a continuous "not card no good latch" signal will be applied on lead 1116 maintaining the repunch latch 1228 in reset condition so that latch 1228 applies a signal through lead 1232 to AND circuit 1004. With the "K to P transfer latch" signal existing on lead 468, and at column 20 time during a K to P transfer operation, the AND circuit 1004 has all of its inputs satisfied. It, therefore, sets the notch latch 1006 through OR circuit 1234. Therefore, after examination of the complete card 100, the notch latch 1006 is set and provides a signal on its output lead 1010 which is connected to the notch magnet 246. The notch punch 242 is thus driven through the card 100 so as to notch the card to provide a visual indication on the card that it has been checked and that no errors have been found. The notch latch 1006 is reset at the following column 96 time supplied as a signal by means of lead 464 on the latch 1006; and the purpose of the "column 20" and "column 96" signals supplied to the AND circuit 1004 and the notch latch 1006 is to provide a pulse of 4 milliseconds in duration applied to the notch magnet 246 (from column 20 through column 96) so that a pulse of sufficient duration is effective on the notch magnet 246 to cause the notch punch 242 to make its full stroke through the card 100 and back again.

Under error conditions in which the card no good latch 998 is set, the signal from this latch on lead 1002 is not supplied; and, therefore, the AND circuit 1004 and latch 1006 cannot be effective to energize the magnet 246. The particular card 100 under consideration under these conditions remains unnotched thus indicating that a valid check of the card has not been completed.

During the K to P transfer operation, the "K to P transfer latch" signal is supplied to the reset side of the secondary incrementer latch 1012 from the lead 468; and the latch 1012 is reset. This has the effect of discontinuing the signal on lead 1018 and of de-energizing the magnet 274 so that the incrementer roll 266 drops onto the card 100 and feeds the card further along the card transport into the stacker 166. If the card thus fed to the stacker 166 has been notched, the card is thereby indicated to be found valid and without errors on verification while, if the card has no notching, it contains errors and should be replaced.

Figure 13M:
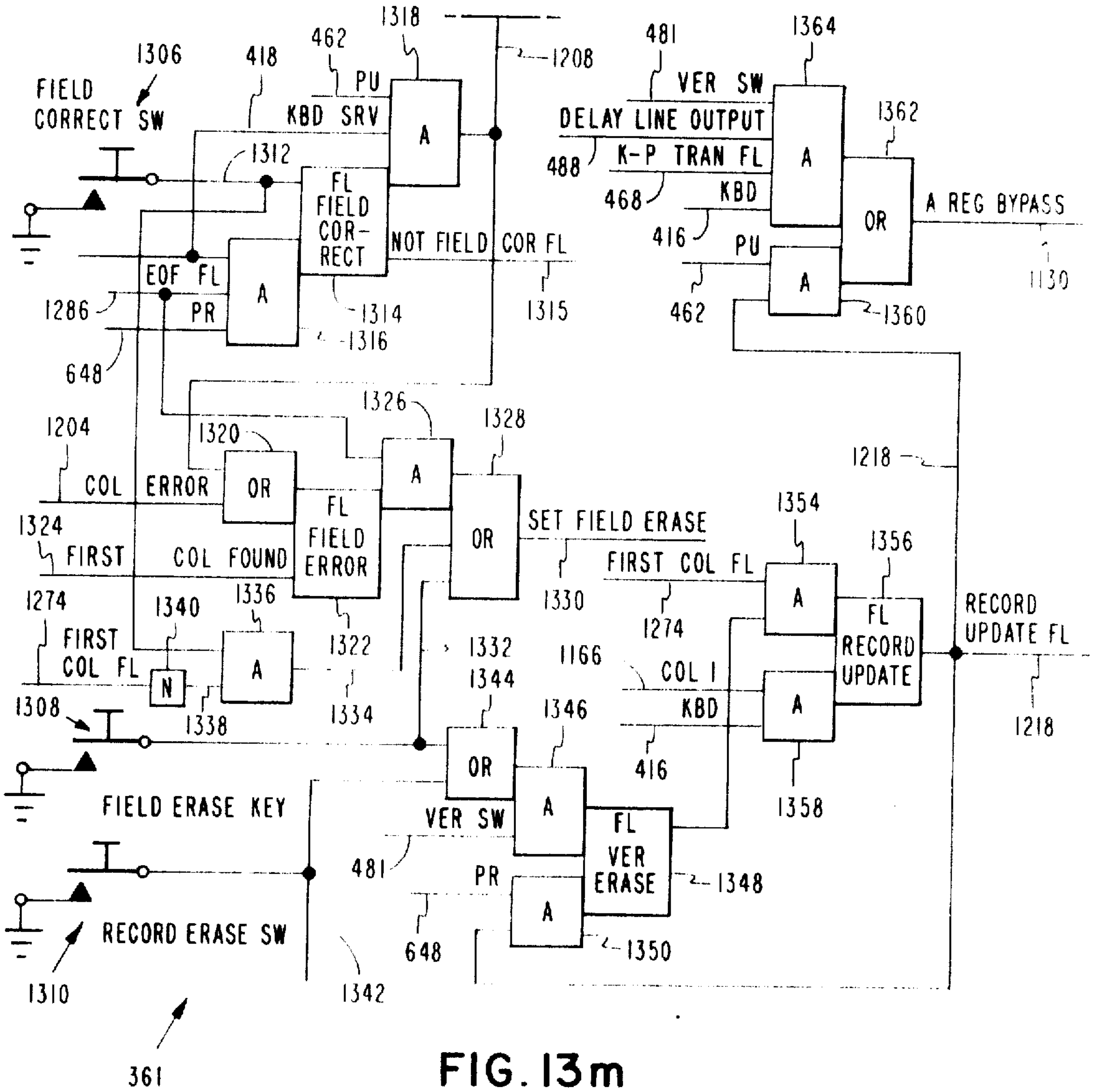
Figure 13N:
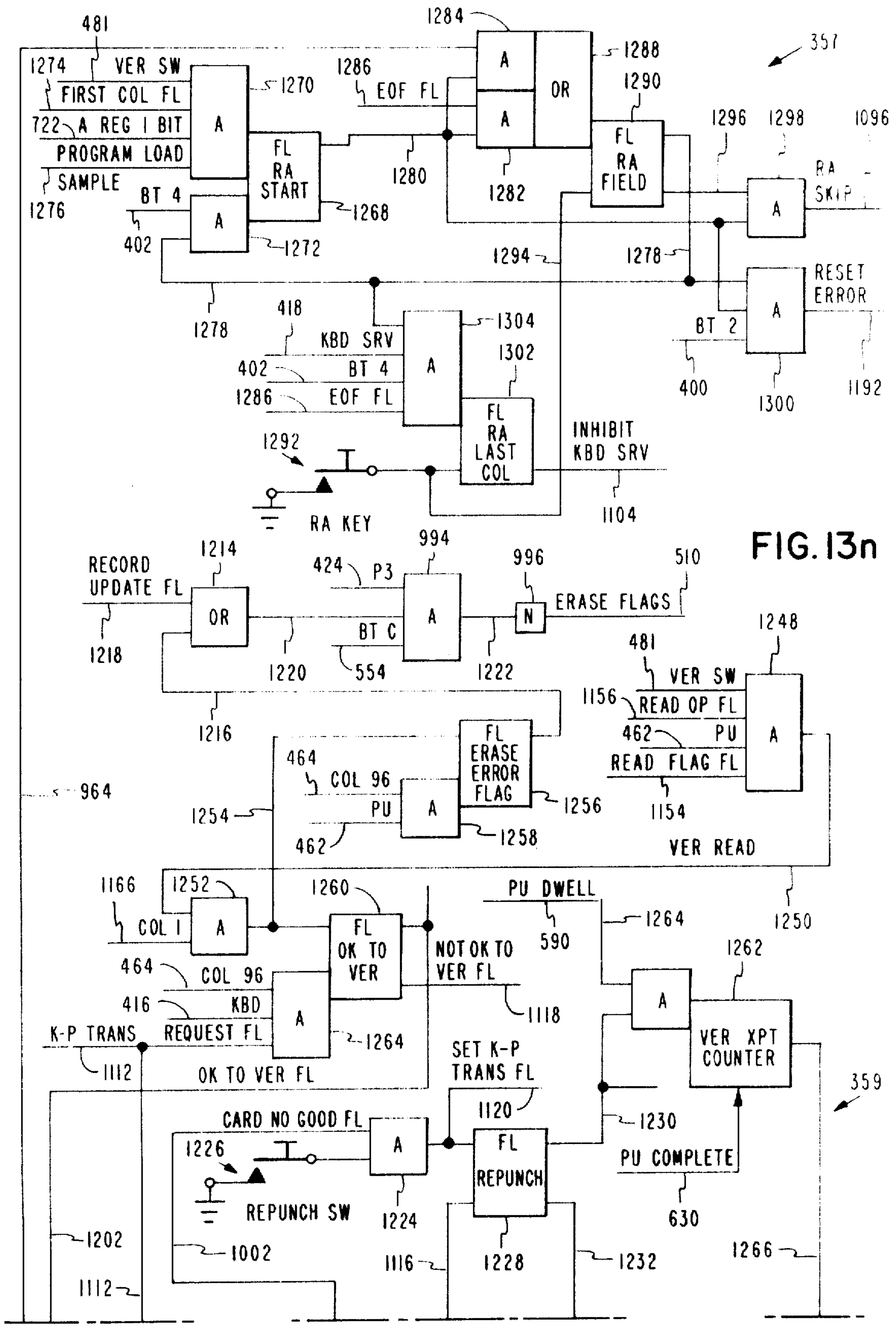

Under the condition in which the three keystrokes have been taken with respect to a particular column in a card 100 being verified, indicating that the card being verified had an error in it, another fresh card 100 may be punched using the repunch switch 1226 (FIG. 13*n*). When the three keystrokes have been taken during verification, the "column error" signal exists on lead 1204, the data from the entry register 372 resulting from the third keystroke has been gated into the punch section of the data circulating through memory for the particular column being verified, and an error flag has been written in the circulating data indicating that an error exists in that column.

The AND circuit 1000 (FIG. 13*e*) is effective at this time to look for error flags circulating through memory, and the error flag located in memory as a result of the third keystroke causes the AND circuit 1000 to have its inputs satisfied so that the card no good latch 998 is set. The K to P transfer request latch 1108 is in set condition, and the "K to P transfer request latch" signal on lead 1112 resets the OK to verify latch 1260 at column 96, keyboard time, disabling the AND circuit 1000 after the card no good latch has been set. The operation at this time stops insofar as the machine is concerned.

The operator must now take some action so as to restart operation; and, at this time, in the punch section of memory for the particular column under consideration is located the correct data required to remake the card. The operator then puts a new blank card 100 into the hopper 144 and closes the repunch switch 1226 (FIG. 13*n*). The AND circuit 1224 (FIG. 13*n*) thus has its inputs satisfied so as to provide the signal "set K to P transfer latch" on lead 1120, and the K to P transfer latch 466 (FIG. 13*b*) is set. The repunch latch 1228 (FIG. 13*n*) is also set by the signal on lead 1120.

When the K to P transfer latch 466 is set, the AND circuit 1364 (FIG. 13*m*) has its inputs satisfied producing an "A REG bypass" signal on lead 1130; and this signal is applied onto AND circuit 1128 (FIG. 13*b*) in order to transfer the data existing in the punch sections of memory to the keyboard sections of memory. When the machine is in verify mode with the verify switch 482 closed, data is transferred from the PU characters of the circulating data in memory to the KBD characters of this data (particularly for an auto dup function to be hereinafter described) rather than from the KBD characters to the PU characters as is done when data is being entered into the machine from the keyboard 128 particularly due to the functioning of the AND circuit 558 (FIG. 13*c*) which is inhibited when the "punch switch" signal on lead 1090 is not supplied thereto under the condition in which the verify switch 482 is closed. The AND circuit 558 in inhibited condition prevents the normal keyboard-to-punch transfers from the KBD characters to the PU characters of the circulating data. The AND circuit 504 connected with the A REG bypass lead 1130 by means of the inverter 1132 has the effect of erasing the data existing in the keyboard sections of memory, and the OR circuit 514 connected with the AND circuit 1128 by the lead 1124 has the effect of inserting the data previously in the punch sections of memory into the keyboard sections of memory.

The AND circuit 548 (FIG. 13*c*) at this time functions to write punch flags into the circulating data, and the AND circuit 542 functions to write keyboard flags in this circulating data. The "K to P transfer latch" signal on lead 468 existing at this time also develops the signal "K to P feed start" on lead 1110 utilizing AND circuit 1164; and the "K to P feed start" signal sets the pick roll latch 564 so that the new card 100 is fed out of the hopper 144 into the transport. The card then moves to its punching position.

At this time, the signal "punch start" on lead 598 is developed by the AND circuit 594 as previously described, and a punch operation is started in which the punch op latch 624 (FIG. 14*e*) is set; and the card now is punched as previously described. The only difference between the previously described punch operation and that now in progress is that increments are now being counted by the verify transport counter 1262 (FIG. 13*n*). The AND circuit 1264 is satisfied at each "punch dwell" signal impressed thereon from lead 590, and the verify transport counter 1262 is so constructed as to count 23 increments after the signal "punch complete" impressed thereon by means of lead 630 to provide a signal on lead 1266 at this time. This signal on lead 1266 causes the new card to be notched subsequent to the complete punching of the card. The signal "punch complete" at this time also starts the printing operation so that the card is printed in the same manner as has been previously described. The new card 100 therefore is punched, notched, and printed in this operation.

After printing is completed, the signal "print complete" on lead 746 resets the card no good latch 998 and also generates the signal "verify read start" on lead 1170 through AND circuit 1246 and OR circuit 1244. The "verify read start" signal on lead 1170 is applied through OR circuit 1168 (FIG. 13*g*) to set the read op latch 822, and the read op latch 822 at this time provides a normal read cycle to read the next card to be verified.

In verify mode, with the program switch 1366 and one of the program keys 1368, 1370, 1372, and 1374 being closed, the program data circulating through the delay line 366 is sampled by means of the AND circuit 1456 (FIG. 13j); and it will be noted that this AND circuit 1456 is under the control of the "program valid time" signal on lead 1184 as well as by the "keyboard service" signal on lead 418 and the timed signal "bit time 1 & clock B" on lead 670. As has been previously explained, the "program valid time" signal occurs at either P1, P2, P3, or P4 time due to the functioning of the AND circuits 1438, 1440, 1442, and 1444. Therefore, the AND circuit 1456 is effective to produce the signal "program load sample"; and the AND circuits 1458, 1460, and 1462 (FIG. 13*j*) and AND circuit 1270 (FIG. 13*n*) effectively examine the program data for the particular column under consideration for auto skip, auto dup, end of field, and verify right adjust respectively. As will be observed from FIG. 4, this program data may constitute bits A, 8, B, and 1 in any of the data of the four programs circulating through the delay line 366. If the auto skip, auto dup, end of field, or verify right adjust data appears in the particular column being sampled by the AND circuit 1456, the respective latch 1450, 1452, 1454, or 1270 is set at that particular time. The AND circuit 1456 acting in conjunction with the AND circuit 1458, which has the signal "A REG A" applied thereto, causes a setting of the latch 1450 since the A bit is present in the A register 370 at bit time 1 and clock B for the particular column under consideration, when the A bit is present in this column. The auto skip latch 1450, therefore, at this time, provides an "auto skip latch" signal on lead 1098; and this signal is applied onto OR circuit 1094 (FIG. 13*a*). The "auto skip latch" signal is thus effective through OR circuit 1094 and AND circuit 444 to provide a keyboard service cycle at this time in which the data circulating through the delay line 366 is examined for a keyboard flag.

As has been previously explained in connection with the entry of punch data into the data circulating through the delay line 366, the "keyboard service" signal in lead 418 is effective on the AND circuit 422 (FIG. 13*b*) to cause the keyboard flag for the particular column under consideration to be erased; and the keyboard flag in this case, in verify mode, is correspondingly erased. There may be an auto skip bit existing in a number of consecutive columns of the data circulating through the delay line 366 for the particular column under consideration, and the auto skip latch 1450 is correspondingly effective for each of the consecutive columns to locate a keyboard flag and to erase that flag utilizing the AND circuits 444 and 422 as just mentioned.

Each time that a keyboard flag is located and erased with a keyboard service cycle, the column indicator 486 is updated by one digit indicating that the machine is functioning in the updated column; and when the series of auto skip bits in the program is at an end, the column indicator indicates the next column subsequent to that in which the series of auto skip bits terminated.

The auto skip latch 1450 is reset and set for each of the keyboard service cycles; and for each of these cycles, it provides the signal "not auto skip latch" on lead 1190 which is applied onto AND circuit 962 (FIG. 13*e*). The AND circuit 962 inhibits the effect of the compare of the contents of the A register 368 and the entry register 372 so that there can be no effect for these particular columns of a compare or lack of compare of data; so there is no signal for these columns on the lead 964 for actuating the error counter 978, for example. Therefore, the circuitry under these conditions simply skips over each of the columns without having an effective compare operation; and it will be understood that the auto skip latch 1450 is reset for each of the columns and samples a second column after a first column, for example, to determine if the auto skip bit is located in the second column as well as in the first column.

If, while still in verify mode with the verify switch 482 closed, an auto dup bit is detected in the program examined by the AND circuit 1456 (FIG. 13*j*), the auto dup being bit 8 in each of the programs as illustrated in FIG. 4, the auto dup latch 1452 will be set. The AND circuit 1456 acting in conjunction with the AND circuit 1460, which has the signal "A REG 8" applied thereto, causes a setting of the latch 1452 since the 8 bit is present in the A register 360 at bit time 1 & clock B for the particular column under consideration when the 8 bit is present. The auto dup latch 1452 being thus set provides an "auto dup latch" signal on lead 1100, and this signal is applied to OR circuit 1094 (FIG. 13a) so as to set the keyboard service latch 450 so that this latch examines the A register for a keyboard flag and causes the erasing of this keyboard flag similarly as just described in connection with an auto skip function.

The "auto dup latch" signal on lead 1100 is also applied to OR circuit 1480 (FIG. 13*j*); and the AND circuit 1482, therefore, at this time and at P3 time and bit time D applied as inputs onto this AND circuit by means of leads 424 and 426, provides the signal "reset entry register" on lead 1484. This signal on lead 1484 is applied to each of the OR circuits 1048, 1060, 1062, 1064, 1066, and 1068 so as to thereby reset each of the latches 1030, 1032, 1034, 1036, 1038, and 1040 in the entry register 372. The entry register 372 is thus reset at P3 time, bit time D.

The AND circuit 1486 (FIG. 13*j*) has the "auto dup latch" signal applied to it as an input and in addition has the "verify switch" signal in lead 481 and the timed "keyboard" and "bit time 1 & clock B" signals applied as inputs; and the AND circuit 1486 thus has its inputs all satisfied at this time so as to produce a "dup load" signal on lead 1492 through OR circuit 1488. The "dup load" signal is applied to each of the AND circuits 1044, 1070, 1072, 1074, 1076, and 1078. These AND circuits have their inputs satisfied by means of the 1, 2, 4, 8, A, and B bit triggers in the A register so that the contents of the A register are loaded into the latches 1030, 1032, 1034, 1036, 1038, and 1040; and the data that is loaded is that data from the keyboard section of memory from the previous card 100 that was verified. At this time, a normal compare operation is done by the exclusive OR circuit 952 and the AND circuit 962 (see FIG. 13*e*). If there is no error, a compare occurs and the machine simply goes on to the next column. If, however, there is an error, there is therefore no compare; and a signal appears on the output lead 964 from the AND circuit 962 and the machine stops as previously described. In this case, the operator can reset the machine using the error reset key 974 to provide a signal on lead 970 applied to OR circuit 968 so as to again enter data using the keyboard 128.

The machine is now assumed to be in program mode with the program switch 1366 closed. Under these conditions, the AND circuits 1456 and 1462 (FIG. 13*j*) effectively sample the B bit for the particular column under consideration in the particular characters P1, P2, P4, and P3 selected by one of the switches 1368, 1370, 1372, and 1374. If this B bit is located, the end of field latch 1454 is set; and this latch when set defines the end of a field. If there were no B bits in the particular program under consideration, there would be only in effect one field which would include the complete record of 96 columns; however, if there were B bits existing in columns 10, 20, 30, and 40, for example, there would be four fields in this case ending with columns 10, 20, 30, and 40 in which the B bits were located. The fields define certain operations in verify mode under program control as will be hereinafter described.

The circuitry for verify right adjust samples the entry register 372 at program valid time impressed as a signal on lead 1184 (FIG. 13*i*) in the same manner as for the auto skip and auto dup functions. The circuitry is effective for looking for a one bit in the first column of a field, and this is accomplished by means of the AND circuit 1270 (FIG. 13*n*). For this purpose, the AND circuit 1270, in addition to the "verify switch" and "A REG 1" signals in leads 481 and 722, has the "program load sample" signal in lead 1276 and "first column latch" signal in lead 1274 impressed on it. As will be apparent from FIG. 13*j*, the "program load sample" signal is supplied on lead 1276 during program valid time and also at bit time 1 and clock B and when the keyboard service latch is set on locating a keyboard flag since the "keyboard service" signal on lead 418 is impressed on the AND circuit 1456 providing the "program load sample" signal. The "first column latch" signal on lead 1274 is provided just after the end of a field evidenced by the "end of field latch" signal on lead 1286 provided as an input to AND circuit 1470 (FIG. 13j) and which is also at bit time 2 and print time while the "keyboard service" signal on lead 418 is in existence.

When the AND circuit 1270 is effective for locating a one bit in the first column of a field as above described, the right adjust start latch (FIG. 13*n*) is set. The AND circuit 1298 is then satisfied providing the signal "right adjust skip" on lead 1096. The "right adjust skip" signal is applied onto the OR circuit 1480 (FIG. 13*j*); and while this signal is in existence, the AND circuit 1482 is effective for resetting the entry register 372 and in particular for resetting the latches 1030, 1032, 1034, 1036, 1038, and 1040. The entry register 372 will thus be blank; and subsequently during this operation, the exclusive OR circuit 952 is effective to compare the contents of memory with the entry register. When there is a compare, a blank has thus been effectively located in the data circulating through memory. The "right adjust skip" signal on lead 1096 is also applied to OR circuit 1094 (FIG. 13*a*), and a keyboard service cycle is thereby begun in which the AND circuit 444 scans the data flowing through the delay line 366 for a keyboard flag and in which the keyboard flag is subsequently erased. The accomplishment under these conditions is really a search being made for a blank column which amounts to a manual skip operation. Therefore, at this time, when there is a blank in the data circulating through memory, the exclusive OR circuit 952 and the AND circuit 962 (FIG. 13*e*) provide a compare operation; and this compare operation continues for the consecutive columns until a nonblank column is located. At this time, a signal exists on lead 964 indicating an error. Therefore, the error counter 978 is set, the lock keyboard latch 966 is set, and the backspace control logic 1212 is effective to do a backspace, writing a backspace flag in the KBD character of the column in which the keyboard flag has just been erased. The right adjust field latch 1290 (FIG. 13*n*) is also set at this time since both the output signal on lead 1280 from the right adjust start latch and the "end of field latch" signal on lead 1286 are in existence at this time; and, therefore, the "right adjust skip" signal on lead 1096 is discontinued due to the fact that the signal on lead 1296 applied as an input to the AND circuit 1298 is discontinued when the right adjust field latch 1290 is set.

With the right adjust field latch 1290 being set, the AND circuit 1300 (FIG. 13*n*) is satisfied at bit time 2 and provides the "reset error" signal on lead 1192. This signal is applied onto the OR circuit 1238 (FIG. 13*e*) and on the OR circuit 968 (FIG. 13*e*) for respectively resetting the error counter 978 and the lock keyboard latch 966.

Therefore, with these operations, the machine has skipped the preceding blank columns in a right adjust field and has located a nonblank column; and it has then backspaced to that nonblank column and has unlocked the keyboard (by resetting the lock keyboard latch 966) so that the operator can again commence keying. If the machine does not locate a noncompare before reaching the end of a field, the right adjust field latch 1290 (FIG. 13*n*) remains set using the AND circuit 1282 effective through the OR circuit 1292 on the set side of the latch 1290.

The operator now enters the data for the right adjust field in a normal manner until the last column of the right adjust field is reached; and at that time, the right adjust last column latch 1302 (FIG. 13*n*) is set. The "inhibit keyboard service" signal on lead 1104 is thus discontinued; and, since this signal is applied onto the AND circuit 444 (FIG. 13*a*) effective on the set side of the keyboard service latch 450, further keyboard service cycles are inhibited until the operator closes the right adjust key 1292 appended to latch 1302. The closing of the key 1292 resets the right adjust last column latch 1302 and the right adjust field latch 1290, and the operator thus has completed the operation using the right adjust key and the programmed right adjust field.

Assuming further, under program control and with one or more end of field bits being located in the data passing through the delay line 366, that the third time has occurred in which an error has been found in the same column as the operator attempts to verify a card 100 in the transport, there is a "column error" signal on lead 1204 from the AND circuit 984 (FIG. 13*e*). The "column error" signal is applied onto the OR circuit 1320 (FIG. 13*m*). The field error latch 1322 is thus set; and at the end of the field, defined by the next adjacent end of field bit B for the program in which the machine is operating, the AND circuit 1326 will have all of its inputs satisfied so as to thereby provide the signal "set field erase" on lead 1330. This signal is applied onto the field erase control logic 1478 (FIG. 13*j*); and this logic, having the "end of field latch" signal on lead 1286 effective on it, is of such construction to do a field erase to the first column of a field, writing keyboard flags back into all of the columns of the field by means of the signal "write keyboard flags" on lead 1146 constituting an output of the field erase control logic 1478 and applied to OR circuit 1146 (FIG. 13*c*). The erase control logic 1478 at this time also provides a "first column found" signal on lead 1324 which is applied onto OR circuit 478 (FIG. 13*k*) for the purpose of updating the column indicator to indicate the first column of the field. Since the machine is now in the first column of a field, it thereby forces the operator to reverify that field.

In the event that the operator encounters the case in which the field contains many errors, then the operator is allowed to put in new data within the entire field on a single-keystroke basis. This is done utilizing the field correct latch 1314 (FIG. 13*m*). If the operator closes the field correct switch 1306 to apply a signal on lead 1312, the field correct latch 1314 is set. When the field correct switch 1306 is closed, it thereby also applies an input signal on AND circuit 1336 (FIG. 13*m*). Assuming that at this time the machine is not in the first column of the field so that there is no signal in the lead 1274, at this time, the inverter 1340 applies the second input signal to the AND circuit 1336; and both inputs to the AND circuit 1336 are thereby provided so that this circuit provides a "set field erase" signal on lead 1330. The "set field erase" signal on lead 1330 is applied onto the field erase control logic 1478, and the logic 1478 does a field erase in the machine back to the first column of the field. If the machine is already in the first column, the inverter 1340 does not provide a signal on the AND circuit 1336; and the logic 1478 is therefore ineffective at this time.

Under these conditions, as the operator enters new data into the field on a single-keystroke basis, a keyboard service cycle is initiated for each keystroke, the AND circuit 1318 (FIG. 13*m*) has its inputs satisfied, a signal is provided on lead 1208, and the field error latch 1322 is set to indicate that a column has been changed in memory. In addition, the memory update latch 986 is set, and the AND circuit 990 (FIG. 13*e*) producing the signal "write error flag" on lead 524 writes the error flag in memory for every column in the field whenever one of the keys on the keyboard is struck. The "write error flag" signal is also impressed through the OR circuit 968 on the reset side of the lock keyboard latch 966. In addition, the "update memory latch" signal on lead 1140 is applied to AND circuit 1138 (FIG. 13*b*) so as to gate the entry register 372 into memory at punch time. Therefore, every time one of the keys on the keyboard is struck, the corresponding data is put into a punch section of memory.

The entry of data on a single-keystroke basis into memory is at one character per column and continues until the end of field is found again. When the "end of field latch" signal on lead 1286 is applied onto the AND circuit 1326 (FIG. 13*m*), both of the inputs of the circuit 1326 are satisfied; and, therefore, a "set field erase" signal is provided on lead 1330. The "set field erase" signal as previously described causes a field erase and brings the machine back to the first column of a field so that the entire field must thereafter be reverified by the operator. The AND circuit 1316 is then effective to reset the field correct latch 1314.

In the event that the operator has corrected a column or a number of columns and then realizes that source data has been taken from the wrong line of the source document, the circuitry allows the operator to go back to the first column of the field or the first column of the record and begin again. This is done by closing either the field erase key 1308 or the record erase switch 1310, and the function is accomplished by the verify erase latch 1348 and the record update latch 1356 (FIG. 13*m*). As has been previously described, when the punched contents of a card 100 is read into memory, it is read into both the punch and print sections for each of the columns for which data appears in the card. In verify mode, when the data circulating through the delay line 366 is updated by repunching the data, the punch section of memory is erased for each of the columns; but the print sections remain in their original form as they were read from the card 100. The signal "set field erase" on lead 1330 has the effect as previously described of setting the field erase control logic 1478 (FIG. 13*j*); and if a record erase is provided, the machine is reverted back to column 1 and keyboard flags are written from column 1 on. After the column is located in which keyboard flags will be written in field erase or record erase, the print sections are transferred to the punch sections of memory; and this is accomplished by means of AND circuit 1360 (FIG. 13*m*) which provides an "A REG bypass " signal on lead 1130 at punch time. As previously described, the "A REG bypass" signal is provided on both the AND circuit 1128 and the inverter 1132 (FIG. 13*b*) for the purpose of relocating data circulating through the delay line 366; and since the "punch" signal is effective on the AND circuit 1360, the data in a print section is relocated into the character just preceding, which is the PU character. The "record update latch" signal is effective on the AND circuit 1360 for this purpose; and the "record update latch" signal is provided under these conditions when the verify erase latch 1348 is set by a "verify erase latch" signal on lead 1352 and with the "first column latch" signal on lead 1274 both effective on AND circuit 1354. The signal on lead 1352 is provided when the verify switch 482 is closed, and either the field erase key 1308 or the record erase key 1310 is closed to set the verify erase latch 1356. The "record update latch" signal on lead 1218 is also applied to the OR circuit 1214 (FIG. 13*n*) to provide a signal "erase flags" on lead 510 which is effective with respect to the columns having data transferred in them from the print sections to the punch sections. The field correct latch, while the key entries are being made as set forth, provides a signal "not field correct latch" on lead 1315 which is applied to AND circuit 952 (FIG. 13*e*) for inhibiting a compare while the single-keystroke re-entries are being accomplished as mentioned.

The action of the record erase switch 1310 in verify mode is the same as that of the field erase key 1308 except that the circuitry connected with the record erase switch 1310 takes the machine all the way back to column 1 by virtue of the fact that the "record erase switch" signal on lead 1342 is applied to the initialization control 594 which inherently has the function of returning the machine to column 1 condition when this signal is applied. The initialization control 594 also at this time writes keyboard flags by means of the lead 546.

The machine advantageously allows the operator to verify a previously punched document card 100 by re-entering data intended to correspond with the punched data. In the event that the data supplied by means of the keyboard does not correspond with the data carried by the punched document card, the operator has a plurality of keystrokes in order to determine that an error has occurred which could possibly be in the data that has been repunched for the purpose of verification or could possibly lie in the data that has been put into the punched document card. In either case, on a third keystroke for a particular column, the operator may change the data in memory to corrected data; and thereafter, the operator may expeditiously produce a corrected document card 100 by simply closing the repunch switch 1226 after putting a fresh card 100 into the hopper. The right adjust operation advantageously in verify mode functions to automatically skip the blank columns in a field and put the machine initially into the column in which the first character occurs while the logic connected with the right adjust key 1292 assures that the machine is actually in the last column of the field before verification is continued. The circuitry connected with the field erase key 1310 advantageously transfers data from the PR characters to the PU characters to allow the operator after having corrected a field to produce a correct card using the repunch switch 1226.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A machine for operating on a document having a plurality of data-recording columns which contain encoded data characters, said machine comprising:

- a storage device for storing encoded characters and having first and second storage areas for each of said columns,
- means for reading each of the encoded data characters on said document into said first and second areas of said storage device,
- a keyboard on which successive characters may be keyed,
- encoding means in connection with said keyboard for providing encoded characters on the actuation of said keyboard keys,
- means for comparing the character in said first storage areas for one of said columns with the character keyed on said keyboard for verifying the correctness of the character in said first storage area for said column,
- means for erasing the data in said first storage area for a column and substituting the character from said keyboard on a keystroke occurring when there is a lack of compare between the character read by said reading means and the character keyed on said keyboard, and
- means for selectively erasing the data in said first storage areas of said storage device for said columns and for transferring the data in said second areas of said storage device into said first areas of said storage device for the respective columns so that a reverification of the document may be done using the data in said first areas.

2. A machine as set forth in claim 1, said storage device including a magnetostrictive delay line and circuitry connecting the ends of the line so that data may circulate through the delay line and said first and second areas for each of said columns including consecutive characters in data circulating through said delay line.

3. A machine as set forth in claim 1, said means for selectively erasing including a switch which is closed for selectively erasing the data in said first storage areas as aforesaid and the machine including also means under the control of said switch for returning the machine from an advanced to a preceding column operating condition whereby reverification may be accomplished beginning with the preceding column.

4. A machine as set forth in claim 2 and including means for providing end of field bits in characters circulating through said delay line for each of said columns, said means for selectively erasing the data in said first storage areas being responsive to end of field bits circulating in the data through said delay line whereby the machine is returned in condition to the first column of a field just subsequent to the column defined by the preceding end of field bit.

5. A machine for operating on documents each having a plurality of data-recording columns containing encoded data characters, said machine comprising:

- a storage device for storing encoded characters and having two storage areas,
- means for reading the encoded data characters on a first one of said documents and causing them to store in one area of said storage device,
- means for reading the encoded data characters from a second one of said documents and causing them to store in the other area of said storage device, and
- means for comparing the characters stored in the two storage areas for verifying the correctness of one set of encoded characters with respect to the other set.

6. A machine as set forth in claim 5, said storage device including a magnetostrictive delay line and circuitry connecting the ends of the line so that data may circulate through the delay line, said two areas in the storage device including two sub-areas in the data circulating through the delay line for each of said columns.

7. A machine as set forth in claim 6 and including means for providing auto dup bits in characters circulating through said delay line for said columns and means responsive to the existence of said bits as the second document is being verified with respect to the first so as to cause said comparing means to be operative as aforesaid.

8. A machine for operating on a document having a plurality of data recording columns some of which contain encoded data characters and the previous ones of which contain blank characters, said machine comprising:

- a data storage device for storing encoded data characters and blank characters,
- means for reading the encoded data characters and blank characters on said document and causing them to store in said storage device,
- a keyboard on which successive data characters and blank characters may be keyed,
- encoding means in connection with said keyboard for providing encoded characters on the actuation of keyboard keys,
- means for comparing the characters as so read by said reading means and stored in said storage device with characters keyed by said keyboard and encoded by said encoding means for verifying the correctness of the characters stored with respect to the keyed characters,
- means for updating the condition of the machine as successive characters are keyed on said keyboard so that successive characters keyed are compared respectively with successive characters in said data storage device,
- means for recognizing the blank characters in said storage device corresponding to said previous blank characters on said document, and
- automatic updating means controlled by said blank character recognizing means for automatically updating the operating condition of the machine to the condition of the machine corresponding to the first encoded data characters in said storage device and skipping the previous blank characters in said storage device for verifying the encoded data characters.

9. A machine as set forth in claim 8, said storage device including a magnetostrictive delay line and circuitry connecting the ends of the line so that data may circulate through the delay line and the machine including a register containing blanks, said automatic updating means being operative to utilize said comparing means for comparing said register in blank condition with the blank characters circulating through said delay line.

10. A machine as set forth in claim 8 including means for locking said keyboard when said automatic updating means is operative as aforesaid.

11. A machine as set forth in claim 9 and including means for providing end of field bits in the data circulating through said delay line and means responsive to said end of field bits for causing said skipping of blank characters in the field defined by the end of field bit of this field and the end of field bit of the preceding field.

12. A machine for operating on a document having a plurality of data recording columns which contain encoded data characters, said machine comprising:

- means for reading the encoded data characters on said document,
- a keyboard on which successive characters may be keyed,
- encoding means in connection with said keyboard for providing encoded characters on the actuation of keyboard keys,
- means for comparing the characters as so read by said reading means with the characters keyed on said keyboard for verifying the correctness of the encoded characters on said document,
- a storage device for storing encoded characters,
- means for entering into said storage device a character keyed on said keyboard on a keystroke occurring when there is a lack of compare between a character as read by said reading means with the character keyed on said keyboard,
- means for indicating the lack of compare of a character read from said document and a character keyed on said keyboard on a first keystroke,
- said keystroke which causes the entry of data into said storage device as aforesaid constituting a subsequent keystroke,
- said storage device including a magnetostrictive delay line and circuitry connecting the ends of the line so that data may circulate through the delay line,
- said comparing means including a register for receiving characters encoded on the actuation of keyboard keys,
- said reading means being connected with said delay line so as to read the encoded data characters on said document into certain sections of the data circulating through said line,
- said means for entering into said storage device the character keyed on said keyboard on a subsequent keystroke including means to erase the data in one of said sections corresponding to the particular column being keyed and means to replace the data in this section with corrected data corresponding to the subsequent keystroke, and
- means connected with said storage device and operable for encoding on a substitute document the characters in the data circulating through said delay line provided by said reading means as corrected on said subsequent keystroke.

13. A machine for operating on document cards which are punched so as to contain encoded data characters in a plurality of columns, said machine comprising:

- means for reading the punched data characters in a said document
- a keyboard on which successive characters may be keyed, encoding means in connection with said keyboard for providing encoded characters on the actuation of keyboard keys, a storage device for storing the encoded characters as so read by said reading means, means for comparing the characters in said storage device as so read by said reading means with the characters keyed on said keyboard for verifying the correctness of the encoded characters on one of said documents, character entering means for entering into said storage device a character keyed on said keyboard on a keystroke occurring when there is a lack of compare between a character as read by said reading means with the character keyed on said keyboard, and punching means for punching in a substitute one of said document cards the characters contained in said storage device including the character which is keyed on a keystroke occurring when there is a lack of compare so as to provide a corrected substitute punched document card.

14. A machine for operating on document cards as set forth in claim 13, and including means effective on said character entering means so as to delay the operation of said character entering means to enter a keyed character into said storage device until after a plurality of such keystrokes occurring which indicate a lack of compare between a character read by said reading means and a character keyed on the keyboard and then allowing the keyed character to be entered into said storage device.

15. A machine as set forth in claim 14, said storage device including a delay line and circuitry connecting the ends of the line so that data may circulate through the delay line, said comparing means including a register for receiving characters encoded on the actuation of keyboard keys, said reading means being connected with said delay line so as to read the encoded data characters on said document into certain sections of the data circulating through said line, said storage device entering means being arranged to erase the data in one of said sections corresponding to the particular column being keyed and to replace the data in this section with corrected data corresponding to the subsequent keystroke.

* * * * *

Disclaimer 3,665,403.—*John J. Igel*, Rochester, and *Myron D. Schettl*, Oronoco, Minn. DATA RECORDER AND VERIFIER. Patent dated May 23, 1972. Disclaimer filed July 1, 1974, by the assignee, *International Business Machines Corporation.*

Hereby enters this disclaimer to claims 5, 6, 8, 9, 10 and 12 through 15 of said patent.

[*Official Gazette May 27, 1975.*]